(12) United States Patent
Naoi et al.

(10) Patent No.: US 11,170,947 B2
(45) Date of Patent: Nov. 9, 2021

(54) DOPING SYSTEM, AND METHOD FOR MANUFACTURING ELECTRODES, BATTERIES AND CAPACITORS

(71) Applicant: MUSASHI ENERGY SOLUTIONS CO., LTD., Hokuto (JP)

(72) Inventors: Masaya Naoi, Minato-ku (JP); Yukihiro Kawada, Minato-ku (JP); Hiroki Yakushiji, Minato-ku (JP); Kazunari Aita, Minato-ku (JP); Terukazu Kokubo, Minato-ku (JP)

(73) Assignee: MUSASHI ENERGY SOLUTIONS CO., LTD., Hokuto (JP)

( * ) Notice: Subject to any disclaimer, the term of this patent is extended or adjusted under 35 U.S.C. 154(b) by 130 days.

(21) Appl. No.: 16/079,937

(22) PCT Filed: Feb. 24, 2017

(86) PCT No.: PCT/JP2017/007169
§ 371 (c)(1),
(2) Date: Aug. 24, 2018

(87) PCT Pub. No.: WO2017/146223
PCT Pub. Date: Aug. 31, 2017

(65) Prior Publication Data
US 2019/0074143 A1 Mar. 7, 2019

(30) Foreign Application Priority Data

Feb. 26, 2016 (JP) .............................. JP2016-035609
Mar. 7, 2016 (JP) .............................. JP2016-043435
(Continued)

(51) Int. Cl.
*H01G 11/86* (2013.01)
*H01G 11/06* (2013.01)
(Continued)

(52) U.S. Cl.
CPC ............. *H01G 11/86* (2013.01); *H01G 11/06* (2013.01); *H01G 11/50* (2013.01); *H01G 13/00* (2013.01);
(Continued)

(58) Field of Classification Search
None
See application file for complete search history.

(56) References Cited

U.S. PATENT DOCUMENTS 5,743,921 A * 4/1998 Nazri ................ H01M 10/0525
29/623.5
2008/0241694 A1 * 10/2008 Kaiduka ............. H01M 10/052
429/231.5
(Continued)

FOREIGN PATENT DOCUMENTS

CN 105164776 A 12/2015
JP 59-132565 A 7/1984
(Continued)

OTHER PUBLICATIONS

Combined Chinese Office Action and Search Report dated Nov. 5, 2019 in corresponding Chinese Patent Application No. 201780012705.7 (with English Translation and English Translation of Category of Cited Documents) citing document AO therein, 19 pages.
(Continued)

*Primary Examiner* — Louis J Rufo
(74) *Attorney, Agent, or Firm* — Oblon, McClelland, Maier & Neustadt, L.L.P.

(57) ABSTRACT

Provided is a doping system in which an active material in a strip-shaped electrode precursor having a layer including an active material is doped with alkali metal. The doping system includes a doping tank, a conveying unit, a counter electrode unit, a connection unit, and a porous insulating member. The doping tank accommodates a solution includ-
(Continued)

ing alkali metal ions. The conveying unit conveys the electrode precursor along a path passing through the inside of the doping tank. The counter electrode unit is accommodated in the doping tank. The connection unit electrically connects the electrode precursor and the counter electrode unit. The porous insulating member is disposed between the electrode precursor and the counter electrode unit, and is not in contact with the electrode precursor.

22 Claims, 29 Drawing Sheets

(30) Foreign Application Priority Data

| Mar. 30, 2016 | (JP) | JP2016-068995 |
| Mar. 31, 2016 | (JP) | JP2016-072230 |
| Jul. 27, 2016 | (JP) | JP2016-147613 |

(51) Int. Cl.

| H01G 11/50 | (2013.01) |
| H01M 10/0585 | (2010.01) |
| H01M 10/0587 | (2010.01) |
| H01M 4/139 | (2010.01) |
| H01G 13/00 | (2013.01) |
| H01M 4/04 | (2006.01) |
| H01M 4/1393 | (2010.01) |
| H01M 4/587 | (2010.01) |
| H01M 10/0525 | (2010.01) |
| H01M 4/02 | (2006.01) |

(52) U.S. Cl.
CPC ........ *H01M 4/0459* (2013.01); *H01M 4/139* (2013.01); *H01M 4/1393* (2013.01); *H01M 4/587* (2013.01); *H01M 10/0525* (2013.01); *H01M 10/0585* (2013.01); *H01M 10/0587* (2013.01); *H01M 2004/027* (2013.01)

(56) References Cited

U.S. PATENT DOCUMENTS

| 2009/0191462 A1* | 7/2009 | Matsui | H01M 4/1393 |
| | | | 429/231.8 |
| 2012/0018309 A1* | 1/2012 | Min | C25D 21/12 |
| | | | 205/83 |
| 2012/0048739 A1 | 3/2012 | Choi et al. | |
| 2012/0055628 A1 | 3/2012 | Min et al. | |
| 2014/0178594 A1 | 6/2014 | Kobayashi et al. | |
| 2014/0313639 A1* | 10/2014 | Raman | H01G 11/50 |
| | | | 361/528 |
| 2015/0030932 A1 | 1/2015 | Yoshida et al. | |
| 2015/0162653 A1* | 6/2015 | Ootani | H01M 4/38 |
| | | | 429/404 |
| 2015/0191841 A1* | 7/2015 | Grant | H01M 4/0459 |
| | | | 205/59 |
| 2017/0187030 A1* | 6/2017 | Grant | H01M 4/0452 |

FOREIGN PATENT DOCUMENTS

| JP | 9-293499 A | 11/1997 |
| JP | 10-308212 A | 11/1998 |
| JP | 2008-77963 A | 4/2008 |
| JP | 2012-28729 A | 2/2012 |
| JP | 2012-49500 A | 3/2012 |
| JP | 2012-49543 A | 3/2012 |
| JP | 2012-49544 A | 3/2012 |
| JP | 2012-69894 A | 4/2012 |
| JP | 2012-169071 A | 9/2012 |
| JP | 2013-258422 A | 12/2013 |
| JP | 2014-100784 A | 6/2014 |
| JP | 2014-123663 A | 7/2014 |
| JP | 2015-43310 A | 3/2015 |

OTHER PUBLICATIONS

Extended European Search Report dated Sep. 24, 2019 in Patent Application No. 17756657.7, citing documents AA and AB therein, 9 pages.
English translation of the International Preliminary Report on Patentability and Written Opinion dated Sep. 7, 2018 in PCT/JP2017/007169.
International Search Report dated May 16, 2017, in PCT/JP2017/007169, filed Feb. 24, 2017.
Japan Office Action, Notice of Reasons for Rejection dated Dec. 12, 2017, in corresponding Japanese Patent Application No. 2017-557228, and its English Translation, 13 pages.
Japan Office Action, Notice of Reasons for Rejection dated May 8, 2018, and its corresponding Japanese Patent Application No. 2017-557228 , and its English Translation, 9 pages.
Japanese Office Action dated Dec. 15, 2020 in Japanese Patent Application No. 2018-016773 (with English translation), 4 pages.
Japanese Office Action dated Oct. 27, 2020 in Japanese Patent Application No. 2018-016773 (with English translation), citing document AO therein, 7 pages.
Korean Office Action dated Jan. 21, 2021 in Korean Patent Application No. 10-2018-7023976 (with English translation), 24 pages.
Combined Chinese Office Action and Search Report dated Sep. 4, 2020 in Patent Application No. 201780012705.7 (with English language translation), 17 pages.
Chinese Office Action dated Mar. 15, 2021, in Chinese Patent Application No. 201780012705.7 (with English Translation).
Notice of Reasons for Rejection dated Jun. 3, 2021, in Chinese Patent Application No. 201780012705.7 filed Feb. 24, 2017 (with English translation).

\* cited by examiner

DOPING SYSTEM, AND METHOD FOR MANUFACTURING ELECTRODES, BATTERIES AND CAPACITORS

CROSS-REFERENCE TO RELATED APPLICATIONS

This international application claims the benefit of Japanese Patent Application No. 2016-35609 filed on Feb. 26, 2016, Japanese Patent Application No. 2016-43435 filed on Mar. 7, 2016, Japanese Patent Application No. 2016-68995 field on Mar. 30, 2016, Japanese Patent Application No. 2016-72230 field on Mar. 31, 2016, and Japanese Patent Application No. 2016-147613 field on Jul. 27, 2016 in Japan Patent Office, the entire disclosures of which are incorporated herein by reference.

TECHNICAL FIELD

The present disclosure relates to a doping system, and a method for manufacturing electrodes, batteries, and capacitors.

BACKGROUND ART

In recent years, as the size and weight of electronic devices have been remarkably reduced, demands for miniaturization and weight reduction have been further increased also for batteries used as power supplies for driving the electronic devices.

Nonaqueous electrolyte secondary batteries typified by lithium ion secondary batteries have been developed in order to satisfy the requirements of miniaturization and weight reduction. Further, lithium ion capacitors have been known as electric storage devices corresponding to applications requiring high energy density characteristics and high output characteristics. In addition, sodium ion type batteries and capacitors using sodium which is richer in resources and cheaper as compared with lithium have also been known.

In such batteries and capacitors, a process of previously doping an electrode with alkali metal (generally referred to as a pre-doping) has been adopted for various purposes. Various methods have been known as a method for pre-doping an electrode with alkali metal. For example, Patent Documents 1 and 2 disclose a so-called sheet-type method for performing pre-doping in a state in which a cut electrode plate and an alkali metal plate are disposed in an electrolytic solution via a separator. On the other hand, Patent Documents 3 to 6 disclose a so-called continuous type method for performing pre-doping while transferring a strip-shaped electrode plate in an electrolytic solution.

PRIOR ART DOCUMENTS

Patent Documents

Patent Document 1: JPH 9-293499 A
Patent Document 2: JP 2012-69894A
Patent Document 3: JPH 10-308212A
Patent Document 4: JP 2008-77963A
Patent Document 5: JP 2012-49543A
Patent Document 6: JP 2012-49544A

SUMMARY OF THE INVENTION

Problems to be Solved by the Invention

Although the above-described continuous method is more productive than the sheet-type method, the methods disclosed in Patent Documents 3 to 6 may cause various problems, such as a formation of a defective solid electrolyte interface (SEI) coating film and a precipitation of alkali metal on an electrode, due to a local pre-doping progress.

An aspect of the present disclosure is to provide a doping system capable of manufacturing high quality electrodes pre-doped with alkali metal, and a method for manufacturing electrodes, batteries and capacitors.

Means for Solving the Problems

An aspect of the present disclosure provides a doping system in which an active material in a strip-shaped electrode precursor having a layer including the active material is doped with alkali metal, the doping system including: a doping tank which accommodates a solution including alkali metal ions, a conveying unit which conveys the electrode precursor along a path passing through the doping tank, a counter electrode unit which is accommodated in the doping tank, a connection unit which electrically connects the electrode precursor and the counter electrode unit, and a porous insulating member which is disposed between the electrode precursor and the counter electrode unit and is not in contact with the electrode precursor.

A doping system according to an aspect of the present disclosure includes the porous insulating member. The porous insulating member is disposed between the electrode precursor and the counter electrode unit. Therefore, it is difficult for the electrode precursor to come into contact with the counter electrode unit or excessively approach the counter electrode unit. As a result, it becomes easy to control the doping amount of the alkali metal to the active material. As a result, it is possible to manufacture the high-quality electrode.

In addition, the porous insulating member is not in contact with the electrode precursor. Therefore, it is possible to suppress the electrode precursor from being damaged due to the contact with the porous insulating member. As a result, it is possible to manufacture the high-quality electrode.

Another aspect of the present disclosure provides a doping system in which an active material in a strip-shaped electrode precursor having a layer including the active material is doped with alkali metal, the doping system including: a doping tank which accommodates a solution including alkali metal ions, a conveying unit which conveys the electrode precursor along a path passing through the doping tank, a conductive conveying roller which is included in the conveying unit, a counter electrode unit which is accommodated in the doping tank, a connection unit which electrically connects the conveying roller and the counter electrode unit, and an elastically deformable pressing unit which presses the electrode precursor in a direction of the conveying roller.

In another aspect of the present disclosure, the doping system includes the elastically deformable pressing unit which presses the electrode precursor in the direction of the conveying roller. The pressing unit elastically deforms according to the shape of the electrode precursor, and presses the electrode precursor against the conveying roller over a wide range. As a result, the electrical connection between the electrode precursor and the conveying roller is stabilized. As a result, it is possible to manufacture the high-quality electrode.

Another aspect of the present disclosure provides a doping system in which an active material in a strip-shaped electrode precursor having a layer including the active material is doped with alkali metal, the doping system including: a plurality of electrolytic solution tanks which accommodate a solution including alkali metal ions, a conveying unit which conveys the electrode precursor along a path passing through insides of the plurality of electrolytic solution tanks, and a counter electrode unit which is accommodated in at least one of the plurality of electrolytic solution tanks, and a connection unit which electrically connects the electrode precursor and the counter electrode unit.

According to the doping system in accordance with another aspect of the present disclosure, it is possible to efficiently dope the active material in the electrode precursor with the alkali metal. As a result, it is possible to efficiently manufacture the high-quality electrode.

Another aspect of the present disclosure provides a method for doping an active material with alkali metal including: a first dope process of doping an active material with alkali metal by electrically connecting an electrode precursor having a layer including the active material and a counter electrode unit in a first electrolytic solution tank which accommodates a solution including alkali metal ions and the counter electrode unit, and a second dope process of doping the active material with alkali metal under a condition different from the first dope process by electrically connecting the electrode precursor and the counter electrode unit in a second electrolytic solution tank which accommodates the solution including the alkali metal ions and the counter electrode unit after the first dope process.

According to the method for doping an active material with alkali metal in accordance with another aspect of the present disclosure, it is possible to efficiently dope the active material in the electrode precursor with the alkali metal. As a result, it is possible to efficiently manufacture the high-quality electrode.

Another aspect of the present disclosure provides a system for manufacturing electrodes for manufacturing a stripe-shaped electrode having a layer including an active material doped with alkali metal, the system including: a doping unit which dopes the active material in a stripe-shaped electrode precursor having a layer including the active material with the alkali metal to manufacture the electrode, a winding unit which winds the electrode manufactured by the doping unit, and a gas supply unit which supplies at least one kind of gas selected from the group consisting of rare gases and carbon dioxide to the winding unit.

According to the system for manufacturing electrodes in accordance with another aspect of the present disclosure, it is possible to suppress the deterioration in the quality of the electrode after doping with the alkali metal.

Another aspect of the present disclosure provides an electrode storage system including: an electrode which includes an active material doped with alkali metal, a container which accommodates the electrode, and at least one kind of gas which is included the container and selected from the group consisting of rare gases and carbon dioxide.

According to the electrode storage system in accordance with another aspect of the present disclosure, it is possible to suppress the deterioration in the quality of the electrode after doping with the alkali metal.

Another aspect of the present disclosure provides a method for manufacturing electrodes for manufacturing a doped electrode including an active material doped with alkali metal, the method including: a cleaning process of cleaning the doped electrode with a cleaning liquid including an aprotic solvent.

The doped electrode manufactured by the electrode manufacturing method in accordance with another aspect of the present disclosure is cleaned with the cleaning liquid including the aprotic solvent in the cleaning process. Therefore, it is difficult for the surface portion of the doped electrode to be peeled off or for the doped electrodes to be stuck to each other. As a result, it is possible to manufacture the high-quality doped electrode.

Another aspect of the present disclosure provides an apparatus for manufacturing electrodes for manufacturing a doped electrode by doping an active material in a stripe-shaped electrode precursor having a layer including the active material with alkali metal, the apparatus including: a dope unit which dopes the active material with the alkali metal, and a cleaning unit which cleans the doped electrode by a cleaning liquid including an aprotic solvent.

The doped electrode manufactured using the apparatus for manufacturing electrodes in accordance with another aspect of the present disclosure is cleaned by the cleaning liquid including the aprotic solvent, and as a result it is difficult for the surface portion of the doped electrode to be peeled off or for the doped electrodes to be stuck to each other. As a result, it is possible to manufacture the high-quality doped electrode.

EXPLANATION OF REFERENCE NUMERALS

1 . . . Doping system 3, 5 . . . Doping tank 7 . . . Cleaning tank 9, 11, 13, 15, 17, 19, 21, 23, 25, 27, 29, 31, 33, 35, 37, 39, 41, 43, 45, 305, 307, 109, 311, 313, 315, 317, 319, 119, 321, 323 . . . Conveying roller, 47 . . . Supply roll, 49 . . . Winding roll, 51, 52 . . . Counter electrode unit, 53 . . . Porous insulating member, 55 . . . Support, 57 . . . Circulating filtration unit, 61 . . . Direct current (DC) power supply, 63 . . . Blower, 67, 68, 70 . . . Support rod, 69 . . . Partition plate, 71 . . . Space, 73 . . . Electrode precursor, 75 . . . Electrode, 77 . . . Conductive substrate, 79 . . . Alkali metal-containing plate, 81 . . . Filter, 83 . . . Pump, 85 . . . Pipe, 87, 89 . . . Cable, 93 . . . Current collector, 94 . . . Non-formed portion, 95 . . . Active material layer, 96 . . . Central part, 97 . . . Resin plate, 99 . . . Containing unit, 101 . . . Chamber, 103 . . . Cleaning tank, 104 . . . Bearing, 104A . . . First part, 104B . . . Second part, 104C . . . Hole, 105 . . . Bearing, 105A . . . First part, 105B . . . Second part, 105C . . . Hole, 107 . . . Idling prevention unit, 110 . . . Shutter, 111 . . . Shutter, 113 . . . Pressing unit, 114 . . . Gas supply unit, 115 . . . Rod-shaped member, 116 . . . Gas exhaust unit, 118 . . . Root, 120 . . . Leading end, 121 . . . Seal, 122 . . . Front cover, 123 . . . Slit, 127 . . . Lever, 129 . . . Idling prevention roller, 131 . . . Energizing spring, 133 . . . Pipe, 135 . . . Supply valve, 137 . . . Pipe, 139 . . . Exhaust valve, 141 . . . Wall, 143 . . . Support part, 149 . . . Air shaft, 150 . . . Hole, 151 . . . Protruding piece, 152 . . . O-ring, 201 . . . System for manufacturing electrodes, 203, 205, 207 . . . Electrolytic solution tank, 217 . . . Main body, 301 . . . Apparatus for manufacturing electrodes, 401, 403 . . . Cleaning unit, 501 . . . First mask member, 503 . . . Second mask member

MODE FOR CARRYING OUT THE INVENTION

Embodiments of the present disclosure will be described.

First Embodiment

1. Configuration of Doping System 1

Figure 1:
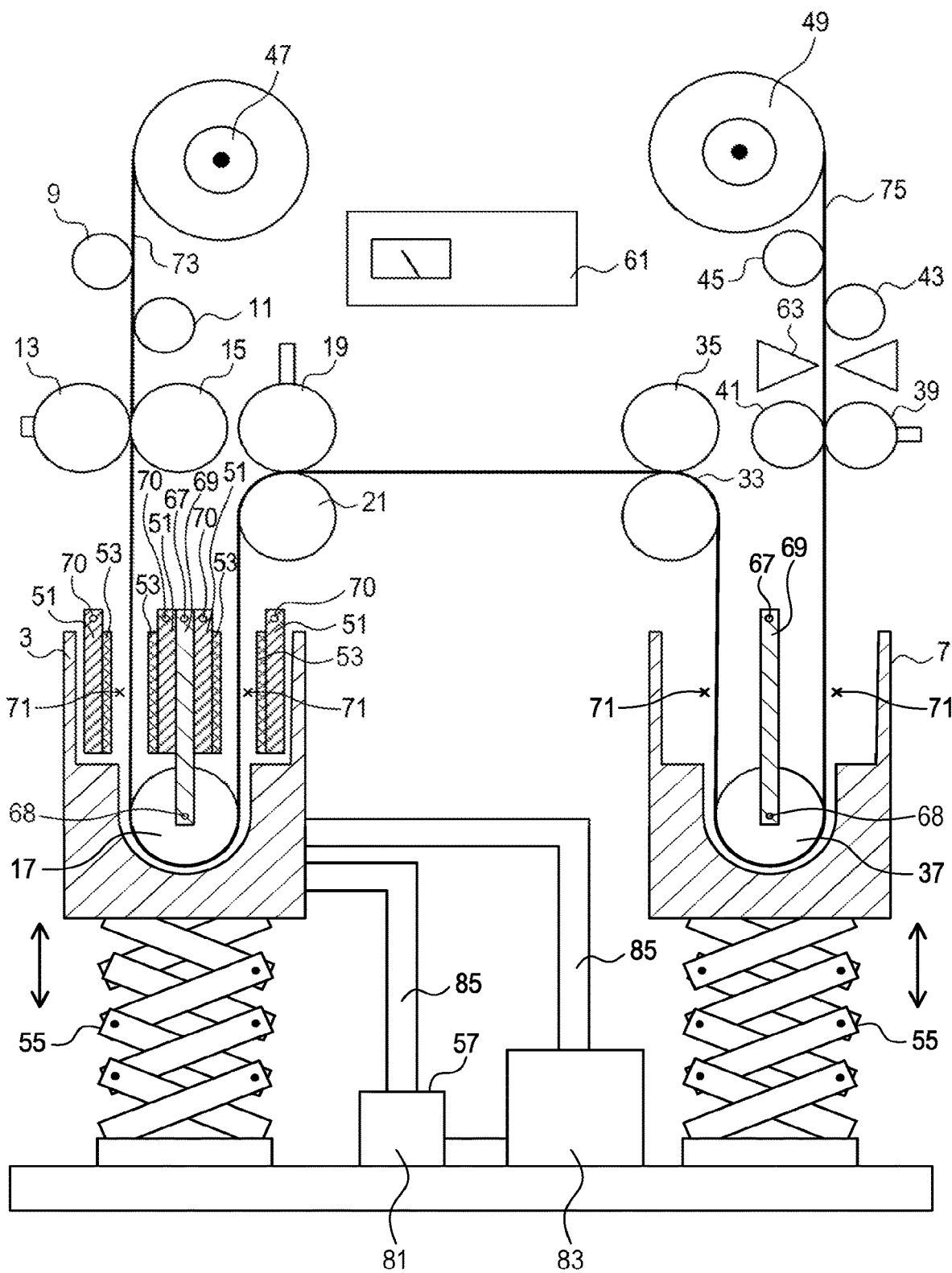
FIG. 1 is an explanatory diagram showing a configuration of a doping system.

The configuration of the doping system 1 will be described with reference to FIGS. 1 to 4. As shown in FIG. 1, the doping system 1 includes a doping tank 3, a cleaning tank 7, conveying rollers 9, 11, 13, 15, 17, 19, 21, 33, 35, 37, 39, 41, 43, and 45 (hereinafter, collectively referred to as a conveying roller group), a supply roll 47, a winding roll 49, a counter electrode unit 51, a porous insulating member 53, a support 55, a circulating filtration unit 57, a DC power supply 61, and a blower 63.

Figure 2:
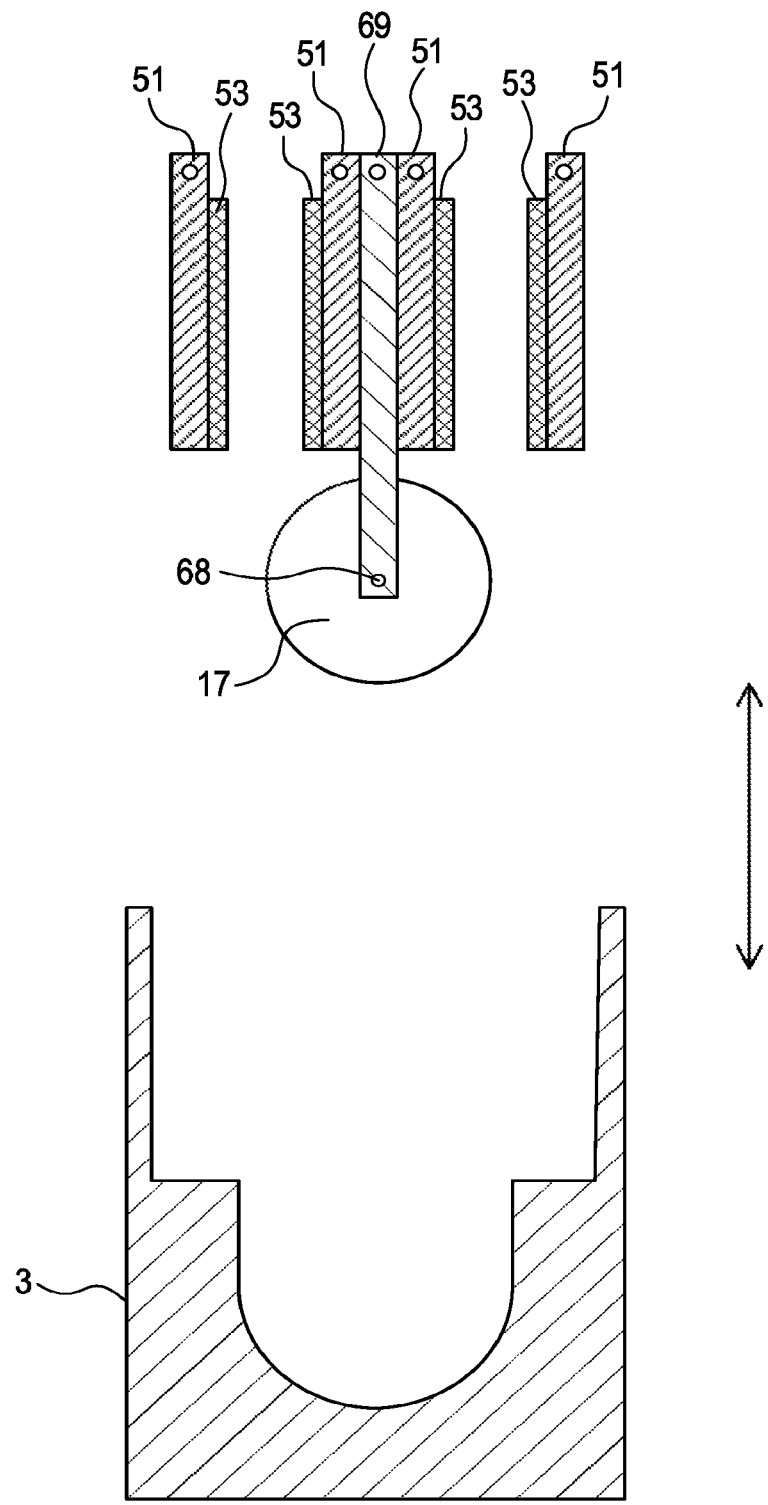
FIG. 2 is an explanatory diagram showing a state in which a doping tank moves downward.

As shown in FIGS. 1 and 2, the doping tank 3 is a square-shaped tank whose upper part is open. A bottom surface of the doping tank 3 has a substantially U-shaped cross-sectional shape. In the doping tank 3, there are a partition plate 69, four counter electrode units 51, four porous insulating members 53, and a conveying roller 17.

The partition plate 69 is supported by a support rod 67 which penetrates through an upper end thereof. The support rod 67 is fixed to a wall or the like (not shown). A part of the partition plate 69 excluding the upper end is in the doping tank 3. The partition plate 69 extends in a vertical direction and divides the inside of the doping tank 3 into two spaces. The conveying roller 17 is attached to a lower end of the partition plate 69. The partition plate 69 and the conveying roller 17 are supported by support rods 68 penetrating therethrough. A vicinity of the lower end of the partition plate 69 is cut out not to contact with the conveying roller 17. There is a space between the conveying roller 17 and the bottom surface of the doping tank 3.

The four counter electrode units 51 are each supported by support rods 70 penetrating through their upper ends, and extend in the vertical direction. The support rod 70 is fixed to a wall (not shown) or the like. A part of the counter electrode unit 51 excluding the upper end is in the doping tank 3. Two of the four counter electrode units 51 are disposed to have the partition plate 69 sandwiched between both sides thereof. The remaining two counter electrode units 51 are disposed along an inner side surface of the doping tank 3.

A space 71 is present between the counter electrode unit 51 disposed on the partition plate 69 side and the counter electrode unit 51 disposed along the inner side surface of the doping tank 3. The counter electrode unit 51 is connected to a positive pole of the DC power supply 61. The detailed configuration of the counter electrode unit 51 will be described later.

The porous insulating member 53 is attached to a surface of the space 71 side in each counter electrode unit 51. The detailed configuration of the porous insulating member 53 will be described later.

Basically, the cleaning tank 7 has the same configuration as the doping tank 3. However, the counter electrode unit 51 and the porous insulating member 53 are not present inside the cleaning tank 7.

The conveying roller group conveys an electrode precursor 73, which will be described later, along a certain path. The path is a path from the supply roll 47 to the winding roll 49 by sequentially passing through the inside of the doping tank 3 and the inside of the cleaning tank 7.

Among the paths, a portion passing through the inside of the doping tank 3 is a path which first moves downward in the space 71 positioned between the porous insulating member 53 attached along the inner side surface of the doping tank 3 and the porous insulating member 53 on the partition plate 69 side opposite thereto, then changes its own moving direction to an upward direction by the conveying roller 17, and finally moves upward in the space 71 positioned between the porous insulating member 53 attached along the inner side surface of the doping tank 3 and the porous insulating member 53 on the partition plate 69 side opposite thereto.

Further, among the above paths, a portion passing the inside of the cleaning tank 7 is a path which first moves downward between the inner side surface of the cleaning tank 7 and the partition plate 69, then changes its own moving direction to an upward direction by the conveying roller 37, and finally moves upward between the inner side surface of the cleaning tank 7 and the partition plate 69.

Among the conveying roller groups, the conveying rollers 15 and 21 are made of a conductive material. In addition, the conveying rollers 15 and 21 are connected to a negative pole of the DC power supply 61. The conveying roller 13 presses the electrode precursor 73 in the direction of the conveying roller 15. The conveying roller 19 presses the electrode precursor 73 in the direction of the conveying roller 21. The conveying roller group corresponds to a conveying unit.

The supply roll 47 has the electrode precursor 73 wound around its outer periphery. That is, the supply roll 47 holds the electrode precursor 73 in the wound state. The conveying roller group draws out and conveys the electrode precursor 73 held by the supply roll 47. The supply roll 47 corresponds to a holding unit.

The winding roll 49 winds up and stores the electrode 75 conveyed by the conveying roller group. It is to be noted that the electrode 75 is manufactured by doping the electrode precursor 73 with alkali metal in the doping tank 3.

According to an aspect of the doping with the alkali metal, the alkali metal may be intercalated into the active material in the ion state, an alloy of the alkali metal may be formed, and the alkali metal ion may be consumed as an SEI coating film.

Figure 3:
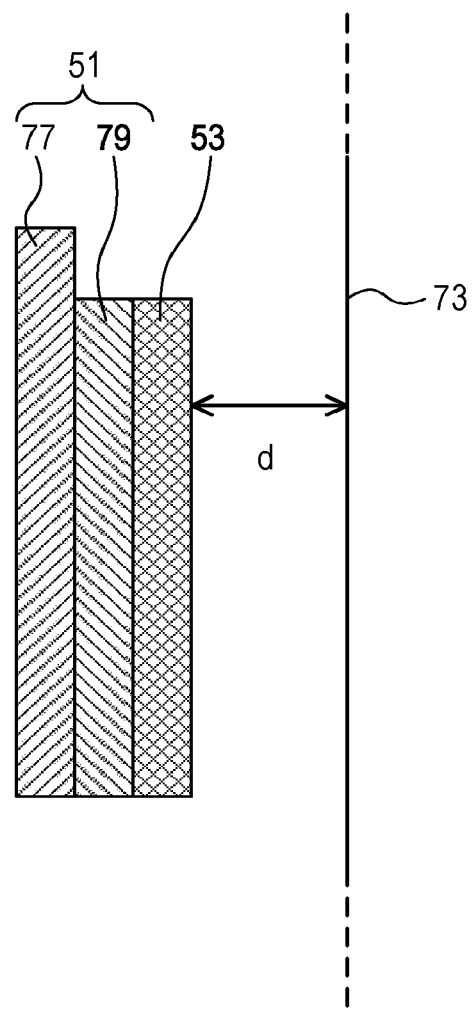
FIG. 3 is a side cross-sectional view showing a configuration of a counter electrode unit and a porous insulating member.

The counter electrode unit 51 is accommodated in the doping tank 3 as described above. The counter electrode unit 51 has a plate shape. As shown in FIG. 3, the counter electrode unit 51 has a structure in which a conductive substrate 77 and an alkali metal-containing plate 79 are stacked. Examples of the material of the conductive substrate 77 may include copper, stainless steel, nickel, and the like. The form of the alkali metal-containing plate 79 is not particularly limited, and examples thereof include an alkali metal plate, an alkali metal alloy plate and the like. A thickness of the alkali metal-containing plate 79 can be, for example, 0.03 to 3 mm.

The porous insulating member 53 has a plate shape. As shown in FIG. 3, the porous insulating member 53 is stacked on the alkali metal-containing plate 79 and attached to the surface of the counter electrode unit 51. The plate shape of the porous insulating member 53 is a shape when the porous insulating member 53 is attached to the surface of the counter electrode unit 51. The porous insulating member 53 may be a member that maintains a certain shape by itself or may be a member that can be easily deformed such as a net.

As shown in FIGS. 1 and 3, the porous insulating member 53 is not in contact with the electrode precursor 73 conveyed by the conveying roller group. A shortest distance d from the surface of the porous insulating member 53 to the electrode precursor 73 is preferably in the range of 0.5 to 100 mm, particularly preferably in the range of 1 to 10 mm. The shortest distance d is a distance between a point on the surface of the porous insulating member 53 which is closest to the electrode precursor 73 and the electrode precursor 73.

The porous insulating member 53 is porous. Therefore, a dope solution described later can pass through the porous insulating member 53. By doing so, the counter electrode unit 51 can come into contact with the dope solution.

Examples of the porous insulating member 53 may include a mesh made of resin or the like. Examples of the resin may include polyethylene, polypropylene, nylon, polyetheretherketone, polytetrafluoroethylene, and the like. An opening of the mesh can be appropriately set, and can be, for example, 0.1 µm to 10 mm, and preferably in the range of 0.1 to 5 mm. A thickness of the mesh can be appropriately set, and can be, for example, 0.1 µm to 10 mm, and preferably in the range of 30 µm to 1 mm. The aperture ratio of the mesh can be appropriately set, and can be, for example, 5 to 98%, and is preferably in the range of 5 to 95%, and more preferably in the range of 50 to 95%.

The whole of the porous insulating member 53 may be made of an insulating material, or a part thereof may be provided with an insulating layer.

The support 55 supports the doping tank 3 and the cleaning tank 7 from below. A height of the support 55 can be changed. If the support 55 is lowered while the positions in the vertical direction of the partition plate 69, the counter electrode unit 51, and the porous insulating member 53 are maintained, as shown in FIG. 2, the doping tank 3 can be moved relatively downward with respect to the partition plate 69, the counter electrode unit 51, and the porous insulating member 53. In addition, if the support 55 is raised, the doping tank 3 can be moved relatively upward with respect to the partition plate 69, the counter electrode unit 51, and the porous insulating member 53. The support 55 corresponds to a tank moving unit.

The circulating filtration unit 57 includes a filter 81, a pump 83, and a pipe 85. The pipe 85 is a circulating pipe that sequentially passes through the doping tank 3, the pump 83, and the filter 81. The pipe 85 is preferably a flexible pipe that can follow up the vertical movement of the doping tank 3. The dope solution in the doping tank 3 is circulated inside the pipe 85 and the filter 81 by a driving force of the pump 83 and returns to the doping tank 3 again. At this time, foreign matters and the like in the dope solution are filtered by the filter 81. Examples of the foreign matters include foreign matters precipitated from the dope solution, foreign matters generated from the electrode precursor 73, and the like. Examples of the material of the filter 81 may include resins such as polypropylene and polytetrafluoroethylene. A hole diameter of the filter 81 can be appropriately set, and can be, for example, in the range of 30 to 50 µm.

Figure 4:
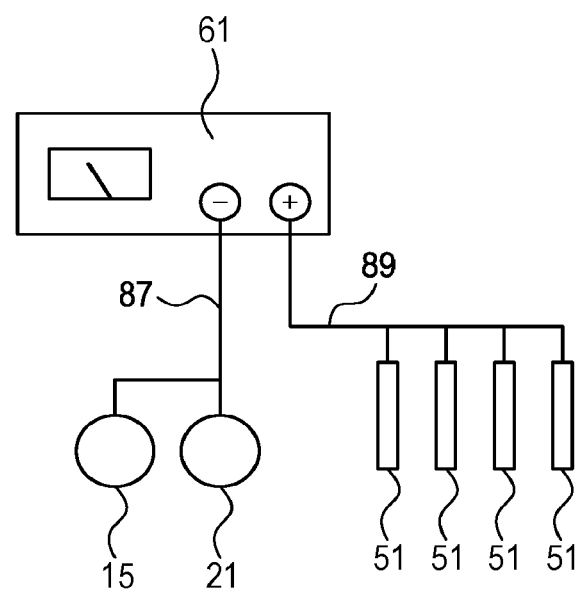
FIG. 4 is an explanatory diagram showing an electrical connection between a conveying roller, a counter electrode unit, and a DC power supply.

As shown in FIG. 4, a negative terminal of the DC power supply 61 is connected to the conveying rollers 15 and 21, respectively, via a cable 87. In addition, a positive terminal of the DC power supply 61 is connected to a total of four counter electrode units 51, respectively, via a cable 89. Since the electrode precursor 73 is in contact with the conductive conveying rollers 15 and 21 and the electrode precursor 73 and the counter electrode unit 51 are in the dope solution as the electrolytic solution, the electrode precursor 73 and the counter electrode unit 51 are electrically connected to each other. The DC power supply 61, the cables 87 and 89, and the conveying rollers 15 and 21 correspond to the connection unit.

The blower 63 blows a gas to the electrode 75 that has come out from the cleaning tank 7 to vaporize the cleaning liquid, thereby drying the electrode 75. The gas to be used is preferably an inert gas against the active material doped with the alkali metal. Examples of such gases may include helium gas, neon gas, argon gas, and dehumidified air from which moisture has been removed, and the like.

2. Configuration of Electrode Precursor 73

Figure 5:
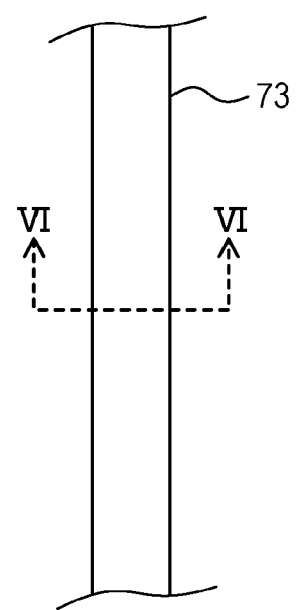
FIG. 5 is a plan view showing a configuration of an electrode precursor.
Figure 6:
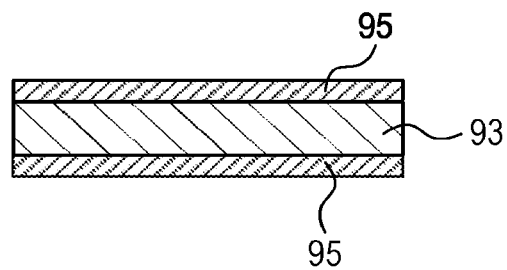
FIG. 6 is a cross-sectional view taken along the line VI-VI in FIG. 5.

A configuration of the electrode precursor 73 will be described with reference to FIGS. 5 and 6. As shown in FIG. 5, the electrode precursor 73 has a stripe shape. As shown in FIG. 6, the electrode precursor 73 includes a stripe-shaped current collector 93 and active material layers 95 formed on both sides thereof.

The current collector 93 may be preferably a metal foil such as copper, nickel, and stainless steel. In addition, the current collector 93 may be one in which a conductive layer including a carbon material as a main component is formed on the metal foil. The thickness of the current collector 93 can be, for example, in the range of 5 to 50 μm.

The active material layer 95 can be manufactured, for example, by preparing a slurry containing an active material and a binder before doping the alkali metal, coating the slurry on the current collector 93, and drying the slurry.

Examples of the binder may include rubber type binders such as styrene-butadiene rubber (SBR) and NBR; fluorine type resins such as polytetrafluoroethylene and polyvinylidene fluoride; polypropylene, polyethylene, and fluorine-modified (meth) acrylic binder as disclosed in JP 2009-246137A, and the like.

In addition to the active material and the binder, the slurry may contain other components. Examples of other components may include conductive agents such as carbon black, graphite, vapor grown carbon fiber, and metal powder; thickeners such as carboxyl methyl cellulose, a Na salt or an ammonium salt thereof, methyl cellulose, hydroxymethyl cellulose, ethyl cellulose, hydroxypropyl cellulose, polyvinyl alcohol, oxidized starch, phosphorylated starch, and casein, and the like.

The thickness of the active material layer 95 is not particularly limited, and is, for example, 5 to 500 μm, preferably 10 to 200 μm, and particularly preferably 10 to 100 μm.

The active material included in the active material layer 95 is not particularly limited as long as it is an electrode active material applicable to batteries or capacitors utilizing insertion/desorption of alkali metal ions, and may be an anode active material or a cathode active material.

The anode active material is not particularly limited, and examples thereof may include a carbon material such as graphite, graphitizable carbon, non-graphitizable carbon, and a composite carbon material obtained by coating graphite particles with a pitch or a carbide of a resin; metals or semi-metals such as Si and Sn that can be alloyed with lithium, materials containing these oxides, and the like. Specific examples of the carbon material may include the carbon materials described in JP 2013-258392A. Specific examples of the metals or semi-metals that can be alloyed with lithium or the materials containing these oxides may include the materials described in JP 2005-123175A and JP 2006-107795A.

Examples of the cathode active material may include transition metal oxides such as cobalt oxide, nickel oxide, manganese oxide, and vanadium oxide; sulfur-based active materials such as a sulfur simple material and metal sulfide, and the like.

Any of the cathode active material and the anode active material may be made of a single material or a mixture of two or more kinds of materials. The doping system 1 of the present disclosure is suitable for doping an anode active material with alkali metals, and in particular, the anode active material is preferably a carbon material or a material including Si or an oxide thereof.

As the alkali metals to be doped onto the active material, lithium or sodium is preferable, and lithium is particularly preferable.

When the electrode precursor 73 is used for manufacturing an electrode of a lithium ion secondary battery, a density of the active material layer 95 is preferably 1.50 to 2.00 g/cc, particularly preferably 1.60 to 1.90 g/cc.

3. Composition of Dope Solution

When the doping system 1 is used, a solution including alkali metal ions (hereinafter, referred to as a dope solution) is accommodated in the doping tank 3.

The dope solution includes alkali metal ions and a solvent. Examples of the solvent may include an organic solvent. As the organic solvent, an aprotic organic solvent is preferable. Examples of the aprotic organic solvent may include ethylene carbonate, propylene carbonate, butylene carbonate, dimethyl carbonate, diethyl carbonate, methylethyl carbonate, 1-fluoroethylene carbonate, γ-butyrolactone, acetonitrile, dimethoxyethane, tetrahydrofuran, dioxolane, methylene chloride, sulfolane, diethylene glycol dimethyl ether (diglyme), diethylene glycol methyl ethyl ether, triethylene glycol dimethyl ether (triglyme), triethylene glycol butyl methyl ether, tetraethylene glycol dimethyl ether (tetraglyme) and the like.

In addition, as the organic solvent, ionic liquids such as a quaternary imidazolium salt, a quaternary pyridinium salt, a quaternary pyrrolidinium salt, a quaternary piperidinium salt and the like can also be used. The organic solvent may be made of a single component or a mixed solvent of two or more kinds of components. The organic solvent may be made of a single component or a mixed solvent of two or more kinds of components.

The alkali metal ions included in the dope solution are ions constituting the alkali metal salt. The alkali metal salt is preferably a lithium salt or a sodium salt. Examples of anionic parts constituting the alkali metal salt may include phosphorus anion having a fluoro group such as $PF_6^-$, $PF_3(C_2F_5)_3^-$, and $PF_3(CF_3)_3^-$; boron anion having a fluoro group or a cyano group such as $BF_4^-$, $BF_2(CF_2)_2^-$, and $BF_3(CF_3)^-$, and $B(CN)_4^-$; sulfonylimide anion having a fluoro group such as $N(FSO_2)_2^-$, $N(CF_3SO_2)_2^-$, and $N(C_2F_5SO_2)_2^-$; organic sulfonate anion having a flouro group such $CF_3SO_3^-$, and the like.

A concentration of the alkali metal salt in the dope solution is preferably 0.1 mol/L or more, and more preferably in the range of 0.5 to 1.5 mol/L. The alkali metal doping efficiently proceeds within the range.

The dope solution may further contain additives such as vinylene carbonate, vinylethylene carbonate, 1-fluoroethylene carbonate, 1-(trifluoromethyl) ethylene carbonate, succinic anhydride, maleic anhydride, propane sultone, and diethyl sulfone.

The dope solution may further contain a flame retardant such as a phosphazene compound. As the phosphazene compound included in the dope solution, it is preferable to use a compound represented by the following general formula (1).

[Chemical Formula 1]

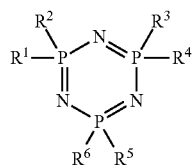

General Equation (1)

In the general Formula (1), $R^1$ to $R^6$ each independently represents a hydrogen atom, a fluorine atom, a monovalent hydrocarbon group having 1 to 12 carbon atoms, a group having at least one kind selected from —O—, —COO—, and —OCO— between carbon-carbon bonds of a monovalent hydrocarbon group having 1 to 12 carbon atoms, a group in which a hydrogen atom or a monovalent hydrocarbon group having 1 to 12 carbon atoms is bonded to a group having at least one kind selected from —O—, —COO—, and —OCO—, or a group in which a part or all of the hydrogen atoms of these groups are substituted with a fluorine atom.

Among $R^1$ to $R^6$ in the general Formula (1), specific examples of groups other than a hydrogen atom and a fluorine atom may include alkyl groups having 1 to 12 carbon atoms such as a methyl group, an ethyl group, a propyl group, a butyl group, a pentyl group, a hexyl group, a heptyl group, an octyl group, a nonyl group, and a decyl group, and a group in which some or all of the hydrogen atoms are substituted with fluorine atoms; alkoxyl groups having 1 to 12 carbon atoms such as a methoxy group, an ethoxy group, a propoxy group, a butoxy group, a pentoxy group, a hexyloxy group, a heptyloxy group, an octyloxy group, and a group in which some or all of the hydrogen atoms are substituted with a fluorine atoms; alkoxy alkyl groups having 1 to 10 carbon atoms such as a methoxymethyl group, an ethoxymethyl group, a propoxymethyl group, a butoxymethyl group, a methoxyethyl group, an ethoxyethyl group, a propoxyethyl group, a methoxypropyl group, an ethoxypropyl group, and a propoxypropyl group, and a group in which some or all of the hydrogen atoms are substituted with fluorine atoms; alkenyl groups such as a vinyl group, a 1-propenyl group, a 2-propenyl group, a 1-butenyl group, a 1-pentenyl group, 3-butenyl group, 3-pentenyl group, 2-fluoroethenyl group, 2,2-difluoroethenyl group, 1,2,2-trifluoroethenyl group, 4,4-difluoro-3-butenyl group, a 3,3-difluoro-2-propenyl group, and a 5,5-difluoro-4-pentenyl group; a carboxyl group; acyl groups such as a formyl group, an acetyl group, a propionyl group, a butyryl group, an isobutyryl group and a valeryl group; aryl groups such as a phenyl group and a group in which some or all of the hydrogen atoms thereof are substituted with fluorine atoms; aryloxy groups such as a phenoxy group, and the like.

Specific examples of the most preferable phosphazene compound may include compounds represented by the following formula (2).

[Chemical Formula 2]

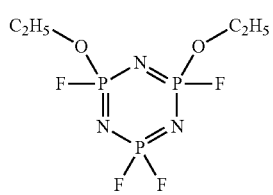

Formula (2)

By including such a phosphazene compound in the electrolytic solution, the flame retardancy of the electrolytic solution can be improved. This is because the phosphazene compound has a property of capturing oxygen necessary for burning the electrolytic solution from its structure. It is possible to control a thermal runaway reaction at the time of doping the alkali metal by using the property.

From the viewpoint of effectively controlling the thermal runaway reaction at the time of doping the alkali metal, the lower limit of the added amount of a flame retardant is preferably 1 part by mass or more, more preferably 3 parts by mass or more, and still more preferably 5 parts by mass or more, with respect to 100 parts by mass of the dope solution. From the viewpoint of obtaining a high-quality doped electrode, the upper limit of the added amount of the flame retardant is preferably 20 parts by mass or less, more preferably 15 parts by mass or less, and still more preferably 10 parts by mass or less, with respect to 100 parts by mass of the dope solution.

4. Method for Manufacturing Electrodes 75 Using Doping System 1

First, as a preparation for manufacturing the electrode 75, the following is performed. The electrode precursor 73 is wound around the supply roll 47. Next, the electrode precursor 73 is drawn out from the supply roll 47 by the conveying roller group, and is fed to the winding roll 49 along the above-mentioned path. Then, the doping tank 3 and the cleaning tank 7 are raised and set at a predetermined position shown in FIG. 1. The dope solution is accommodated in the doping tank 3. The dope solution is as described in "3. Composition of Dope Solution" described above. The cleaning liquid is accommodated in the cleaning tank 7. The cleaning liquid is an organic solvent. As a result, the space 71 of the doping tank 3 is filled with the electrolytic solution. The space 71 of the cleaning tank 7 is filled with the cleaning liquid.

Next, the electrode precursor 73 fed from the supply roll 47 to the winding roll 49 by the conveying roller group is drawn out from the supply roll 47 toward the winding roll 49, and conveyed along the above-mentioned path. When the electrode precursor 73 passes through the inside of the doping tank 3, the active material included in the active material layer 95 is doped with the alkali metal. By doping the active material with the alkali metal, the electrode precursor 73 becomes the electrode 75. The electrode 75 is cleaned in the cleaning tank 7 while being conveyed by the conveying roller group. Finally, the electrode 75 is wound around the winding roll 49.

The electrode 75 manufactured using the doping system 1 may be a cathode or an anode. In the case of manufacturing the cathode, the doping system 1 dopes the cathode active material with the alkali metal, and in the case of manufacturing the anode, the doping system 1 dopes the anode active material with the alkali metal.

The doping system 1 is suitable for manufacturing an anode included in an alkaline ion type capacitor or battery, more suitable for manufacturing an anode included in an alkaline ion type capacitor or secondary battery, and particularly suitable for manufacturing an anode included in a lithium ion capacitor or a lithium ion secondary battery.

When the lithium is occluded in the anode active material of the lithium ion capacitor, the doping amount of the alkali metal is preferably 70 to 95% with respect to a theoretical capacity of the anode active material; and when lithium is occluded in the anode active material of the lithium ion secondary battery, the doping amount of the alkali metal is preferably 10 to 30% with respect to the theoretical capacity of the anode active material.

5. Method for Manufacturing Capacitor

A method for manufacturing a capacitor of the present disclosure is a method for manufacturing a capacitor including a cathode, an anode, and an electrolyte, and includes a process of manufacturing an anode according to "4. Method for Manufacturing Electrodes Using Doping System 1". When manufacturing the capacitor, it is possible to handle the doped electrode under the environment in which a dust removing means is provided.

The capacitor is not particularly limited as long as it is a capacitor using insertion/desorption of alkali metal ions, and examples thereof may include a lithium ion capacitor, a sodium ion capacitor, and the like. Among them, the lithium ion capacitor is preferable.

The basic configuration of the cathode constituting the capacitor may be a general configuration. As the cathode active material, activated carbon is preferably used.

The form of the electrolyte constituting the capacitor is usually a liquid electrolytic solution. The basic configuration of the electrolytic solution is the same as that of the above-described dope solution. In addition, the concentration of the alkali metal ion (alkali metal salt) in the electrolyte is preferably 0.1 mol/L or more, and more preferably in the range of 0.5 to 1.5 mol/L. The electrolyte may have a gel or solid shape for the purpose of preventing leakage.

The capacitor can have a separator disposed between the cathode and the anode to suppress the cathode and the anode from being in physical contact with each other. Examples of the separator may include nonwoven fabric or a porous film made from cellulose rayon, polyethylene, polypropylene, polyamide, polyester, polyimide, and the like.

Example of the structure of the capacitor may include a laminated type cell in which three or more plate-like constituent units each including a cathode, an anode, and a separator therebetween are stacked to form a stacked body and the stacked body is enclosed in an exterior film.

Example of the structure of the capacitor may include a winding type cell in which stripe-shaped constituent units each including a cathode, an anode, and a separator therebetween are wound to form a stacked body and the stacked body is accommodated in a squared or cylindrical container.

The capacitor can be manufactured, for example, by forming a basic structure including at least the anode and the cathode and injecting the electrolyte into its basic structure.

In the case of the lithium ion capacitor, the density of the active material layer 95 is preferably 0.50 to 1.50 g/cc, and particularly preferably 0.70 to 1.20 g/cc.

6. Method for Manufacturing Battery

A method for manufacturing a battery of the present disclosure is a method for manufacturing a battery including a cathode, an anode, and an electrolyte, and includes a process of manufacturing an anode according to "4. Method for Manufacturing Electrodes Using Doping System 1". When manufacturing the battery, it is possible to handle the doped electrode under the environment in which a dust removing means is provided.

The battery is not particularly limited as long as it is a battery that uses insertion/desorption of alkali metal ions, and may be a primary battery or a secondary battery. Examples of the battery include a lithium ion secondary battery, a sodium ion secondary battery, an air battery, and the like. Among them, the lithium ion secondary battery is preferable.

The basic configuration of the cathode constituting the battery can be a general configuration. As the cathode active material, besides those already exemplified, an organic active material such as a nitroxy radical compound or oxygen can also be used.

The configuration of the electrolyte constituting the battery and the configuration of the battery itself are the same as those described above in "5. Method for Manufacturing Capacitors".

The battery can be manufactured, for example, by forming a basic structure including at least the anode and the cathode and injecting the electrolyte into its basic structure.

7. Effect of Doping System 1

(1A) The doping system 1 includes the porous insulating member 53. The porous insulating member 53 is disposed between the electrode precursor 73 and the counter electrode unit 51. By doing so, the electrode precursor 73 is prevented from being in contact with the counter electrode unit 51 or excessively approaching the counter electrode unit. As a result, it becomes easy to control the doping amount of the alkali metal to the active material. Therefore, it is possible to manufacture the high-quality electrode 75.

(1B) The porous insulating member 53 is not in contact with the electrode precursor 73. Therefore, it is possible to suppress the electrode precursor 73 from being damaged due to the contact with the porous insulating member 53. As a result, it is possible to manufacture the high-quality electrode 75.

(1C) The shape of the porous insulating member 53 is a plate shape. Therefore, it is easy to cover the counter electrode unit 51 with the porous insulating member 53. In addition, since the porous insulating member 53 has the plate shape, the porous insulating member 53 and the electrode precursor 73 are easily brought into non-contact with each other.

(1D) The shortest distance d from the surface of the porous insulating member 53 to the electrode precursor 73 is in the range of 0.5 to 100 mm. By doing so, it is possible to further suppress the contact between the porous insulating member 53 and the electrode precursor 73.

(1E) The doping system 1 electrically connects the electrode precursor 73 with the counter electrode unit 51 by using the conductive conveying rollers 15 and 21. By doing so, it is possible to more easily and reliably electrically connect the electrode precursor 73 with the counter electrode unit 51.

(1F) The counter electrode unit 51 includes a conductive substrate 77 and the alkali metal-containing plate 79 disposed thereon. In particular, it is possible to more easily and reliably perform the doping of the alkali metal into the active material by using a material having a volume specific resistance lower than that of the alkali metal-containing plate 79 as the conductive substrate 77.

(1G) The doping system 1 can move the doping tank 3 relatively downward and upward with respect to the counter electrode unit 51 by changing the height of the support 55. As a result, the counter electrode unit 51 is drawn up from the dope solution to easily perform replacement and maintenance.

(1H) The doping system 1 can remove foreign matters and the like in the dope solution by using the circulating filtration unit 57. By doing so, it is possible to prevent the foreign matters from adhering to the electrode 75. As a result, it is possible to manufacture the high-quality electrode 75.

(1I) In the doping system 1, the electrode precursor 73 in the wound state is held in the supply roll 47, and the electrode precursor 73 can be drawn out from the supply roll 47 using the conveying roll group and can be conveyed. As a result, it is possible to improve the productivity of the electrode 75.

(1J) If the doping system 1 is used, the doping amount of the alkali metal to the active material is stabilized, and the high-quality electrode 75 with little damage can be manufactured. In addition, if the electrode 75 is used as the anode, the high-quality capacitor or battery can be manufactured.

Second Embodiment

Since a basic configuration of a second embodiment is the same as that of the first embodiment, the description of the common configuration will be omitted, and the difference will be mainly described. It is to be noted that the same reference numerals as those in the first embodiment indicate the same configurations, and reference is made to the preceding description.

1. Configuration of Electrode Precursor 73

Figure 8:
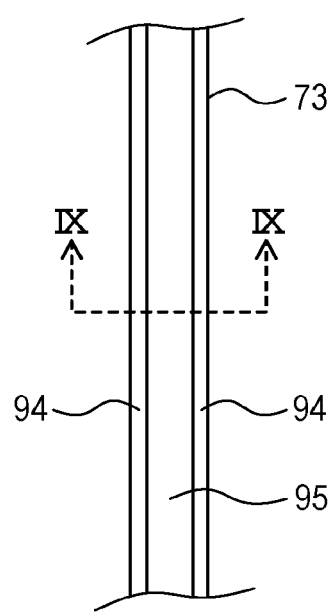
FIG. 8 is a plan view showing a configuration of the electrode precursor.
Figure 9:
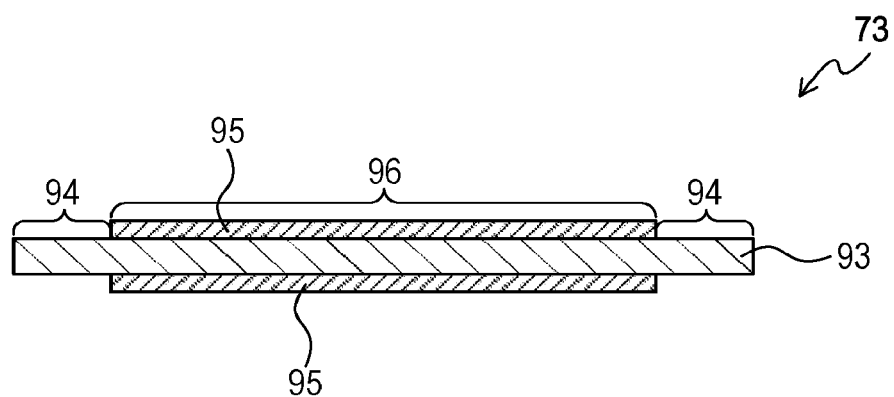
FIG. 9 is a cross-sectional view taken along the line IX-IX in FIG. 8.

A configuration of an electrode precursor 73 will be described with reference to FIGS. 8 and 9. As shown in FIG. 8, the electrode precursor 73 has a stripe shape. As shown in FIG. 9, the electrode precursor 73 includes a stripe-shaped current collector 93 and an active material layers 95 formed on both sides thereof.

At both ends in a width direction of the electrode precursor 73, the active material layer 95 is not formed on the current collector 93, and there is a portion (hereinafter, referred to as a non-formed portion 94) where the current collector 93 is exposed. As shown in FIG. 8, the non-formed portion 94 is continuously present in a fixed width along a longitudinal direction of the electrode precursor 73. The non-formed portion 94 is present on both surfaces of the electrode precursor 73. A portion of the electrode precursor 73 where the active material layer 95 is formed is defined as a central portion 96. The central portion 96 is positioned at the center in the width direction of the electrode precursor 73. In addition, the central portion 96 continuously is present in a fixed width along a longitudinal direction of the electrode precursor 73. In addition, the electrode precursor 73 may have a form in which the non-formed portion 94 is formed only at one end in the width direction.

2. Method for Manufacturing Electrodes 75 Using Doping System 1

First, as a preparation for manufacturing the electrode 75, the following is performed. The electrode precursor 73 is wound around the supply roll 47. Next, the electrode precursor 73 is drawn out from the supply roll 47 by the conveying roller group, and is fed to the winding roll 49 along the above-mentioned path. Then, the doping tank 3 and the cleaning tank 7 are raised and set at a predetermined position shown in FIG. 1. The dope solution is accommodated in the doping tank 3. The dope solution is the same as that of the first embodiment. A cleaning liquid is accommodated in the cleaning tank 7. The cleaning liquid is an organic solvent. As a result, the space 71 of the doping tank 3 is filled with an electrolytic solution. The space 71 of the cleaning tank 7 is filled with the cleaning liquid.

Next, the electrode precursor 73 fed from the supply roll 47 to the winding roll 49 by the conveying roller group is conveyed from the supply roll 47 toward the winding roll 49 along the above-mentioned path. In addition, a current is supplied to the counter electrode unit 51 by using the DC power supply 61 by using the circuit shown in FIG. 4. When the electrode precursor 73 passes through the inside of the doping tank 3, the active material included in the active material layer 95 is doped with alkali metal. By doping the active material with the alkali metal, the electrode precursor 73 becomes the electrode 75. The electrode 75 is cleaned in the cleaning tank 7 while being conveyed by the conveying roller group. Finally, the electrode 75 is wound around the winding roll 49.

A current amount in the counter electrode unit 51 is not particularly limited, and is usually 0.1 A to 100 A. Further, it is preferable that the current amount in the counter electrode unit 51 is gradually increased from a start of energization for 5 seconds. By doing so, an inrush current at the start of energization can be suppressed.

Figure 10:
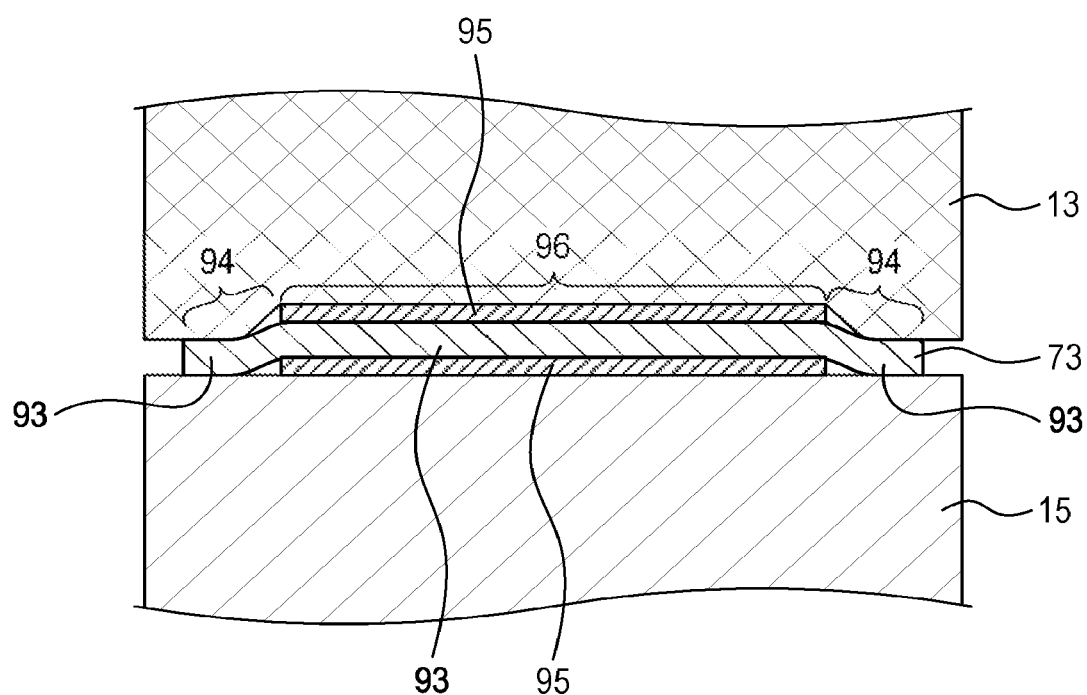
FIG. 10 is a cross-sectional view showing an aspect in which a conveying roller presses an electrode precursor in a direction of a conveying roller.

When the conveying roller group conveys the electrode precursor 73, the conveying roller 13 presses the electrode precursor 73 in the direction of the conveying roller 15. In this case, as shown in FIG. 10, the central portion 96 of the electrode precursor 73 is opposite to the vicinity of the center in the width direction of the conveying roller 13, and the non-formed portion 94 is opposite to the vicinity of both ends in the width direction of the conveying roller 13. The central portion 96 is thicker than the non-formed portion 94 by the amount of the active material layer 95.

Since the conveying roller 13 is made of an elastomer which is an elastic body, the conveying roller 13 is elastically deformed according to the shape of the electrode precursor 73. That is, the conveying roller 13 is elastically deformed so as to largely depress the vicinity of the center in the width direction, as compared with the vicinity of both ends. As a result, not only the central portion 96 but also the non-formed portion 94 is pressed against the conveying roller 15 by the conveying roller 13. As a result, the current collector 93 exposed in the non-formed portion 94 and the conveying roller 15 reliably contact with each other.

The conveying roller 19 also presses the electrode precursor 73 in the direction of the conveying roller 21 as in the case of the conveying roller 13. As a result, the current collector 93 exposed in the non-formed portion 94 and the conveying roller 21 reliably contact with each other.

3. Effect of Doping System 1

According to the second embodiment described above, the effects of the first embodiment described above are exerted, and the following effects are further exerted.

(2A) The doping system 1 includes elastically deformable conveying rollers 13 and 19 which press the electrode precursor 73 in the direction of the conveying rollers 15 and 21. The conveying rollers 13 and 19 are elastically deformed according to the shape of the electrode precursor 73, and not only the central portion 96 but also the non-formed portion 94 are pressed against the conveying rollers 15 and 21. As a result, the current collector 93 exposed in the non-formed portion 94 and the conveying rollers 15 and 21 reliably contact with each other. By bringing the non-formed portion 94 having a smaller electric resistance than that of the central portion 96 where the active material layer 95 is formed into contact with the conveying rollers 15 and 21 in the largest possible area, the electrical connection between the electrode precursor 73 and the counter electrode unit 51 is stabilized.

(2B) The conveying rollers 13 and 19 are rollers made of an elastomer, including the surface thereof. As a result, the electrical connection between the current collector 93 exposed in the non-formed portion 94 and the conveying rollers 15 and 21 is further stabilized.

Third Embodiment

Since a basic configuration of a third embodiment is the same as that of the second embodiment, the description of the common configuration will be omitted, and the difference will be mainly described. It is to be noted that the same reference numerals as those in the second embodiment indicate the same configurations, and reference is made to the preceding description.

1. Difference from Second Embodiment

Figure 11:
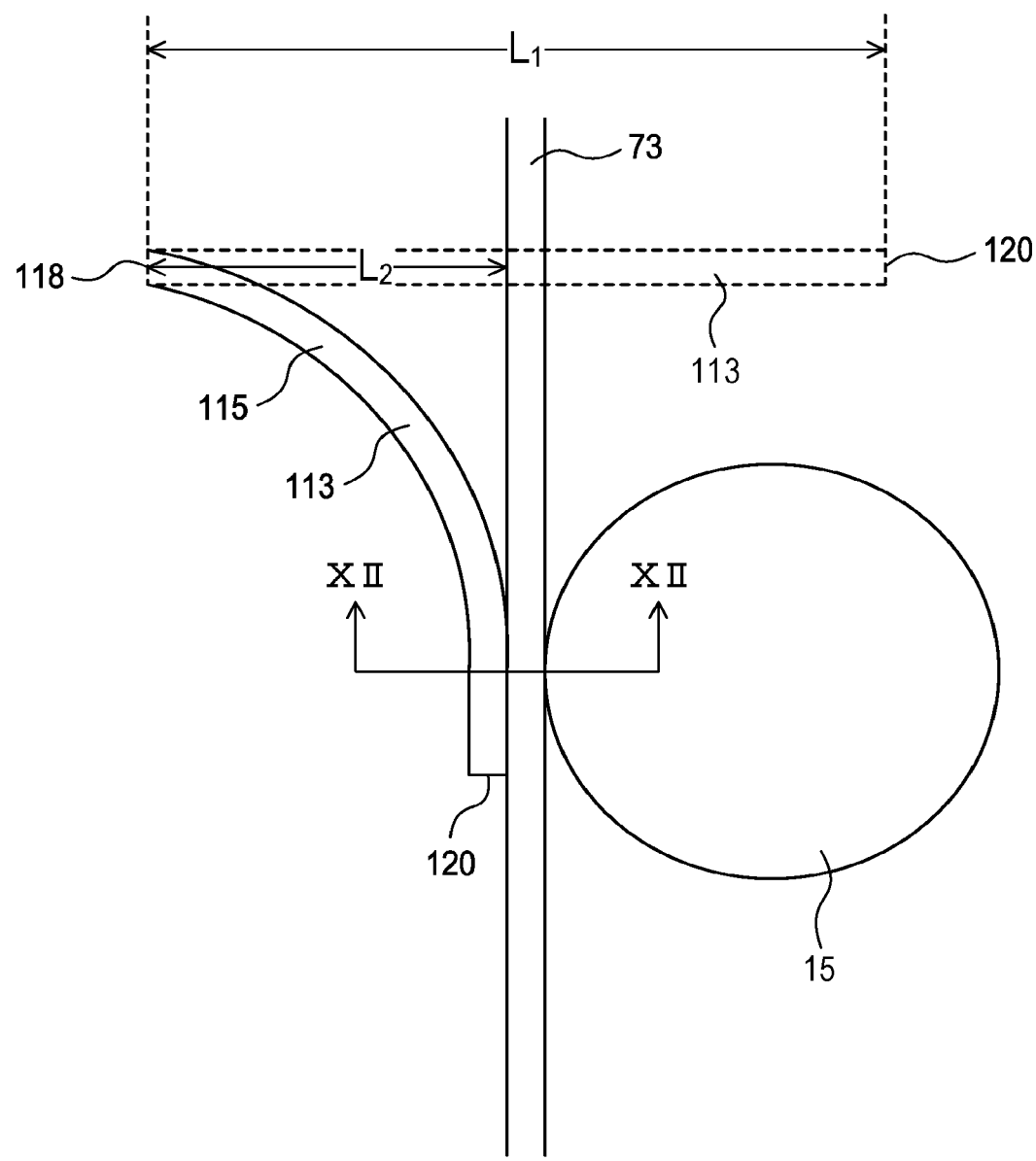
FIG. 11 is a side view showing a configuration of a pressing unit.
Figure 12:
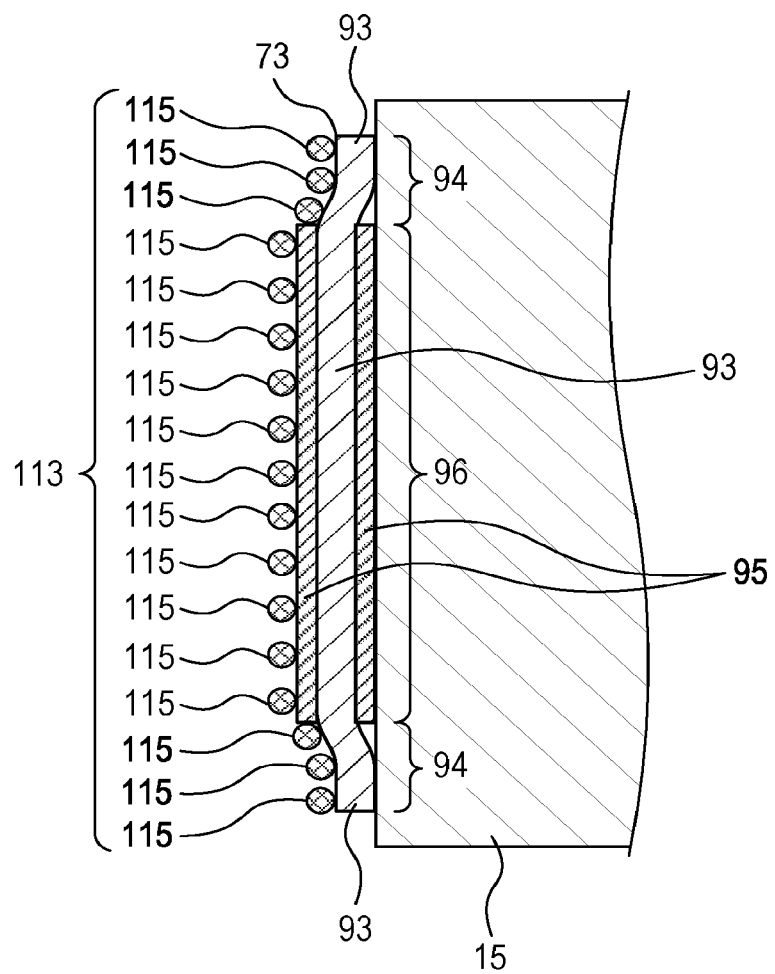
FIG. 12 is a cross-sectional view taken along the line XII-XII in FIG. 11.

A doping system 1 of the third embodiment includes a pressing unit 113 shown in FIGS. 11 and 12, instead of the conveying roller 13. The pressing unit 113 is at a position opposite to the conveying roller 15 having the electrode precursor 73 sandwiched therebetween. The pressing unit 113 is a comb-like member in which a plurality of rod-shaped members 115 made of an elastomer are arranged. The plurality of rod-shaped members 115 are arranged in a width direction (a direction orthogonal to a page space in FIG. 11, a lateral direction in FIG. 12) of the electrode precursor 73. A root 118 of the rod-shaped member 115 is fixed at a predetermined position by a fixing member (not shown). The root 118 is on a side of the rod-shaped member 115 remote from the conveying roller 15.

In contrast, if the electrode precursor 73 and the conveying roller 15 are not present, the pressing unit 113 is at a position indicated by a dotted line in FIG. 11. That is, the pressing unit 113 extends in a horizontal direction without being greatly bent. In this case, a leading end 120 of the rod-shaped member 115 is positioned higher than the conveying roller 15. Further, a length L1 of the rod-shaped member 115 is larger than a horizontal distance L2 from the root 118 to the electrode precursor 73.

When the doping system 1 is used, the pressing unit 113 has a shape indicated by a solid line in FIG. 11. In this case, the pressing unit 113 is elastically deformed to face the leading end 120 downward, and is pressed against the electrode precursor 73. The pressing unit 113 presses the electrode precursor 73 in the direction of the conveying roller 15 by a restoring force by which the pressing unit 113 returns to the shape indicated by the dotted line in FIG. 11.

More specifically, as shown in FIG. 12, each of the plurality of rod-shaped members 115 independently presses portions of the electrode precursor 73, which are in contact with the plurality of rod-shaped members, in the direction of the conveying roller 15. That is, a portion of the plurality of rod-shaped members 115, which is in contact with a central portion 96, presses the central portion 96 in the direction of the conveying roller 15, and portions of the plurality of rod-shaped members 115, which are in contact with the non-formed portion 94, press the non-formed portion 94 in the direction of the conveying roller 15. As a result, the current collector 93 exposed in the non-formed portion 94 and the conveying roller 15 reliably contact with each other.

As the elastomer constituting the pressing unit 113, the same elastomer as the elastomer constituting the conveying rollers 13 and 19 in the second embodiment can be used.

Further, if a thickness of the plurality of rod-shaped members 115 constituting the pressing unit 113 is adjusted, even if the rod-shaped member 115 made of resins such as polyethylene and polypropylene is used in addition to the elastomer, the pressing unit 113 can be elastically deformed.

Further, the doping system 1 includes the pressing unit 113 instead of the conveying roller 19. The pressing unit 113 presses the electrode precursor 73 in the direction of the conveying roller 21.

2. Effect of Doping System 1

According to the third embodiment described above, in addition to the above-described effects of the second embodiment, the following effects can be obtained.

(3A) The doping system 1 includes the elastically deformable pressing unit 113 which presses the electrode precursor 73 in the direction of the conveying rollers 15 and 21. The pressing unit 113 is elastically deformed according to the shape of the electrode precursor 73, and not only the central portion 96 but also the non-formed portion 94 is pressed against the conveying rollers 15 and 21. As a result, the current collector 93 exposed in the non-formed portion 94 and the conveying roller 15 reliably contact with each other. By bringing the non-formed portion 94 having a smaller electric resistance than that of the central portion 96 where the active material layer 95 is formed into contact with the conveying rollers 15 and 21 in the largest possible area, the electrical connection between the electrode precursor 73 and the counter electrode unit 51 is stabilized.

Fourth Embodiment

1. Configuration of Doping System 1

Figure 13:
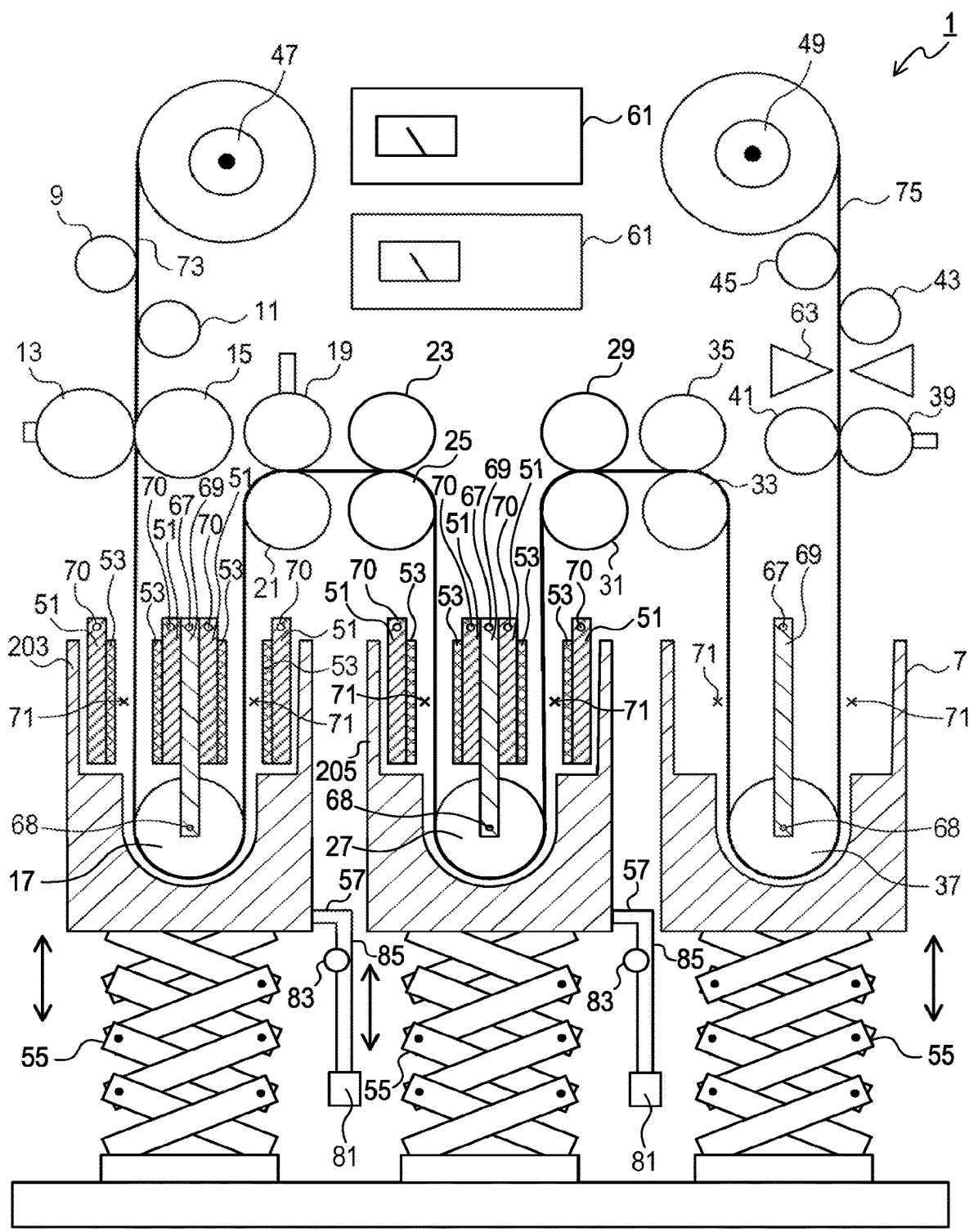
FIG. 13 is an explanatory diagram showing a configuration of a doping system.

A configuration of a doping system 1 will be described with reference to FIGS. 13 to 15. As shown in FIG. 13, the doping system 1 includes electrolytic solution tanks 203 and 205, a cleaning tank 7, conveying rollers 9, 11, 13, 15, 17, 19, 21, 23, 25, 27, 29, 31, 33, 35, 37, 39, 41, 43, and 45 (hereinafter, collectively referred to as a conveying roller group), a supply roll 47, a winding roll 49, a counter electrode unit 51, a porous insulating member 53, a support 55, a circulating filtration unit 57, two DC power supplies 61, and a blower 63.

Figure 14:
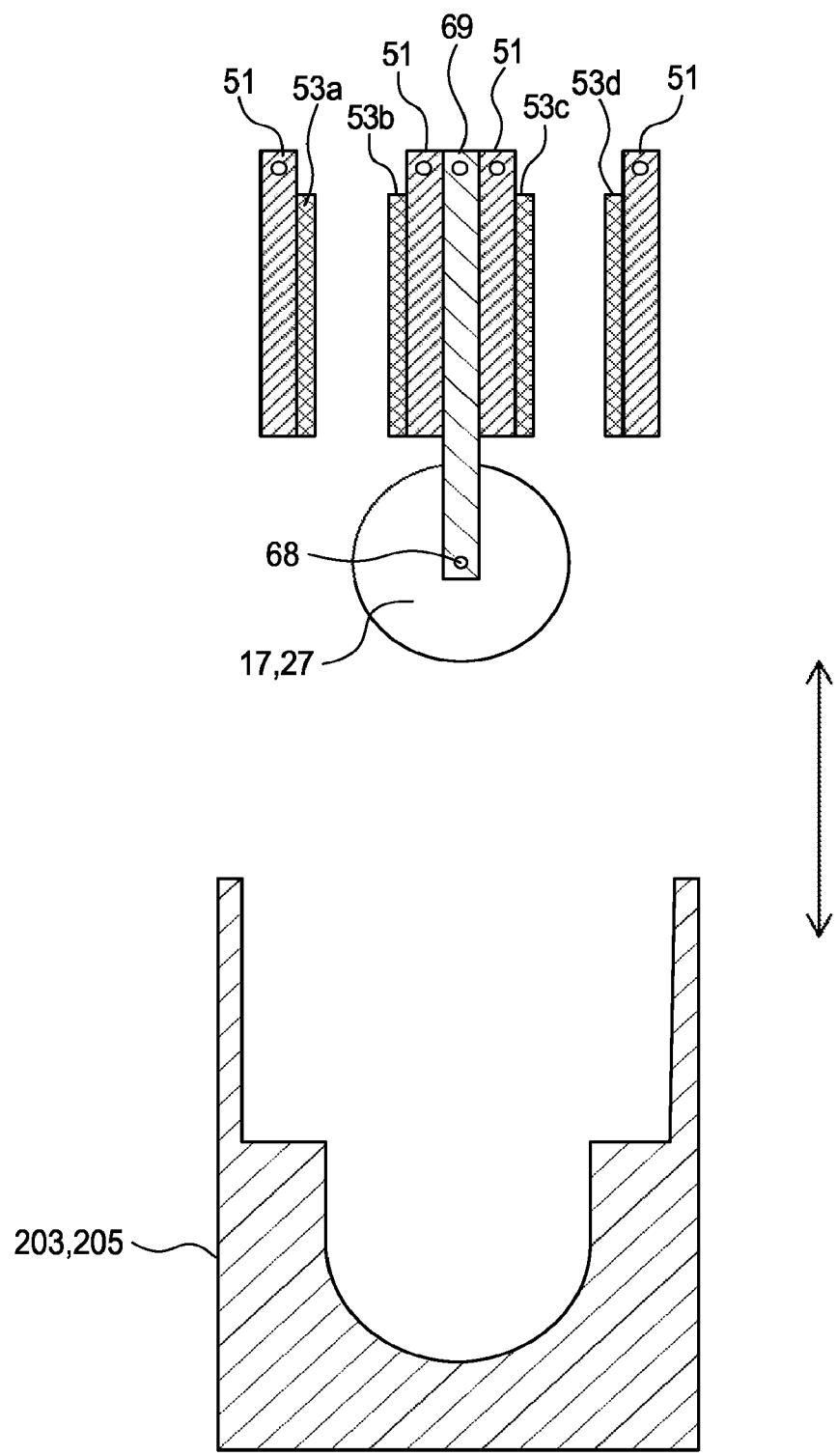
FIG. 14 is an explanatory diagram showing a state in which a doping tank moves downward.

As shown in FIGS. 13 and 14, the electrolytic solution tank 203 is a squared tank whose upper part is open. A bottom surface of the electrolytic solution tank 203 has a substantially U-shaped cross-sectional shape. In the electrolytic solution tank 203, there are the partition plate 69, the four counter electrode units 51, the four porous insulating members 53, and the conveying roller 17. As shown in FIG. 14, the four porous insulating members 53 are provided with 53a, 53b, 53c, and 53d.

The partition plate 69 is supported by a support rod 67 which penetrates through an upper end thereof. The support rod 67 is fixed to a wall or the like (not shown). A part of the partition plate 69 excluding the upper end is in the electrolytic solution tank 203. The partition plate 69 extends in a vertical direction and divides the inside of the electrolytic solution tank 203 into two spaces. The conveying roller 17 is attached to a lower end of the partition plate 69. The partition plate 69 and the conveying roller 17 are supported by support rods 68 penetrating therethrough. A vicinity of the lower end of the partition plate 69 is cut out not to contact with the conveying roller 17. There is a space between the conveying roller 17 and a bottom surface of the electrolytic solution tank 203.

The four counter electrode units 51 are each supported by support rods 70 penetrating through their upper ends, and extend in the vertical direction. The support rod 70 is fixed to a wall (not shown) or the like. A part of the counter electrode unit 51 excluding the upper end is in the electrolytic solution tank 203. Two of the four counter electrode units 51 are disposed to have the partition plate 69 sandwiched between both sides thereof. The remaining two counter electrode units 51 are disposed along an inner side surface of the electrolytic solution tank 203.

The space 71 is present between the counter electrode unit 51 disposed on the partition plate 69 side and the counter electrode unit 51 disposed along the inner side surface of the electrolytic solution tank 203. The counter electrode unit 51 is connected to a positive pole of the DC power supply 61. The detailed configuration of the counter electrode unit 51 will be described later.

The porous insulating member 53 is attached to a surface of the space 71 side in each counter electrode unit 51. The detailed configuration of the porous insulating member 53 will be described later.

Basically, the cleaning tank 7 has the same configuration as the electrolytic solution tank 203. However, the counter electrode unit 51 and the porous insulating member 53 are not present inside the cleaning tank 7.

Basically, the electrolytic solution tank 205 has the same configuration as the electrolytic solution tank 203. However, the conveying roller 17 is not present in the electrolytic solution tank 205, but the conveying roller 27 is present in the electrolytic solution tank 205.

The conveying roller group conveys the electrode precursor 73, which will be described later, along a certain path. The path is a path from the supply roll 47 to the winding roll 49 by sequentially passing through the inside of the electrolytic solution tank 203, the inside of the electrolytic solution tank 205, and the inside of the cleaning tank 7.

Among the paths, a portion passing through the inside of the electrolytic solution tank 203 is a path which first moves downward in the space 71 positioned between the porous insulating member 53a attached along the inner side surface of the electrolytic solution tank 203 and the porous insulating member 53b on the partition plate 69 side opposite thereto, then changes its own moving direction to an upward direction by the conveying roller 17, and finally moves upward in the space 71 positioned between the porous insulating member 53d attached along the inner side surface of the electrolytic solution tank 203 and the porous insulating member 53c on the partition plate 69 side opposite thereto.

In addition, among the paths, a portion passing through the inside of the electrolytic solution tank 205 is a path which first moves downward in the space 71 positioned between the porous insulating member 53a attached along the inner side surface of the electrolytic solution tank 205 and the porous insulating member 53b on the partition plate 69 side opposite thereto, then changes its own moving direction to an upward direction by the conveying roller 27, and finally moves upward in the space 71 positioned between the porous insulating member 53d attached along the inner side surface of the electrolytic solution tank 205 and the porous insulating member 53c on the partition plate 69 side opposite thereto.

Further, among the above paths, a portion passing the inside of the cleaning tank 7 is a path which first moves downward between the inner side surface of the cleaning tank 7 and the partition plate 69, then changes its own moving direction upward by the conveying roller 37, and finally moves upward between the inner side surface of the cleaning tank 7 and the partition plate 69.

Among the conveying roller groups, the conveying rollers 15, 21, 25, and 29 are made of a conductive material. In addition, the conveying rollers 15, 21, 25, and 29 are connected to a negative pole of the DC power supply 61. The conveying roller 13 presses the electrode precursor 73 in the direction of the conveying roller 15. The conveying roller 19 presses the electrode precursor 73 in the direction of the conveying roller 21. The conveying roller 23 presses the electrode precursor 73 in the direction of the conveying roller 25. The conveying roller 31 presses the electrode precursor 73 in the direction of the conveying roller 29. The conveying roller group corresponds to the conveying unit. The conveying rollers 15, 21, 25, and 29 correspond to the conductive conveying rollers. The conveying rollers 13, 19, 23, and 31 correspond to the pressing units.

The conveying rollers 13, 19, 23, and 31 are made of an elastomer excluding a bearing portion. That is, the conveying rollers 13, 19, 23, and 31 are made of an elastomer, including the surfaces thereof. The elastomer is an example of an elastic body. Therefore, the conveying rollers 13, 19, 23, and 31 can be elastically deformed.

The elastomer may be natural rubber or synthetic rubber. Examples of the elastomer may include EPDM, EPR, SBR, NBR, isoprene rubber, butadiene rubber, acrylic rubber, chloroprene rubber, silicone rubber, urethane rubber, fluororubber and the like.

The supply roll 47 has the electrode precursor 73 wound around its outer periphery. That is, the supply roll 47 holds the electrode precursor 73 in the wound state. The conveying roller group draws out and conveys the electrode precursor 73 held by the supply roll 47. The supply roll 47 corresponds to a holding unit.

The winding roll 49 winds up and stores the electrode 75 conveyed by the conveying roller group. It is to be noted that the electrode 75 is manufactured by doping the electrode precursor 73 with alkali metal in the electrolytic solution tanks 203 and 205.

The counter electrode unit 51 is accommodated in the electrolytic solution tanks 203 and 205 as described above. The counter electrode unit 51 is the same as that of the first embodiment. The porous insulating member 53 is the same as that of the first embodiment.

The support 55 supports the electrolytic solution tanks 203 and 205 and the cleaning tank 7 from below. A height of the support 55 can be changed. If the support 55 is lowered while the positions in the vertical direction of the partition plate 69, the counter electrode unit 51, and the porous insulating member 53 are maintained, as shown in FIG. 14, the electrolytic solution tanks 203 and 205 can be moved relatively downward with respect to the partition plate 69, the counter electrode unit 51, and the porous insulating member 53. In addition, if the support 55 is raised, the electrolytic solution tanks 203 and 205 can be moved relatively upward with respect to the partition plate 69, the counter electrode unit 51, and the porous insulating member 53. The support 55 corresponds to a tank moving unit.

The circulating filtration unit 57 is provided in the electrolytic solution tanks 203 and 205, respectively. The circulating filtration unit 57 includes a filter 81, a pump 83, and a pipe 85.

In the circulating filtration unit 57 provided in the electrolytic solution tank 203, the pipe 85 is a circulating pipe which comes out from the electrolytic solution tank 203, sequentially passes through the pump 83 and the filter 81, and returns to the electrolytic solution tank 203. The dope solution in the electrolytic solution tank 203 is circulated inside the pipe 85 and the filter 81 by a driving force of the pump 83 and returns to the electrolytic solution tank 203 again. At this time, foreign matters and the like in the dope solution are filtered by the filter 81. Examples of the foreign matters include foreign matters precipitated from the dope solution, foreign matters generated from the electrode precursor 73, and the like.

In FIGS. 13 and 14, the description of the dope solution is omitted for the sake of convenience. The same also goes for FIGS. 16 and 18 to be described later.

In the circulating filtration unit 57 provided in the electrolytic solution tank 205, the pipe 85 is a circulating pipe which comes out from the electrolytic solution tank 205, sequentially passes through the pump 83 and the filter 81, and returns to the electrolytic solution tank 205. The pipe 85 is preferably a flexible pipe that can follow up the vertical movement of the doping tank 3. The dope solution in the electrolytic solution tank 205 is circulated inside the pipe 85 and the filter 81 by a driving force of the pump 83 and returns to the electrolytic solution tank 205 again. The circulating filtration unit 57 provided in the electrolytic solution tank 205 also has the same action and effect as the circulating filtration unit 57 provided in the electrolytic solution tank 203.

Examples of the material of the filter 81 may include resins such as polypropylene and polytetrafluoroethylene. A hole diameter of the filter 81 can be appropriately set, and can be, for example, in the range of 30 to 50 μm.

Figure 15:
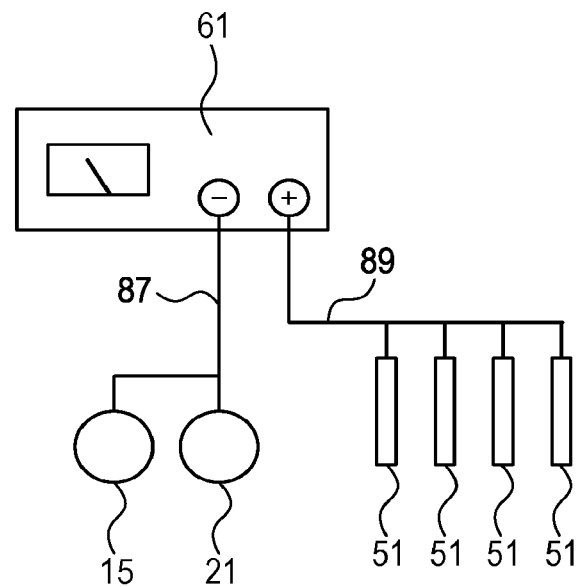
FIG. 15 is an explanatory diagram showing an electrical connection between a conveying roller, a counter electrode unit, and a DC power supply.
Figure 15:
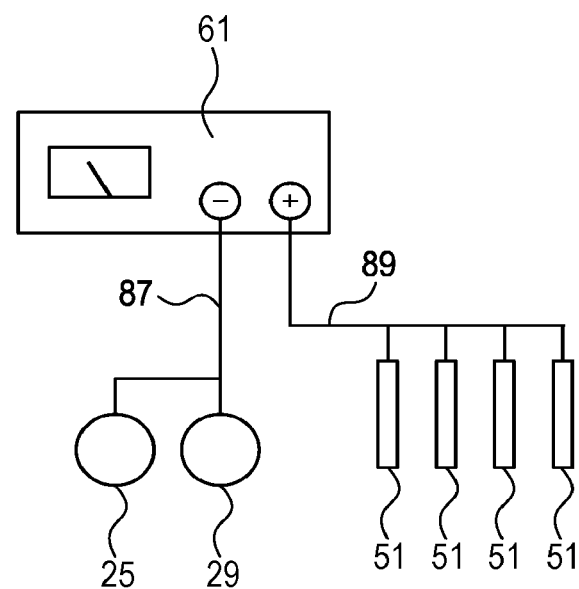

As shown in FIG. 15, the negative terminal of one (hereinafter, referred to as one DC power supply 61) of the two DC power supplies 61 is connected to the conveying rollers 15 and 21 via the cable 87. In addition, a positive terminal of the one DC power supply 61 is connected to a total of four counter electrode units 51, respectively, via a cable 89. The four counter electrode units 51 are the counter electrode units 51 in the electrolytic solution tank 203. Since the electrode precursor 73 is in contact with the conductive conveying rollers 15 and 21 and the electrode precursor 73 and the counter electrode unit 51 in the electrolytic solution tank 203 are in the dope solution as the electrolytic solution, the electrode precursor 73 and the counter electrode unit 51 in the electrolytic solution tank 203 are electrically connected to each other.

As shown in FIG. 15, the negative terminal of the other one (hereinafter, referred to as the other DC power supply 61) of the two DC power supplies 61 is connected to the conveying rollers 25 and 29 via the cable 87. In addition, a positive terminal of the other DC power supply 61 is connected to a total of four counter electrode units 51, respectively, via the cable 89. The four counter electrode units 51 are the counter electrode units 51 in the electrolytic solution tank 205. Since the electrode precursor 73 is in contact with the conductive conveying rollers 25 and 29 and the electrode precursor 73 and the counter electrode unit 51 in the electrolytic solution tank 205 are in the dope solution as the electrolytic solution, the electrode precursor 73 and the counter electrode unit 51 in the electrolytic solution tank 205 are electrically connected to each other. The two DC power supplies 61, the cables 87 and 89, and the conveying rollers 15, 21, 25, and 29 correspond to the connection unit.

The blower 63 blows a gas to the electrode 75 that has come out from the cleaning tank 7 to vaporize the cleaning liquid, thereby drying the electrode 75. The gas to be used is preferably an inert gas against the active material doped with the alkali metal. Examples of such gases may include helium gas, neon gas, argon gas, and dehumidified air from which moisture has been removed, and the like.

2. Configuration of Electrode Precursor 73

The configuration of the electrode precursor 73 is the same as that of the second embodiment.

3. Composition of Dope Solution

At the time of using the doping system 1, the dope solution containing alkali metal ions is accommodated in the electrolytic solution tanks 203 and 205. The dope solution is the same as that of the first embodiment.

4. Method for Manufacturing Electrodes 75 Using Doping System 1

First, as a preparation for manufacturing the electrode 75, the following is performed. The electrode precursor 73 is wound around a supply roll 47. The dope solution is accommodated in the electrolytic solution tanks 203 and 205. The dope solution is as described in "3. Composition of Dope solution" described above. The cleaning liquid is accommodated in the cleaning tank 7. The cleaning liquid is an organic solvent. As a result, the space 71 of the electrolytic solution tanks 203 and 205 is filled with the electrolytic solution. The space 71 of the cleaning tank 7 is filled with the cleaning liquid.

It is preferable that the composition of the dope solution accommodated in the electrolytic solution tank 203 is different from the composition of the dope solution accommodated in the electrolytic solution tank 205. In this case, it is possible to efficiently manufacture the higher-quality electrode 75.

As an aspect in which the compositions of the dope solutions in the electrolytic solution tanks 203 and 205 are different from each other, for example, the concentration of the SEI film forming component in the dope solution accommodated in the electrolytic solution tank 203 may be higher than that of the SEI film forming component in the dope solution accommodated in the electrolytic solution tank 205. The fact that the composition of the dope solution accommodated in the electrolytic solution tank 203 is different from the composition of the dope solution accommodated in the electrolytic solution tank 205 means that the doping conditions of the active material with the alkali metal in the first doping process and the second doping process are different from each other.

Next, the electrode precursor 73 is drawn out from the supply roll 47 by the conveying roller group, and is conveyed along the above-mentioned path. When the electrode precursor 73 passes through the inside of the electrolytic solution tanks 203 and 205, the active material included in the active material layer 95 is doped with the alkali metal.

The electrolytic solution tank 203 corresponds to a first electrolytic solution tank. The electrolytic solution tank 205 corresponds to a second electrolytic solution tank. When the electrode precursor 73 passes through the electrolytic solution tank 203, the process of doping the active material included in the active material layer 95 with the alkali metal corresponds to the first doping process. When the electrode precursor 73 passes through the electrolytic solution tank 205, the process of doping the active material included in the active material layer 95 with the alkali metal corresponds to the second doping process.

It is preferable that the current density in the first doping process performed in the electrolytic solution tank 203 is different from the current density in the second doping process performed in the electrolytic solution tank 205. In this case, it is further possible to efficiently manufacture the higher-quality electrode 75.

As an aspect in which the current densities are different in the first doping process and the second doping process, for example, the current density in the first doping process may be higher or lower than the current density in the second doping process. The fact that the current density in the first doping process is different from the current density in the second doping process means that the doping conditions of the active material with the alkali metal in the first doping process and the second doping process are different from each other.

In the case where the counter electrode unit 51 accommodated in the electrolytic solution tanks 203 and 205 includes a conductive substrate and an alkali metal-containing plate disposed on the conductive substrate, a weight of the alkali metal included in the alkali metal-containing plate to be accommodated in the electrolytic solution tank 203 may be different from that of the alkali metal included in the alkali metal-containing plate to be accommodated in the electrolytic solution tank 205.

As an aspect in which the weight of the alkali metal included in the alkali metal-containing plate to be accommodated in the electrolytic solution tank 203 may be different from that of the alkali metal included in the alkali metal-containing plate to be accommodated in the electrolytic solution tank 205, for example, the weight of the alkali metal included in the alkali metal-containing plate to be accommodated in the electrolytic solution tank 203 may be larger or smaller than that of the alkali metal included in the alkali metal-containing plate to be accommodated in the electrolytic solution tank 205. The fact that the weight of the alkali metal included in the alkali metal-containing plate accommodated in the electrolytic solution tank 203 is different from the weight of the alkali metal included in the alkali metal-containing plate accommodated in the electrolytic solution tank 205 means that the doping conditions of the active material with the alkali metal in the first doping process and the second doping process are different from each other.

By doping the active material with the alkali metal, the electrode precursor 73 becomes the electrode 75. The electrode 75 is cleaned in the cleaning tank 7 while being conveyed by the conveying roller group. Finally, the electrode 75 is wound around the winding roll 49.

When the conveying roller group conveys the electrode precursor 73, the conveying roller 13 presses the electrode precursor 73 in the direction of the conveying roller 15. In this case, as shown in FIG. 10, the central portion 96 of the electrode precursor 73 is opposite to the vicinity of the center in the width direction of the conveying roller 13, and the non-formed portion 94 is opposite to the vicinity of both ends in the width direction of the conveying roller 13. The central portion 96 is thicker than the non-formed portion 94 by the amount of the active material layer 95.

Since the conveying roller 13 is made of an elastomer which is an elastic body, the conveying roller 13 is elastically deformed according to the shape of the electrode precursor 73. That is, the conveying roller 13 is elastically deformed so as to largely depress the vicinity of the center in the width direction, as compared with the vicinity of both ends. As a result, not only the central portion 96 but also the non-formed portion 94 is pressed against the conveying roller 15 by the conveying roller 13. As a result, the current collector 93 exposed in the non-formed portion 94 and the conveying roller 15 reliably contact with each other.

The conveying roller 19 also presses the electrode precursor 73 in the direction of the conveying roller 21 as in the case of the conveying roller 13. As a result, the current collector 93 exposed in the non-formed portion 94 and the conveying roller 21 reliably contact with each other.

The conveying roller 23 also presses the electrode precursor 73 in the direction of the conveying roller 25 as in the case of the conveying roller 13. As a result, the current collector 93 exposed in the non-formed portion 94 and the conveying roller 25 reliably contact with each other.

The conveying roller 31 also presses the electrode precursor 73 in the direction of the conveying roller 29 as in the case of the conveying roller 13. As a result, the current collector 93 exposed in the non-formed portion 94 and the conveying roller 29 reliably contact with each other.

The electrode 75 manufactured by using the doping system 1 may be a cathode or an anode. In the case of manufacturing the cathode, the doping system 1 dopes the cathode active material with the alkali metal, and in the case of manufacturing the anode, the doping system 1 dopes the anode active material with the alkali metal.

The doping system 1 is suitable for manufacturing an anode included in an alkaline ion type capacitor or battery, more suitable for manufacturing an anode included in an alkaline ion type capacitor or secondary battery, and particularly suitable for manufacturing an anode included in a lithium ion capacitor or a lithium ion secondary battery.

When the lithium is occluded in the anode active material of the lithium ion capacitor, the doping amount of the alkali metal is preferably 70 to 95% with respect to a theoretical capacity of the anode active material; and when lithium is occluded in the anode active material of the lithium ion secondary battery, the doping amount of the alkali metal preferably 10 to 30% with respect to the theoretical capacity of the anode active material.

5. Method for Manufacturing Capacitor

A method for manufacturing a capacitor of the present disclosure is a method for manufacturing a capacitor including a cathode, an anode, and an electrolyte, and includes a process of manufacturing an anode according to "4. Method for Manufacturing Electrodes Using Doping System 1". As the capacitor, the same capacitor as that of the first embodiment can be used.

6. Method for Manufacturing Battery

A method for manufacturing a battery of the present disclosure is a method for manufacturing a battery including a cathode, an anode, and an electrolyte, and includes a process of manufacturing an anode according to "4. Method for Manufacturing Electrodes Using Doping System 1". As the battery, the same battery as that of the first embodiment can be used.

7. Effect of Doping System 1

According to the fourth embodiment described above, in addition to the above-described effects of the third embodiment, the following effects can be obtained.

(4A) The doping system 1 includes the plurality of electrolytic solution tanks 203 and 205. In addition, each of the electrolytic solution tanks 203 and 205 is provided with the counter electrode unit 51, and the counter electrode unit 51 is electrically connected to the electrode precursor 73. Therefore, it is possible to efficiently manufacture the high-quality electrode 75.

(4B) If the doping system 1 is used, the first doping process can be performed in the electrolytic solution tank 203 and the second doping process can be performed in the electrolytic solution tank 205. In the first doping process and the second doping process, the doping conditions of the active material with the alkali metal can be different from each other. Therefore, it is possible to efficiently manufacture the high-quality electrode 75.

(4C) If the doping system 1 is used, the composition of the dope solution accommodated in the electrolytic solution tank 203 and the composition of the dope solution accommodated in the electrolytic solution tank 205 can be different from each other. Therefore, it is possible to efficiently manufacture the high-quality electrode 75.

(4D) If the doping system 1 is used, the current density in the first doping process and the current density in the second doping process can be different from each other. Therefore, it is possible to efficiently manufacture the high-quality electrode 75.

(4E) If the doping system 1 is used, when the counter electrode unit 51 accommodated in the electrolytic solution tanks 203 and 205 includes the conductive substrate and the alkali metal-containing plate disposed on the conductive substrate, the weight of the alkali metal included in the alkali metal-containing plate to be accommodated in the electrolytic solution tank 203 may be different from that of the alkali metal included in the alkali metal-containing plate to be accommodated in the electrolytic solution tank 205. Therefore, it is possible to efficiently manufacture the high-quality electrode 75.

Fifth Embodiment

Since a basic configuration of a fifth embodiment is the same as that of the fourth embodiment, the description of the common configuration will be omitted, and the difference will be mainly described. It is to be noted that the same reference numerals as those in the fourth embodiment indicate the same configuration, and reference is made to the preceding description.

1. Difference from Fourth Embodiment

Figure 16:
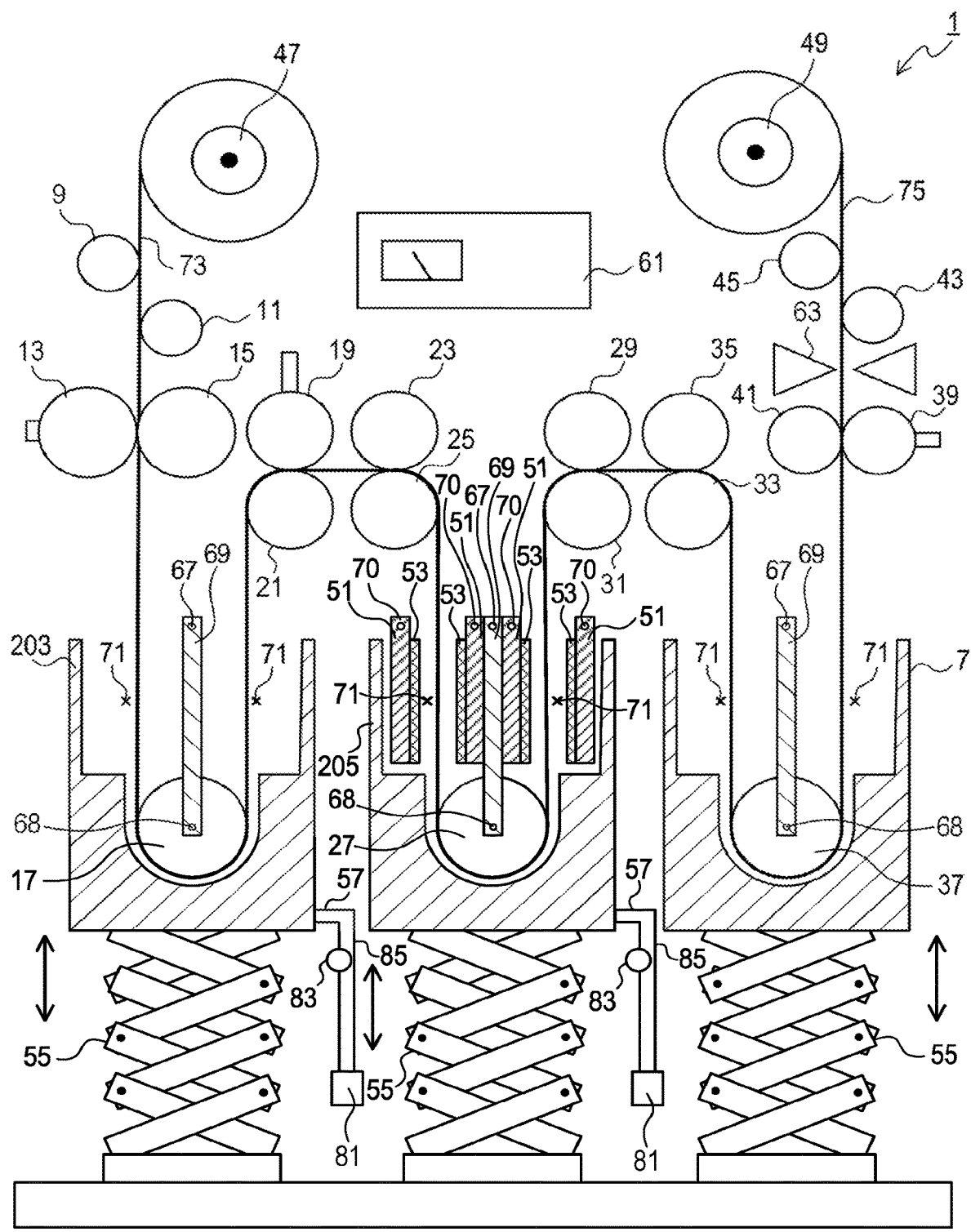
FIG. 16 is an explanatory diagram showing a configuration of a doping system.

As shown in FIG. 16, a counter electrode unit 51 and a porous insulating member 53 are not provided in an electrolytic solution tank 203. A composition of a dope solution accommodated in the electrolytic solution tank 203 may be the same as or different from a composition of a dope solution accommodated in an electrolytic solution tank 205.

Figure 17:
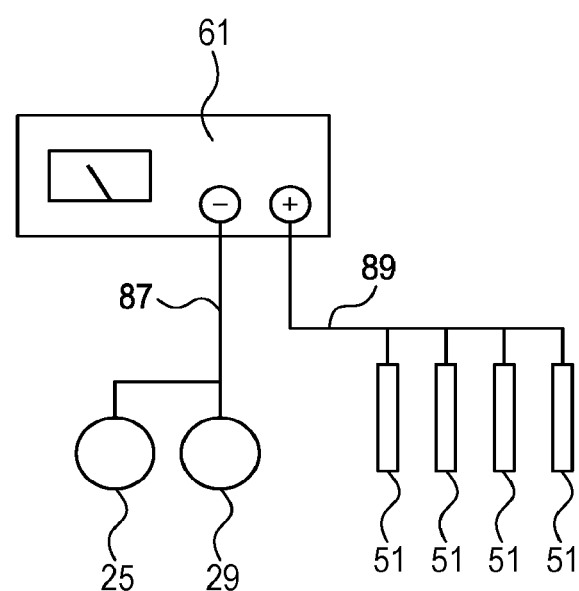
FIG. 17 is an explanatory diagram showing an electrical connection between a conveying roller, a counter electrode unit, and a DC power supply.

As shown in FIG. 17, as a conveying roller connected to a negative terminal of a DC power supply 61, conveying rollers 15 and 21 are not provided. Four counter electrode units 51 connected to a positive terminal of the DC power supply 61 are provided in the electrolytic solution tank 205.

In the case of manufacturing the electrode 75 using the doping system 1 of the fifth embodiment, no doping is performed when the electrode precursor 73 is in the electrolytic solution tank 203. When the electrode precursor 73 is in the electrolytic solution tank 203, the dope solution permeates into an active material layer 95.

2. Effect of Doping System 1

According to the fifth embodiment described above, in addition to the above-described effects of the fourth embodiment, the following effects can be obtained.

(5A) In the doping system 1, the dope solution can be permeated into the entire active material layer 95 in the electrolytic solution tank 203 in advance. Therefore, a time required for doping performed in the electrolytic solution tank 205 can be shortened, and moreover uniform doping becomes possible.

Sixth Embodiment

Since a basic configuration of a sixth embodiment is the same as that of the fourth embodiment, the description of the common configuration will be omitted, and the difference will be mainly described. It is to be noted that the same reference numerals as those in the fourth embodiment indicate the same configuration, and reference is made to the preceding description.

1. Difference from Fourth Embodiment

Figure 18:
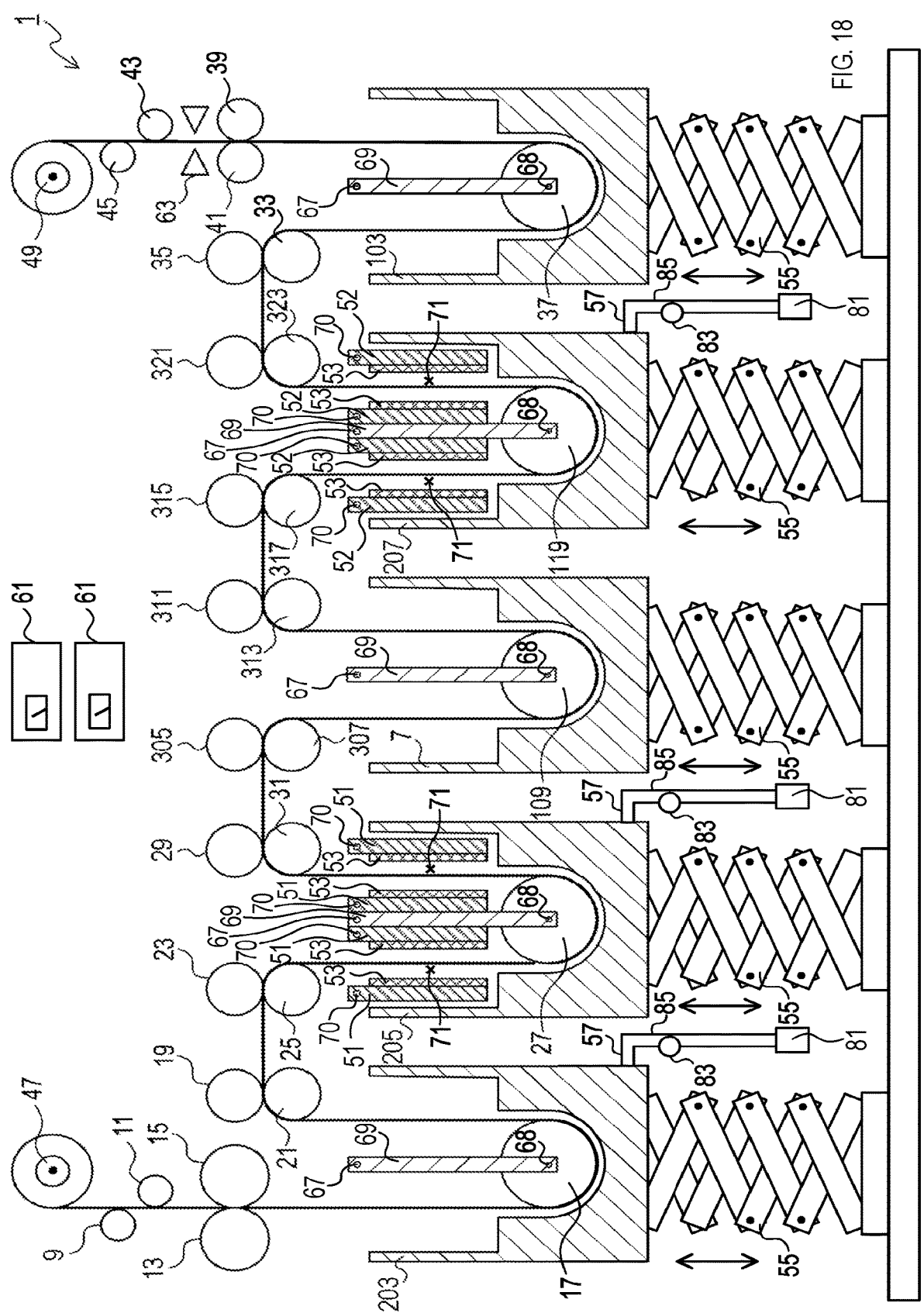
FIG. 18 is an explanatory diagram showing a configuration of a doping system.

As shown in FIG. 18, a doping system 1 includes electrolytic solution tanks 203, 205, and 207 and cleaning tanks 7 and 103. Unlike the electrolytic solution tank 203 in the fourth embodiment, the electrolytic solution tank 203 in the sixth embodiment does not have a counter electrode unit 51 and a porous insulating member 53 therein. The electrolytic solution tanks 205 and 207 in the sixth embodiment are the same as the electrolytic solution tank 203 in the fourth embodiment. That is, the counter electrode units 51 and 52 and the porous insulating member 53 are present in the electrolytic solution tanks 205 and 207. The counter electrode units 51 and 52 in the electrolytic solution tanks 205 and 207 are connected to a cathode of the DC power supply 61. The cleaning tanks 7 and 103 in the sixth embodiment are the same as the cleaning tank 7 in the fourth embodiment.

A conveying roller group includes conveying rollers 9, 11, 13, 15, 17, 19, 21, 23, 25, 27, 29, 31, 305, 307, 309, 311, 313, 315, 317, 319, 321, 323, 33, 35, 37, 39, 41, 43, and 45.

In the same manner as the conveying rollers 15, 21, 25, and 29 in the fourth embodiment, the conveying rollers 25, 29, 317, and 321 are made of a conductive material. As with the conveying rollers 13, 19, 23, and 31 in the fourth embodiment, the conveying rollers 13, 19, 23, 31, 315, and 323 are made of an elastomer, excluding a bearing portion.

A path along which the conveying roller group conveys the electrode precursor 73 is a path from a supply roll 47 to a winding roll 49 by sequentially passing through an inside of the electrolytic solution tank 203, the inside of the electrolytic solution tank 205, an inside of the cleaning tank 7, an inside of the electrolytic solution tank 207, and an inside of the cleaning tank 103.

Further, among the paths, a portion passing through the inside of the electrolytic solution tank 203 is a path which first moves downward between an inner side surface of the electrolytic solution tank 203 and a partition plate 69, then changes its own moving direction to an upward direction by the conveying roller 17, and finally moves upward between an inner side surface of the electrolytic solution tank 203 and the partition plate 69 opposite thereto.

In addition, among the paths, a portion passing through the inside of the electrolytic solution tank 205 is a path which first moves downward in the space 71 positioned between the porous insulating member 53 attached along the inner side surface of the electrolytic solution tank 205 and the porous insulating member 53 on the partition plate 69 side opposite thereto, then changes its own moving direction to an upward direction by the conveying roller 27, and finally moves upward in the space 71 positioned between the porous insulating member 53 attached along the inner side surface of the electrolytic solution tank 205 and the porous insulating member 53 on the partition plate 69 side opposite thereto.

Further, among the above paths, a portion passing through the inside of the cleaning tank 7 is a path which first moves downward between the inner side surface of the cleaning tank 7 and the partition plate 69, then changes its own moving direction to an upward direction by the conveying roller 109, and finally moves upward between the inner side surface of the cleaning tank 7 and the partition plate 69.

In addition, among the paths, a portion passing the inside of the electrolytic solution tank 207 is a path which first moves downward in the space 71 positioned between the porous insulating member 53 attached along the inner side surface of the electrolytic solution tank 207 and the porous insulating member 53 on the partition plate 69 side opposite thereto, then changes its own moving direction to an upward direction by the conveying roller 119, and finally moves upward in the space 71 positioned between the porous insulating member 53 attached along the inner side surface of the electrolytic solution tank 207 and the porous insulating member 53 on the partition plate 69 side opposite thereto.

Further, among the above paths, a portion passing through the inside of the cleaning tank 103 is a path which first moves downward between the inner side surface of the cleaning tank 103 and the partition plate 69, then changes its own moving direction to an upward direction by the conveying roller 37, and finally moves upward between the inner side surface of the cleaning tank 103 and the partition plate 69.

Figure 19:
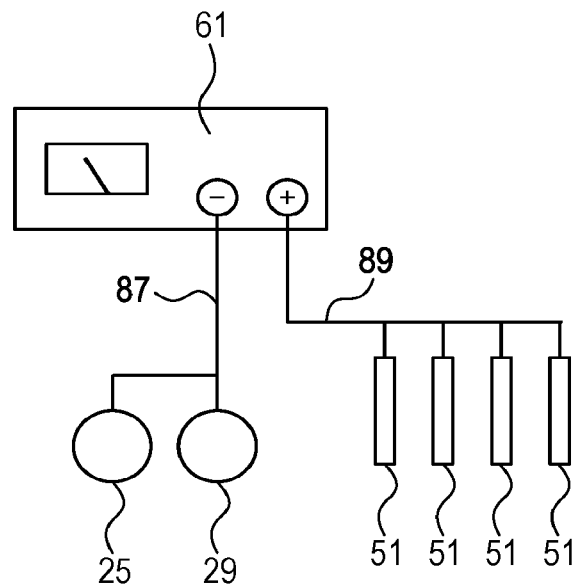
FIG. 19 is an explanatory diagram showing an electrical connection between a conveying roller, a counter electrode unit, and a DC power supply.
Figure 19:
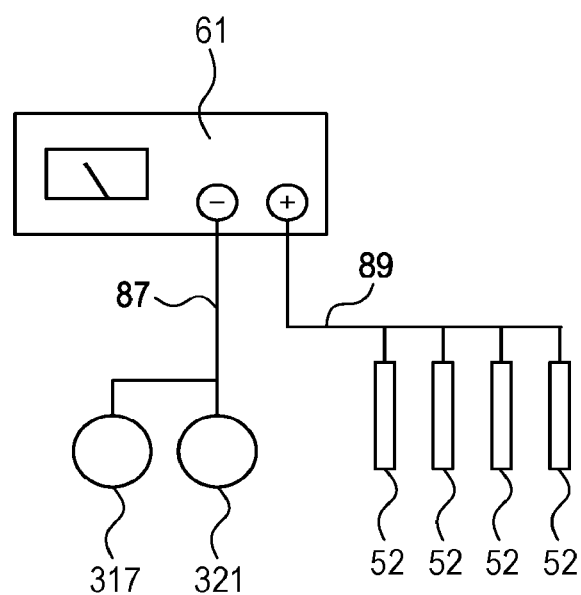

As shown in FIG. 19, the negative terminal of one (hereinafter, referred to as one DC power supply 61) of the two DC power supplies 61 is connected to the conveying rollers 25 and 29 via the cable 87. In addition, a positive terminal of the one DC power supply 61 is connected to a total of four counter electrode units 51, respectively, via a cable 89. The four counter electrode units 51 are the counter electrode units 51 in the electrolytic solution tank 205. Since the electrode precursor 73 is in contact with the conductive conveying rollers 25 and 29 and the electrode precursor 73 and the counter electrode unit 51 in the electrolytic solution tank 205 are in the dope solution as the electrolytic solution, the electrode precursor 73 and the counter electrode unit 51 in the electrolytic solution tank 205 are electrically connected to each other.

As shown in FIG. 19, the negative terminal of the other one (hereinafter, referred to as the other DC power supply 61) of the two DC power supplies 61 is connected to the conveying rollers 317 and 321 via the cable 87. In addition, a positive terminal of the other DC power supply 61 is connected to a total of four counter electrode units 52, respectively, via the cable 89. The four counter electrode units 52 are the counter electrode units 52 in the electrolytic solution tank 207. Since the electrode precursor 73 is in contact with the conductive conveying rollers 317 and 321 and the electrode precursor 73 and the counter electrode unit 52 in the electrolytic solution tank 207 are in the dope solution as the electrolytic solution, the electrode precursor 73 and the counter electrode unit 52 in the electrolytic solution tank 207 are electrically connected to each other. The two DC power supplies 61, the cables 87 and 89, and the conveying rollers 25, 29, 317, and 321 correspond to the connection unit.

In the case of manufacturing the electrode 75 using the doping system 1 of the sixth embodiment, when the electrode precursor 73 passes through the inside of the electrolytic solution tanks 205 and 207, the active material included in the active material layer 95 is doped with the alkali metal.

The electrolytic solution tank 205 corresponds to a first electrolytic solution tank. The electrolytic solution tank 207 corresponds to a second electrolytic solution tank. When the electrode precursor 73 passes through the electrolytic solution tank 205, the process of doping the active material included in the active material layer 95 with the alkali metal corresponds to the first doping process. When the electrode precursor 73 passes through the electrolytic solution tank 207, the process of doping the active material included in the active material layer 95 with the alkali metal corresponds to the second doping process.

It is preferable that the composition of the dope solution accommodated in the electrolytic solution tank 205 is different from the composition of the dope solution accommodated in the electrolytic solution tank 207. In this case, it is further possible to efficiently manufacture the higher-quality electrode 75.

As an aspect in which the compositions of the dope solutions in the electrolytic solution tanks 205 and 207 are different from each other, for example, the concentration of the SEI film forming component in the dope solution accommodated in the electrolytic solution tank 205 may be higher than that of the SEI film forming component in the dope solution accommodated in the electrolytic solution tank 207. The fact that the composition of the dope solution accommodated in the electrolytic solution tank 205 is different from the composition of the dope solution accommodated in the electrolytic solution tank 207 means that the doping conditions of the active material with the alkali metal in the first doping process and the second doping process are different from each other.

It is preferable that the current density in the first doping process performed in the electrolytic solution tank 205 is different from the current density in the second doping process performed in the electrolytic solution tank 207. In this case, it is further possible to manufacture the higher-quality electrode 75.

As an aspect in which the current densities are different in the first doping process and the second doping process, for example, the current density in the first doping process may be higher or lower than the current density in the second doping process. The fact that the current density in the first doping process is different from the current density in the second doping process means that the doping conditions of the active material with the alkali metal in the first doping process and the second doping process are different from each other.

In the case of manufacturing the electrode 75 using the doping system 1 of the sixth embodiment, when the electrode precursor 73 passes through the inside of the electrolytic solution tank 203, the dope solution is permeated into the active material layer 95

2. Effect of Doping System 1

According to the sixth embodiment described above, in addition to the above-described effects of the fourth embodiment, the following effects can be obtained.

(6A) The doping system 1 includes the cleaning tank 7 between the electrolytic solution tank 205 and the electrolytic solution tank 207. The conveying roller group conveys the electrode precursor 73 along a path sequentially passing through the inside of the electrolytic solution tank 205, the inside of the cleaning tank 7, and the inside of the electrolytic solution tank 207. The dope solution attached to the electrode precursor 73 when passing through the inside of the electrolytic solution tank 205 is removed when passing through the inside of the cleaning tank 7. Therefore, it is possible to suppress the dope solution accommodated in the electrolytic solution tank 205 from being mixed with the electrolytic solution tank 207.

(6B) In the doping system 1, the dope solution can be permeated into the entire active material layer 95 in the electrolytic solution tank 203 in advance. Therefore, a time required for doping performed in the electrolytic solution tank 205 can be shortened, and moreover uniform doping becomes possible.

Seventh Embodiment

1. Configuration of System 201 for Manufacturing Electrodes

Figure 20:
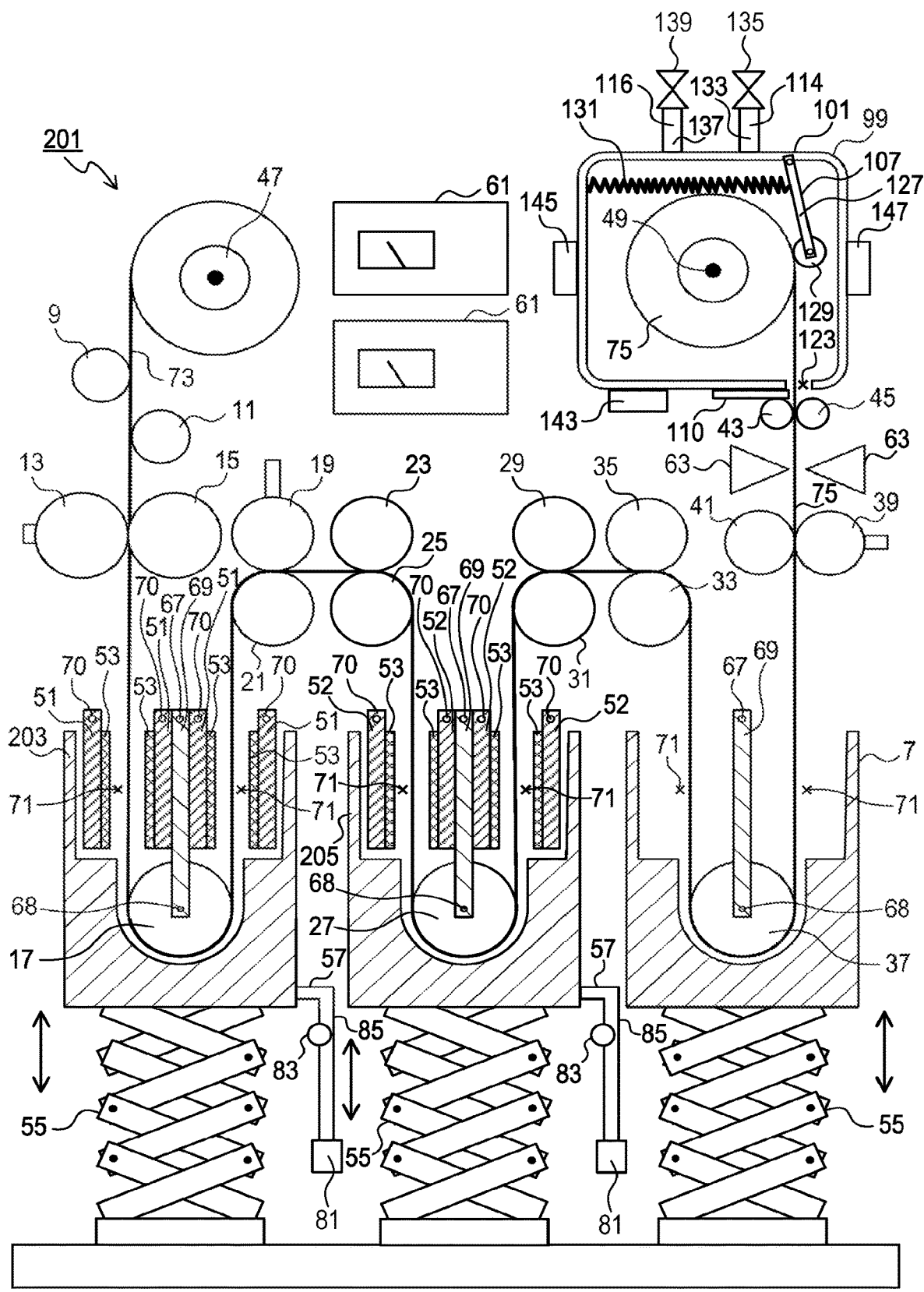
FIG. 20 is an explanatory diagram showing a configuration of a system for manufacturing electrodes.

A configuration of a system 201 for manufacturing electrodes will be described with reference to FIGS. 3, 14, 15, and 20 to 23. As shown in FIG. 20, the system 201 for manufacturing electrodes includes electrolytic solution tanks 203 and 205, a cleaning tank 7, conveying rollers 9, 11, 13, 15, 17, 19, 21, 23, 25, 27, 29, 31, 33, 35, 37, 39, 41, 43, and 45 (hereinafter, collectively referred to as a conveying roller group), a supply roll 47, a winding roll 49, counter electrode units 51 and 52, a porous insulating member 53, a support 55, a circulating filtration unit 57, two DC power supplies 61, a blower 63, and an accommodation unit 99.

As shown in FIGS. 20 and 14, the electrolytic solution tank 203 is a squared tank whose upper part is open. The configuration of the electrolytic solution tank 203 is the same as that of the fourth embodiment.

Basically, the electrolytic solution tank 205 has the same configuration as the electrolytic solution tank 203. However, the conveying roller 17 is not present in the electrolytic solution tank 205, but the conveying roller 27 is present in the electrolytic solution tank 205. The configuration of the conveying roller group is the same as that of the fourth embodiment.

The counter electrode units 51 and 52 are accommodated in the electrolytic solution tanks 203 and 205. As shown in FIG. 3, the counter electrode units 51 and 52 have the same configurations as those of the first to sixth embodiments. The configuration of the support 55 is the same as that of the fourth embodiment.

The circulating filtration unit 57 is provided in the electrolytic solution tanks 203 and 205, respectively. The configuration of the circulating filtration unit 57 is the same as that of the fourth embodiment.

As shown in FIG. 15, the two DC power supplies 61 in the seventh embodiment have the same configuration as that of the fourth embodiment.

The blower 63 blows a gas to the electrode 75 that has come out from the cleaning tank 7 to vaporize the cleaning liquid, thereby drying the electrode 75. The gas to be used is preferably an inert gas against the active material doped with the alkali metal. Examples of such gases may include helium gas, neon gas, argon gas, and dehumidified air from which moisture has been removed, and the like.

As shown in FIGS. 20 to 23, the accommodation unit 99 includes a chamber 101, bearings 104 and 105, an idling prevention unit 107, shutters 110 and 111, a gas supply unit 114, and a gas exhaust unit 116.

The chamber 101 is a hollow container. The chamber 101 is configured to include a main body 217 and a front cover 122. The main body 217 is a container whose front surface is open. It is to be noted that the front surface means a surface located in the front side in FIGS. 20 and 23, and the left side in FIGS. 21 and 22. As the material of the main body 217, besides metals such as stainless steel and aluminum, glass, resin and the like can be used. The front cover 122 can open and close an opening portion of the main body 217. The front cover 122 is preferably a transparent body so that the inside of the chamber 101 can be observed. As a material of the front cover 122, besides transparent resins such as polycarbonate, acrylic resin, and polyvinyl chloride, glass or the like can be used. When the front cover 122 closes the opening portion of the main body 217, a gap between the front cover 122 and the main body 217 is sealed by a seal 121. The seal 121 is constituted by a combination of a patch lock and an O-ring, for example.

The chamber 101 has a slit 123 on its lower surface. The slit 123 has a size enough to pass the electrode 75 therethrough. The shutter 110 is slidable between a position for closing the slit 123 and a position for opening the slit 123. The shutter 111 is slidable between a position for closing a hole 105C to be described later and a position for opening the hole 105C.

The bearing 104 is provided at the center of the front cover 122. A basic form of the bearing 104 is a cylinder. However, an outer diameter of a second portion 104B on a rear side is smaller than that of a first portion 104A on a front side in the bearing 104. The rear side means a side opposite to the front side. In addition, a hole 104C having a circular cross section is provided on a surface facing the rear side of the second portion 104B.

The bearing 105 is provided on the rear side of the main body 217. A basic form of the bearing 105 is a cylinder. However, an outer diameter of a second portion 105B on a front side is smaller than that of a first portion 105A on a rear side in the bearing 105. An inside of the bearing 105 is provided with a hole 105C having a predetermined inner diameter and a circular cross section. The hole 105C passes through the bearing 105 and communicates between the inside and the outside of the chamber 101.

The winding roll 49 is accommodated in the chamber 101. The winding roll 49 has a hollow cylindrical shape. An end portion on the front side in the axial direction of the winding roll 49 is externally fitted to the second portion 104B and abuts on the first portion 104A. In addition, an end portion on the rear side in the axial direction of the winding roll 49 is externally fitted to the second portion 105B and abuts on the first portion 105A. The winding roll 49 is supported by bearings 104 and 105 and is rotatable.

Figure 23:
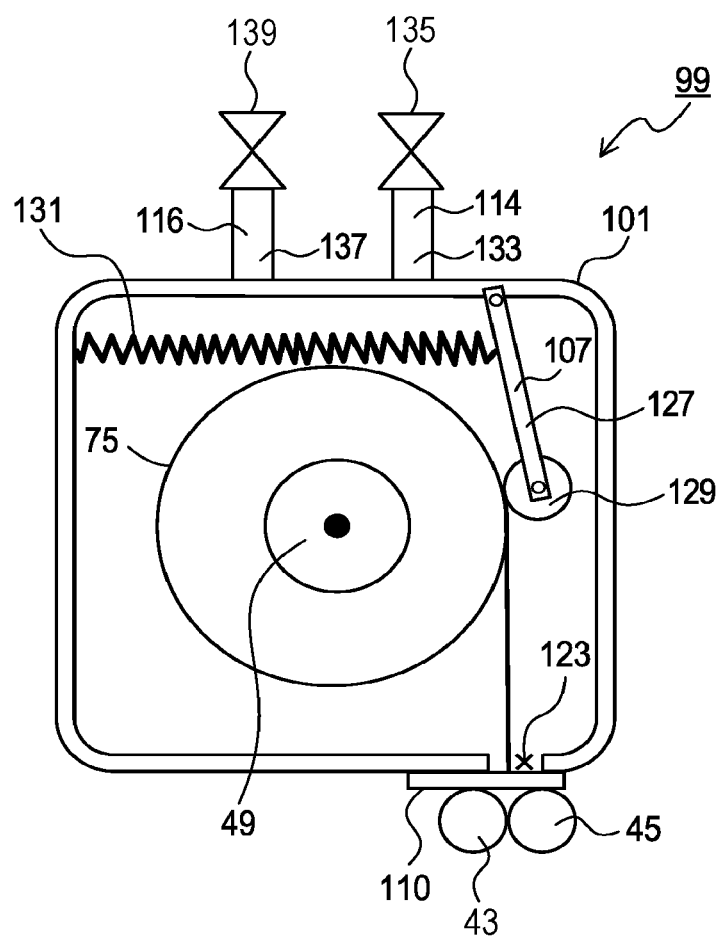
FIG. 23 is a front view showing the configuration of the accommodation unit.

The electrode 75 enters the chamber 101 through the slit 123, and is wound around the winding roll 49. The conveying rollers 43 and 45 are provided under the chamber 101. The conveying rollers 43 and 45 guide the electrode 75 to convey the electrode 75 in the direction of the winding roll 49. Further, the conveying rollers 43 and 45 are disposed in the vicinity of the slit 123, so that an outside air is prevented from penetrating through the slit 123. In FIGS. 20 and 23, although the conveying rollers 43 and 45 are provided outside the chamber 101, the conveying rollers 43 and 45 can also be provided inside the chamber 101.

The idling prevention unit 107 is provided in the chamber 101. The idling prevention unit 107 includes a lever 127, an idling prevention roller 129, and an energizing spring 131. The lever 127 is a rod-shaped member. One end of the lever 127 is rotatably attached to the chamber 101. The idling prevention roller 129 is rotatably attached to the other end of the lever 127. One end of the energizing spring 131 is attached to the chamber 101, and the other end thereof is attached to the lever 127. The energizing spring 131 urges the lever 127 in a direction in which the idling prevention roller 129 approaches the winding roll 49.

The idling prevention roller 129 is pressed against the electrode 75 wound around the winding roll 49 by the urging force of the energizing spring 131. Therefore, the idling of the winding roll 49 is suppressed.

The gas supply unit 114 includes a pipe 133 communicating with the inside of the chamber 101 and a supply valve 135 opening and closing the pipe 133. The supply valve 135 may be a valve that opens and closes manually, or may be an automatic opening/closing valve which automatically opens and closes according to a pressure.

The gas exhaust unit 116 includes a pipe 137 communicating with the inside of the chamber 101 and an exhaust valve 139 opening and closing the pipe 137. The exhaust valve 139 may be a valve that opens and closes manually, or may be an automatic opening/closing valve which automatically opens and closes according to a pressure. When the exhaust valve 139 is in an open state, the gas exhaust unit 116 can exhaust the gas in the chamber 101 to the outside.

The accommodation unit 99 is supported at a predetermined position by support portions 143, 145, and 147. The accommodation unit 99 is fixed to the support portions 143, 145, and 147 by, for example, a patch lock (not shown). The support portions 143, 145, and 147 protrude from a wall 141 toward the front side. The wall 141 is erected on the rear side of the accommodation unit 99. An O-ring 152 is provided between the accommodation unit 99 and the wall 141.

If the shutter 111 is open, an air shaft 149 can be inserted into the winding roll 49 through the hole 150 provided on the wall 141 and the hole 105C. A leading end of the air shaft 149 can be inserted into the hole 104C. The air shaft 149 is rotationally driven by a driving force supplied from a driving source (not shown).

The air shaft 149 comprises a protruding piece 151 provided on an outer peripheral surface thereof. The protruding piece 151 protrudes outward as a pressure of air supplied through the inside of the air shaft 149 is increased. Further, if the air pressure is decreased, the protruding piece 151 is drawn into the inside of the air shaft 149. When projecting outward, the protruding piece 151 abuts on the inner peripheral surface of the winding roll 49. In this state, if the air shaft 149 is rotated, the winding roll 49 also rotates integrally with the air shaft 149. When the protruding piece 151 is drawn inward, the protruding piece 151 and the inner peripheral surface of the winding roll 49 are separated from each other. It is preferable that the protruding pieces 151 protrude from three or more positions at equal intervals along the circumferential direction of the air shaft 149. As a result, it is possible to give a stable rotation to the winding roll 49.

In the electrode manufacturing system 201, portions except for the accommodation unit 99 and the winding roll 49 correspond to the doping system. The doping system is disposed outside the accommodation unit 99.

2. Configuration of Electrode Precursor 73

The configuration of the electrode precursor 73 will be described with reference to FIGS. 8 and 9. As shown in FIG. 8, the electrode precursor 73 has a stripe shape. As shown in FIG. 9, the electrode precursor 73 includes a stripe-shaped current collector 93 and an active material layers 95 formed on both sides thereof. The configuration of the electrode precursor 73 is similar to that of the second embodiment.

3. Composition of Dope Solution

At the time of using the electrode manufacturing system 201, the dope solution containing alkali metal ions is accommodated in the electrolytic solution tanks 203 and 205. The dope solution is the same as that of the first embodiment.

4. Method for Manufacturing Electrodes 75 Using Electrode Manufacturing System 201

First, as a preparation for manufacturing the electrode 75, the following is performed. The electrode precursor 73 is wound around the supply roll 47. The dope solution is accommodated in the electrolytic solution tanks 203 and 205. The dope solution is as described in "3. Composition of Dope Solution" described above. The cleaning liquid is accommodated in the cleaning tank 7. The cleaning liquid is an organic solvent.

It is preferable that the composition of the dope solution accommodated in the electrolytic solution tank 203 is different from the composition of the dope solution accommodated in the electrolytic solution tank 205. In this case, it is further possible to efficiently manufacture the higher-quality electrode 75.

As an aspect in which the compositions of the dope solutions in the electrolytic solution tanks 203 and 205 are different from each other, for example, the concentration of the SEI film forming component in the dope solution accommodated in the electrolytic solution tank 203 may be higher than that of the SEI film forming component in the dope solution accommodated in the electrolytic solution tank 205. The fact that the composition of the dope solution accommodated in the electrolytic solution tank 203 is different from the composition of the dope solution accommodated in the electrolytic solution tank 205 means that the doping conditions of the active material with the alkali metal in the first doping process and the second doping process are different from each other.

Figure 21:
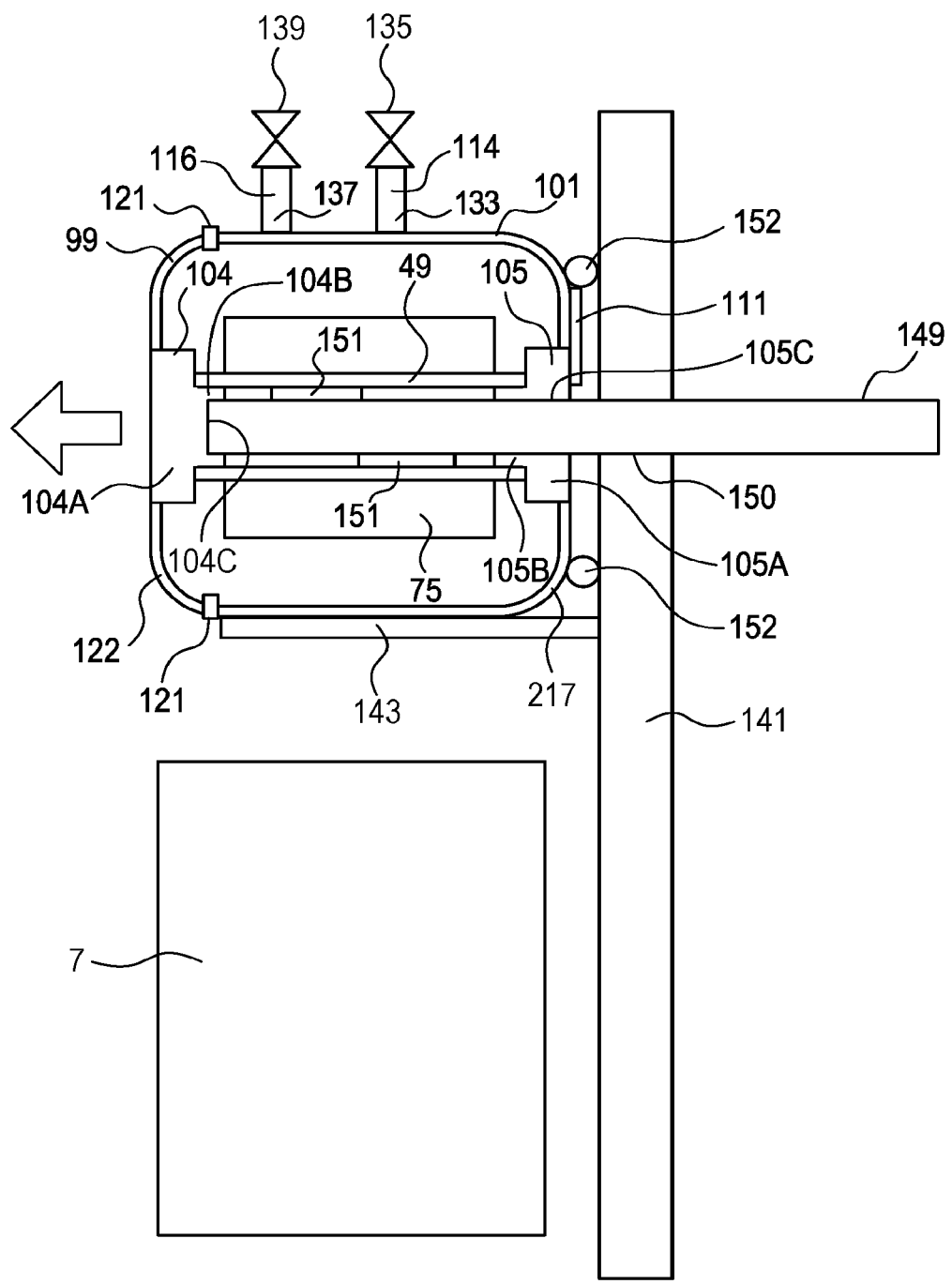
FIG. 21 is a side cross-sectional view showing a configuration of an accommodation unit in a state in which the accommodation unit is attached to an air shaft.
Figure 22:
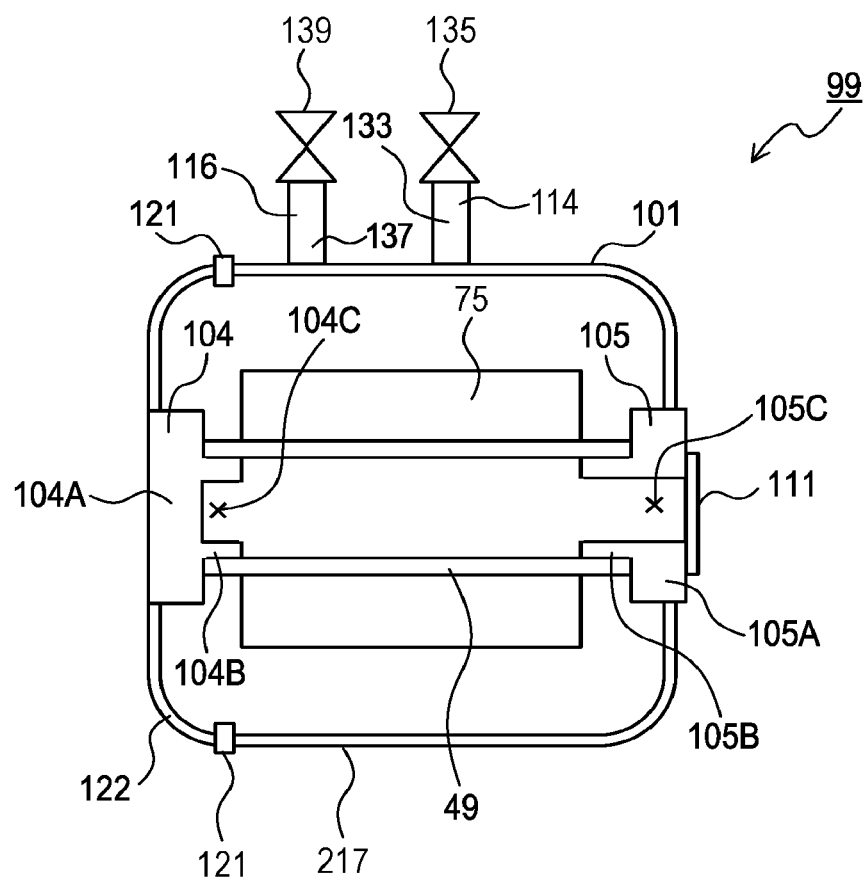
FIG. 22 is a side cross-sectional view showing the configuration of the accommodation unit in a state in which the accommodation unit is removed from the air shaft.

Also, as shown in FIGS. 20 and 21, the accommodation unit 99 is supported by the support portions 143, 145, and 147. Further, the opening portion of the main body 217 is closed by the front cover 122. Further, the position of the shutter 110 is adjusted so that the electrode 75 can pass through the slit 123.

Further, the gas supply pipe (not shown) is connected to the gas supply unit 114, and the supply valve 135 is open to supply gas into the chamber 101. The supply of gas continues during the manufacturing of the electrode 75. The exhaust valve 139 is kept closed. During the manufacturing of the electrode 75, the inside of the chamber 101 becomes a positive pressure due to the supplied gas. The surplus of the supplied gas flows out from the slit 123.

The gas to be supplied is at least one kind of gas selected from the group consisting of rare gas and carbon dioxide. The gas to be supplied is preferably gas made of rare gas or gas containing both rare gas and carbon dioxide. As the rare gas, argon is preferable.

The concentration of the rare gas in the chamber 101 is preferably 90% or more. In the following description, unless otherwise specified, the unit of gas concentration is volume % or volume ppm. The moisture concentration in the chamber 101 is preferably 100 ppm or less, and more preferably 50 ppm or less.

The nitrogen concentration in the chamber 101 is preferably 5% or less. The atmosphere in the chamber 101 preferably contains 0.1 to 5% of carbon dioxide. The pressure in the chamber 101 is preferably higher by $\Delta P$ than the external pressure. The value of $\Delta P$ is, for example, a positive value of 45 Pa or less.

Further, the shutter 111 is open, and the air shaft 149 is inserted into the winding roll 49 through the hole 150 and the hole 105C. When projecting outward, the protruding piece 151 abuts on the inner peripheral surface of the winding roll 49.

Next, the electrode precursor 73 is drawn out from the supply roll 47 by the conveying roller group, and is conveyed along the above-mentioned path. When the electrode precursor 73 passes through the inside of the electrolytic solution tanks 203 and 205, the active material included in the active material layer 95 is doped with the alkali metal. The electrolytic solution tank 203 corresponds to a first electrolytic solution tank. The electrolytic solution tank 205 corresponds to a second electrolytic solution tank. When the electrode precursor 73 passes through the inside of the electrolytic solution tank 203, the process of doping the active material included in the active material layer 95 with the alkali metal corresponds to the first doping process. When the electrode precursor 73 passes through the inside of the electrolytic solution tank 205, the process of doping the active material included in the active material layer 95 with the alkali metal corresponds to the second doping process.

It is preferable that the current density in the first doping process performed in the electrolytic solution tank 203 is different from the current density in the second doping process performed in the electrolytic solution tank 205. In this case, it is further possible to efficiently manufacture the higher-quality electrode 75.

As an aspect in which the current densities are different in the first doping process and the second doping process, for example, the current density in the first doping process may be higher or lower than the current density in the second doping process. The fact that the current density in the first doping process is different from the current density in the second doping process means that the doping conditions of the active material with the alkali metal in the first doping process and the second doping process are different from each other.

In the case where the counter electrode unit 51 accommodated in the electrolytic solution tanks 203 and 205 includes a conductive substrate and an alkali metal-containing plate disposed on the conductive substrate, a weight of the alkali metal included in the alkali metal-containing plate to be accommodated in the electrolytic solution tank 203 may be different from that of the alkali metal included in the alkali metal-containing plate to be accommodated in the electrolytic solution tank 205.

As an aspect in which the weight of the alkali metal included in the alkali metal-containing plate to be accommodated in the electrolytic solution tank 203 may be different from that of the alkali metal included in the alkali metal-containing plate to be accommodated in the electrolytic solution tank 205, for example, the weight of the alkali metal included in the alkali metal-containing plate to be accommodated in the electrolytic solution tank 203 may be larger or smaller than that of the alkali metal included in the alkali metal-containing plate to be accommodated in the electrolytic solution tank 205. The fact that the weight of the alkali metal included in the alkali metal-containing plate to be accommodated in the electrolytic solution tank 203 is different from the weight of the alkali metal included in the alkali metal-containing plate to be accommodated in the electrolytic solution tank 205 means that the doping conditions of the active material with the alkali metal in the first doping process and the second doping process are different from each other.

By doping the active material with the alkali metal, the electrode precursor 73 becomes the electrode 75. The electrode 75 is cleaned in the cleaning tank 7 while being conveyed by the conveying roller group. Finally, the electrode 75 is wound around the winding roll 49. During the manufacturing of the electrode 75, the electrode precursor 73 is conveyed to pass through the inside of the electrolytic solution tanks 203 and 205 at a constant speed, and is preferably wound around the winding roll 49. For this purpose, for example, it is preferable to wind the electrode 75 by rotationally driving the conveying rollers 39 and 41 as a nip roll at a constant speed and rotating the winding roll 49 while adjusting the rotation speed according to the winding diameter to apply a constant tension to the electrode 75. However, the nip roll may be a conveying roller other than the conveying rollers 39 and 41.

When the manufacturing of the electrode 75 is completed, the following processing is performed. When the manufacturing of the electrode 75 is completed, the electrode 75 is accommodated in the accommodation unit 99 while being wound around the winding roll 49.

First, the supply of gas is stopped in a state in which the supply valve 135 is closed. Further, the slit 123 is closed by the shutter 110. Next, the supply valve 135 and the exhaust valve 139 are brought into an open state to make gas flow into the chamber 101, and the atmosphere in the chamber 101 is replaced with gas supplied from the gas supply unit 114. Next, the supply valve 135 and the exhaust valve 139 are closed to hermetically seal the inside of the chamber 101.

After the above processing, the electrode 75 can be stored while being accommodated in the accommodation unit 99. The location of the accommodation unit 99 may be a location supported by the support portions 143, 145, and 147, or may be another location. In addition, after the above processing, the electrode 75 can be conveyed while being accommodated in the accommodation unit 99.

By drawing the protruding piece 151 into the inside of the air shaft 149, the accommodation unit 99 can be drawn out from the air shaft 149 and moved. The electrode 75 and the accommodation unit 99 correspond to the electrode storage system.

The electrode 75 manufactured by using the electrode manufacturing system 201 may be a cathode or an anode. In the case of manufacturing the cathode, the electrode manufacturing system 201 dopes the cathode active material with the alkali metal, and in the case of manufacturing the anode, the electrode manufacturing system 201 dopes the anode active material with the alkali metal.

The electrode manufacturing system 201 is suitable for manufacturing an anode included in an alkaline ion type capacitor or battery, more suitable for manufacturing an anode included in an alkaline ion type capacitor or secondary battery, and particularly suitable for manufacturing an anode included in a lithium ion capacitor or a lithium ion secondary battery.

When the lithium is occluded in the anode active material of the lithium ion capacitor, the doping amount of the alkali metal is preferably 70 to 95% with respect to a theoretical capacity of the anode active material; and when lithium is occluded in the anode active material of the lithium ion secondary battery, the doping amount of the alkali metal is preferably 10 to 30% with respect to the theoretical capacity of the anode active material.

5. Method for Manufacturing Capacitor

A method for manufacturing a capacitor of the present disclosure is a method for manufacturing a capacitor including a cathode, an anode, and an electrolyte, and includes a process of manufacturing an anode according to "4. Method for Manufacturing Electrodes Using Electrode Manufacturing System 201". As the capacitor, the same capacitor as that of the first embodiment can be used.

6. Method for Manufacturing Battery

A method for manufacturing a battery of the present disclosure is a method for manufacturing a battery including a cathode, an anode, and an electrolyte, and includes a process of manufacturing an anode according to "4. Method for Manufacturing Electrodes Using Electrode Manufacturing System 201". As the battery, the same battery as that of the first embodiment can be used.

7. Effect of Electrode Manufacturing System 201

According to the seventh embodiment described above, in addition to the above-described effects of the fourth embodiment, the following effects can be obtained.

(7A) The electrode manufacturing system 201 supplies at least one kind of gas selected from the group consisting of rare gas and carbon dioxide to the winding roll 49 around which the electrode 75 is wound. Therefore, the deterioration in quality of the electrode 75 can be suppressed.

(7B) The electrode manufacturing system 201 includes the accommodation unit 99 accommodating the winding roll 49, and supplies gas into the accommodation unit 99. Therefore, the deterioration in quality of the electrode 75 wound around the winding roll 49 can be further suppressed.

(7C) The electrode manufacturing system 201 includes the gas exhaust unit 116 which exhausts the inside of the accommodation unit 99. Therefore, it is easy to replace the atmosphere in the accommodation unit 99 with the gas supplied from the gas supply unit 114.

(7D) It is possible to store the electrode 75 by hermetically seal the accommodation unit 99 accommodating the electrode 75 after manufacturing the electrode 75. At least one kind of gas selected from the group consisting of rare gas and carbon dioxide is included in the accommodation unit 99. By doing so, it is possible to store the electrode 75 while suppressing the deterioration in quality of the electrode 75.

(7E) It is possible to convey the electrode 75 together with the accommodation unit 99 by hermetically sealing the accommodation unit 99 accommodating the electrode 75 after manufacturing the electrode 75. By doing so, it is possible to convey the electrode 75 while suppressing the deterioration in quality of the electrode 75.

In addition, if the accommodation unit 99 that accommodates the electrode 75 is set in apparatuses (for example, electrode winding apparatus, electrode cutting apparatus) of the next process, these apparatuses can be used as the supply roll of the electrode in the next process. At this time, it is possible to manufacture a cell of a battery or a capacitor while suppressing the deterioration in quality of the electrode 75 by supplying the electrode 75 while supplying at least one kind of gas selected from the group consisting of rare gas and carbon dioxide into the accommodation unit 99.

Eighth Embodiment

1. Configuration of Apparatus 301 for Manufacturing Electrodes

Figure 24:
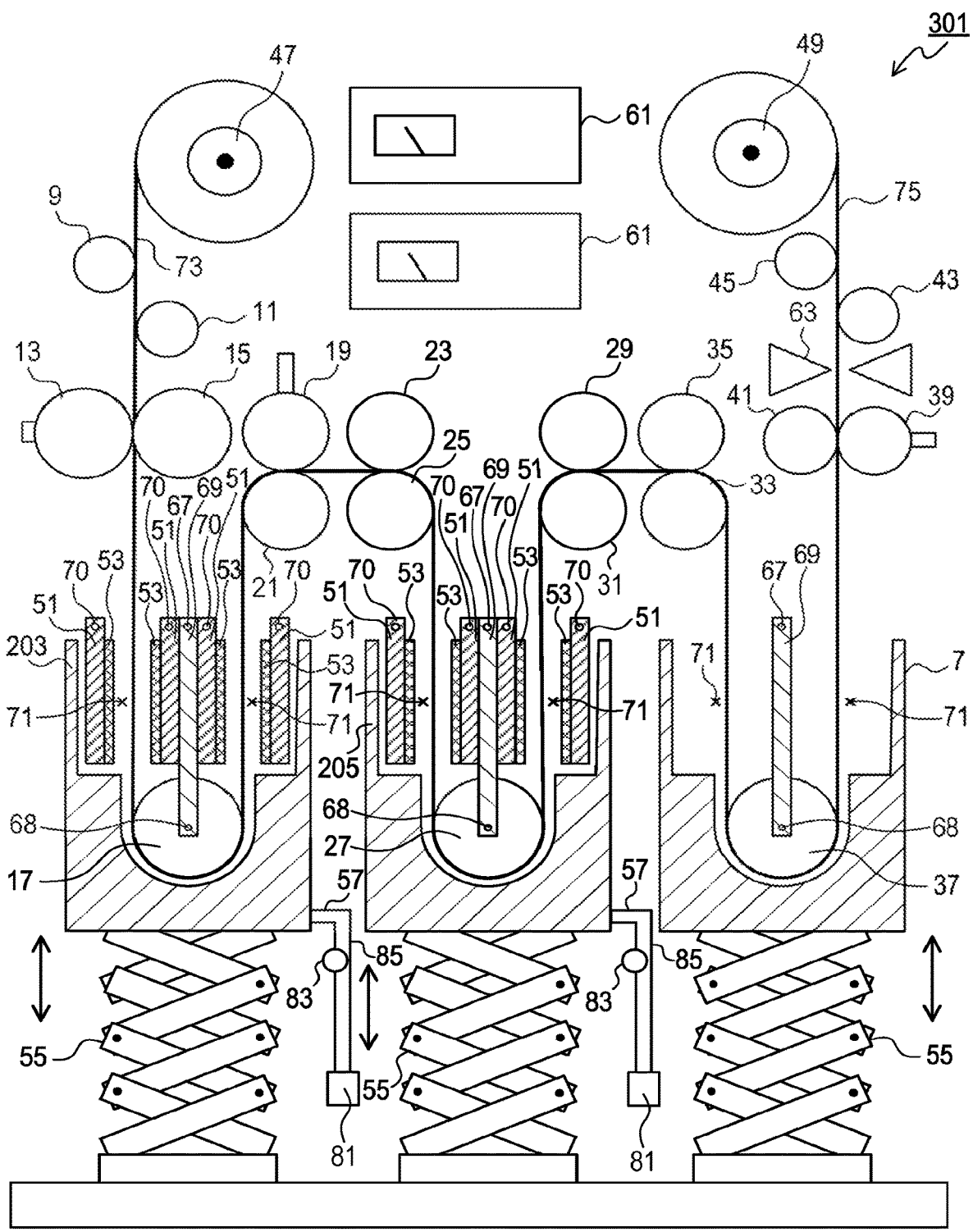
FIG. 24 is an explanatory diagram showing a configuration of an apparatus for manufacturing electrodes.

As shown in FIG. 24, a configuration of an apparatus 301 for manufacturing electrodes is the same as that of a doping system 1 in the fourth embodiment.

2. Configuration of Electrode Precursor 73

The configuration of the electrode precursor 73 is to the same as that of the second embodiment.

3. Composition of Dope Solution

At the time of using the apparatus 301 for manufacturing electrodes, a dope solution containing alkali metal ions is accommodated in the electrolytic solution tanks 203 and 205. The dope solution is the same as that of the first embodiment.

4. Method for Manufacturing Electrodes 75 Using Apparatus 301 for Manufacturing Electrodes The method for manufacturing an electrode 75 using the apparatus 301 for manufacturing electrodes is basically the same as that of the fourth embodiment. However, the following cleaning liquid is accommodated in the cleaning tank 7. In the eighth embodiment, the electrode 75 is a doped electrode.

The cleaning liquid contains an aprotic solvent. As a result, it is difficult for a surface portion of the cleaned electrode 75 to be peeled off or the cleaned electrodes 75 to be stuck to each other.

Examples of the aprotic solvent may include at least one selected from a carbonate-based solvent, an ester-based solvent, an ether-based solvent, a hydrocarbon-based solvent, a ketone-based solvent, a nitrile-based solvent, a sulfur-containing-based solvent and an amide-based solvent. When the cleaning liquid contains these aprotic solvents, it is difficult for the surface portion of the cleaned electrode 75 to be peeled off or the cleaned electrodes 75 to be stuck to each other.

Examples of the carbonate-based solvents may include dimethyl carbonate, diethyl carbonate, dipropyl carbonate, methyl propyl carbonate, ethyl propyl carbonate, methylethyl carbonate, ethyl methyl carbonate, propylene carbonate, butylene carbonate, vinylene carbonate and the like.

Examples of the ester-based solvents may include butyl acetate, amyl acetate, propylene glycol monomethyl ether acetate, ethylene glycol monoethyl ether acetate, diethylene glycol monobutyl ether acetate, diethylene glycol monoethyl ether acetate, ethyl-3-ethoxypropionate, 3-methoxybutyl acetate, 3-methyl-3-methoxybutyl acetate, butyl formate, propyl formate, ethyl lactate, butyl lactate, propyl lactate, γ-butyrolactone, valerolactone, mevalonolactone, caprolactone and the like.

Examples of the ether-based solvents may include ethyl ether, i-propyl ether, n-butyl ether, n-hexyl ether, 2-ethylhexyl ether, ethylene oxide, 1,2-propylene oxide, dioxolane, 4-methyl dioxolane, dioxane, dimethyl dioxane, tetrahydrofuran, 2-methyl tetrahydrofuran, ethylene glycol dimethyl ether, ethylene glycol diethyl ether, diethylene glycol dimethyl ether, diethylene glycol diethyl ether, propylene glycol dimethyl ether, propylene glycol diethyl ether, dipropylene glycol dimethyl ether, dipropylene glycol diethyl ether and the like.

Examples of the hydrocarbon-based solvents may include n-pentane, i-pentane, n-hexane, i-hexane, n-heptane, i-heptane, 2,2,4-trimethylpentane, n-octane, i-octane, cyclohexane, methylcyclohexane, benzene, toluene, xylene, ethylbenzene, trimethylbenzene, methylethylbenzene, n-propylbenzene, i-propylbenzene, diethylbenzene, i-butylbenzene, triethylbenzene, di-i-propylbenzene, n-amyl naphthalene, trimethyl benzene, and the like.

Examples of the ketone-based solvents may include 1-octanone, 2-octanone, 1-nonanone, 2-nonanone, 4-heptanone, 2-hexanone, diisobutyl ketone, cyclohexanone, methylcyclohexanone, phenylacetone, methylisobutylketone and the like.

Examples of the nitrile-based solvent may include acetonitrile, propionitrile and the like.

Examples of the sulfur-containing-based solvent may include sulfolane, dimethylsulfoxide and the like.

Examples of the amide-based solvent may include dimethylacetamide, dimethylformamide, N-methylpyrrolidone and the like.

The cleaning liquid may be substantially made of an aprotic solvent, or may contain other components in addition to the aprotic solvent. A boiling point of the aprotic solvent is preferably 30° C. or higher and 200° C. or lower, more preferably 40° C. or higher and 150° C. or lower, and further preferably 50° C. or higher and 120° C. or lower. When the boiling point is 30° C. or higher, the cleaning liquid in the cleaning tank 7 can be suppressed from being excessively vaporized. When the boiling point is 200° C. or lower, it is easy to remove the cleaning liquid from the cleaned electrode 75.

The cleaning liquid may further contain a flame retardant such as a phosphazene compound. As the phosphazene compound included in the cleaning solution, for example, it is preferable to use the compound represented by the aforementioned general Formula (1) or Formula (2). From the viewpoint of stably cleaning the doped electrode, the lower limit of the added amount of the flame retardant is preferably 1 part by mass or more, more preferably 3 parts by mass or more, and still more preferably 5 parts by mass or more, with respect to 100 parts by mass of the dope solution. From the viewpoint of obtaining a high-quality doped electrode, the upper limit of the added amount of the flame retardant is preferably 20 parts by mass or less, more preferably 15 parts by mass or less, and still more preferably 10 parts by mass or less, with respect to 100 parts by mass of the dope solution.

The cleaned electrode 75 may be dried, if necessary. It is preferable to carry out vacuum drying under vacuum at the time of drying.

5. Method for Manufacturing Capacitor

A method for manufacturing a capacitor of the present disclosure is a method for manufacturing a capacitor including a cathode, an anode, and an electrolyte, and includes a process of manufacturing an anode according to "4. Method for Manufacturing Electrodes 75 Using Apparatus 301 for Manufacturing Electrodes". As the capacitor, the same capacitor as that of the first embodiment can be used.

6. Method for Manufacturing Battery

A method for manufacturing a battery of the present disclosure is a method for manufacturing a battery including a cathode, an anode, and an electrolyte, and includes a process of manufacturing an anode according to "4. Method for Manufacturing Electrode 75 Using Apparatus 301 for Manufacturing Electrodes". As the battery, the same battery as that of the first embodiment can be used.

7. Effect of Apparatus 301 for Manufacturing Electrodes and Method for Manufacturing Electrodes According to the eighth embodiment described above, in addition to the above-described effects of the fourth embodiment, the following effects can be obtained.

(8A) In the apparatus 301 for manufacturing electrodes, the electrode 75 is cleaned in the cleaning tank 7 by the cleaning liquid. The cleaning liquid contains an aprotic solvent. Therefore, it is difficult for the surface portion of the cleaned electrode 75 wound around the winding roll 49 to be peeled off and the electrodes 75 to be stuck to each other.

(8B) The electrode 75 has a stripe shape. Therefore, it is easy to wind the cleaned electrode 75 around the winding roll 49. When the electrode 75 is wound around the winding roll 49, the doped electrodes 75 are brought into contact with each other, but as shown in (8A), it is difficult for the surface portion of the electrode 75 to be peeled off and the electrodes 75 to be stuck to each other.

8. Example and Comparative Example

(8-1) Example 1

(i) Manufacturing of Anode

First, the current collector made of a copper foil having a width of 70 mm×a length of 382 mm, a thickness of 15 μm, and a surface roughness Ra=0.1 μm was prepared. As shown in FIGS. 8 and 9, the active material layer 95 was formed on both surfaces of the current collector 93, respectively. In this example, the active material layer 95 is an anode active material layer. A thickness of the active material layer 95 is 40 μm and is formed along a longitudinal direction of the current collector. The active material layer 95 contains graphite (active material), carboxymethyl cellulose, acetylene black (conductive agent), a binder and a dispersant at a mass ratio of 88:3:5:3:1.

A portion (hereinafter referred to as a non-formed portion 94) where the active material layer 95 is not formed was provided between one long side of the current collector 93 and the active material layer 95. The width of the non-formed portion 94 is 18 mm. Hereinafter, the current collector 93 having the active material layer 95 formed thereon will be referred to as the electrode precursor 73. The electrode precursor 73 has a strip shape. The electrode precursor is a precursor of the anode.

Next, a lithium electrode was manufactured as follows. First, a long copper plate having a thickness of 2 mm was prepared. A lithium metal plate was stuck on the copper plate. The lithium metal plate has a width of 50 mm×a length of 360 mm, and a thickness of 1 mm. The lithium metal plate is attached along a longitudinal direction of the copper plate. An interval of 12 mm was provided between any copper plate and a copper plate adjacent thereto. In this way, the copper plate to which the lithium metal plate is stuck is a lithium electrode. Two identical lithium electrodes were manufactured.

Next, one lithium electrode, one separator, one electrode precursor, one separator, and one lithium electrode were stacked in this order. One obtained by the stacking is referred to as a stacked body. The separator is a polypropylene nonwoven fabric having a thickness of 1 mm.

In the stacked body, the anode active material layer of the electrode precursor and the lithium metal plate of the lithium electrode are opposite to each other via the separator. In addition, when viewed from the thickness direction of the stacked body, the center of the anode active material layer coincides with the center of the lithium metal plate opposite thereto.

Figure 29:
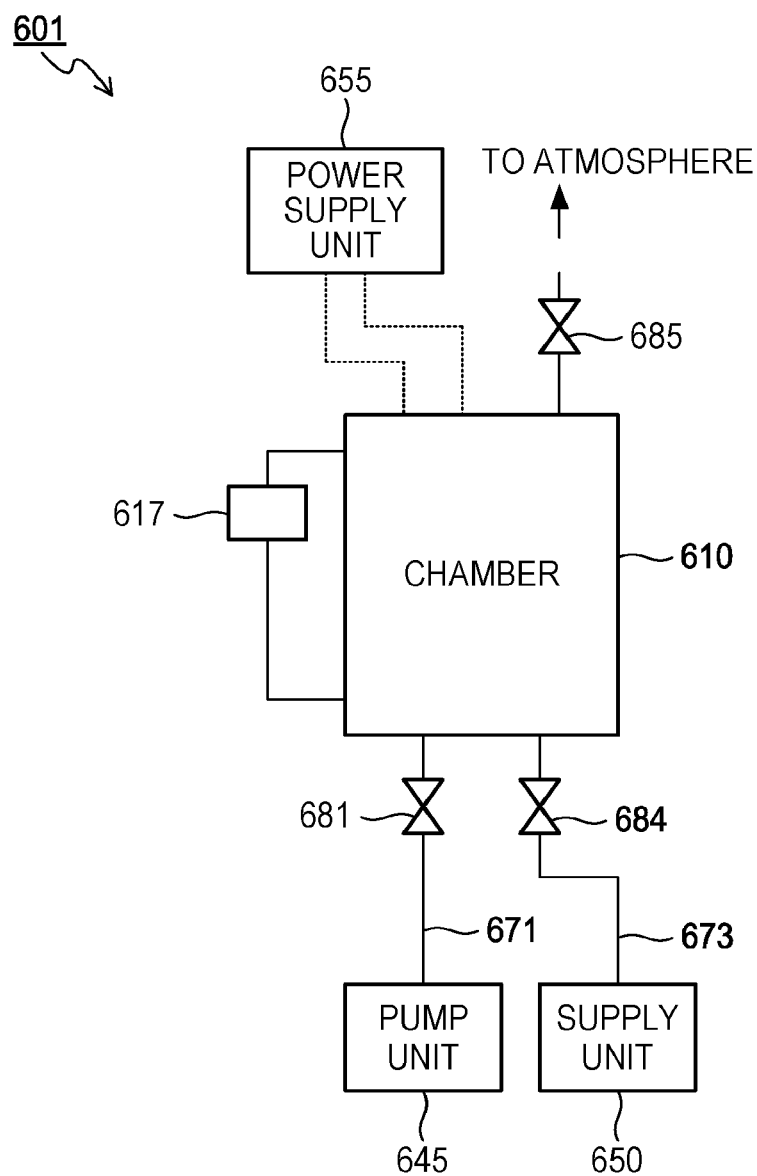
FIG. 29 is an explanatory diagram showing a configuration of an apparatus 601 for manufacturing electrodes.

Next, an apparatus 601 for manufacturing electrodes having the following configuration was prepared. As shown in FIG. 29, the apparatus 601 for manufacturing electrodes includes a chamber 610 made of SUS and a liquid level sensor 617. The liquid level sensor 617 detects a liquid level of a liquid in the chamber 610. A pressure reduction pipe 671 made of a resin is connected to the lower part of the chamber 610 and the pressure reduction pipe 671 is further connected to a scroll type dry vacuum pump 645. The pressure reduction pipe is provided with a cock 681 that can be opened and closed. In addition, an electrolytic solution supply unit 650 is connected to the lower part of the chamber 610 via the electrolytic solution supply pipe 673 made of a resin. The electrolytic solution supply pipe 673 is provided with a cock 684 that can be opened and closed. In addition, an upper part of the chamber 610 is provided with a leak valve 685 and a power supply unit 655. The power supply unit 655 corresponds to a doped electrode.

The stacked body was fixed by being sandwiched between holding parts made of a resin. Next, the stacked body was inserted into the chamber 610. At this time, a direction of the stacked body was set to be a direction in which the non-formed portion 94 becomes an upper side. Next, the inside of the chamber 610 was decompressed by using the pressure reduction pipe 671 and the scroll type dry vacuum pump 645. When the pressure in the chamber 610 is decreased to 100 Pa, the cock of the pressure reduction pipe 681 was closed.

Next, an electrolytic solution was supplied from the electrolytic solution supply pipe 673 into the chamber 610. The electrolytic solution is a solution including 1.2M of $LiPF_6$ and 3 mass % of 1-fluoroethylene carbonate. The solvent of the electrolytic solution is a mixed solvent including ethylene carbonate, ethyl methyl carbonate, and dimethyl carbonate at a volume ratio of 3:4:3. The supply amount of the electrolytic solution was set so that the liquid level of the electrolytic solution was 5 mm above the upper end of the active material layer.

Next, the leak valve 685 was opened and the internal pressure of the chamber 610 was returned to the atmospheric pressure. Next, the electrode precursor and the lithium electrode were connected to a DC power supply with a current/voltage monitor via the doped electrode, and a current of 300 mA was conducted. Considering the irreversible capacity, the energization time was set to be the time that an occlusion rate of lithium was 80% with respect to a theoretical capacity of graphite (372 mAh/g). It is to be noted that the irreversible capacity was estimated in advance by measuring the discharge capacity of the anode after doping the lithium. By this process, the anode active material in the anode active material layer was doped with lithium, and the electrode precursor became an anode (an example of an electrode).

Next, the obtained anode was immersed in dimethyl carbonate (DMC) and cleaned for 6 minutes. By doing so, the lithium-doped anode was manufactured.

(ii) Peeling Evaluation on Anode

After the anode manufactured as described above was dried, six sheets were stacked. The stacked anode was further dried for 8 hours while being applied with a load of 560 g. Thereafter, the superimposed anodes were peeled off sheet by sheet, and the state of the anode active material layer on the anode was observed. As a result, the peeling or the like of the anode active material layer was not observed, and therefore the anode was in the same state as that before the evaluation.

(8-2) Example 2

(i) Manufacturing of Anode

First, the long current collector made of a copper foil having a width of 135 mm×a length of 100 m, a thickness of 15 μm, and a surface roughness Ra=0.1 μm was prepared. As shown in FIGS. 8 and 9, the active material layer 95 was formed on both surfaces of the current collector 93, respectively. In this example, the active material layer 95 is the anode active material layer. The thickness of the active material layer 95 is 40 μm and is formed along the longitudinal direction of the current collector 93. The active material layer 95 contains graphite (active material), carboxymethyl cellulose, acetylene black (conductive agent), a binder and a dispersant at a mass ratio of 88:3:5:3:1. A portion where the active material layer 95 is not formed was not provided between one long side of the current collector 93 and the active material layer 95.

Next, the lithium electrode was manufactured as follows. First, the long copper plate having a thickness of 2 mm was prepared. The lithium metal plate was stuck on the copper plate. The lithium metal plate has a width of 120 mm×a length of 1600 mm, and a thickness of 1 mm. The lithium metal plate is attached along the longitudinal direction of the copper plate. In this way, the copper plate to which the lithium metal plate is stuck is the counter electrode unit 51. The same counter electrode units 51 were manufactured in 8 sheets.

The apparatus 301 for manufacturing electrodes was prepared, and as shown in FIG. 24, the electrode precursor 73 and the counter electrode unit 51 were provided. Next, an electrolytic solution was supplied into the apparatus 301 for manufacturing electrodes. The electrolytic solution is a solution including 1.2 M of $LiPF_6$. The solvent of the electrolytic solution is a mixed solvent including ethylene carbonate, ethyl methyl carbonate, and dimethyl carbonate at a volume ratio of 3:4:3.

Next, the electrode precursor 73 and the counter electrode unit 51 provided in the apparatus 301 for manufacturing electrodes were connected to a DC power supply with a current/voltage monitor, and a current of 40 A was conducted while the electrode precursor was conveyed at a rate of 21 m/h (0.35 m/min). Considering the irreversible capacity, the energization time was set to be the time that an occlusion rate of lithium was 80% with respect to a theoretical capacity of graphite (372 mAh/g). It is to be noted that the irreversible capacity was estimated in advance by measuring the discharge capacity of the anode after doping the lithium. By this process, the anode active material in the anode active material layer was doped with lithium, and the electrode precursor became an anode. The anode corresponds to an electrode.

The electrode precursor was doped with lithium, passed through the cleaning tank 7 accommodating dimethyl carbonate (DMC) at 25° C., and then wound. By doing so, the lithium-doped anode was manufactured.

(ii) Peeling Evaluation on Anode

After the anode manufactured as described above was acquired, the anode was drawn out after 8 hours. As a result, the peeling or the like of the anode active material layer was not observed, and therefore the anode was in the same state as that before the evaluation.

(8-3) Comparative Example 1

The anode was basically manufactured in the same manner as the above Example 1. However, the cleaning using the dimethyl carbonate (DMC) was not performed. As a result of the peeling evaluation on the manufactured anode, the anode active material layer was fixed and a part thereof was peeled from the current collector 93.

(8-4) Comparative Example 2

The anode was basically manufactured in the same manner as the above Example 1. However, instead of the cleaning using the dimethyl carbonate (DMC), cleaning using water was carried out. As a result, the anode generated heat and was discolored. It is inferred that this was caused by the deterioration of the doped lithium.

(8-5) Comparative Example 3

The anode was basically manufactured in the same manner as the above Example 2. However, the cleaning using the dimethyl carbonate (DMC) was not performed. As a result of drawing out the manufactured anode, the anode active material layer was fixed and a part thereof was peeled from the current collector 93.

Ninth Embodiment

Since a basic configuration of a ninth embodiment is the same as that of the fourth embodiment, the description of the common configuration will be omitted, and the difference will be mainly described. It is to be noted that the same reference numerals as those in the fourth embodiment indicate the same configurations, and reference is made to the preceding description.

1. Difference from Fourth Embodiment

Figure 25:
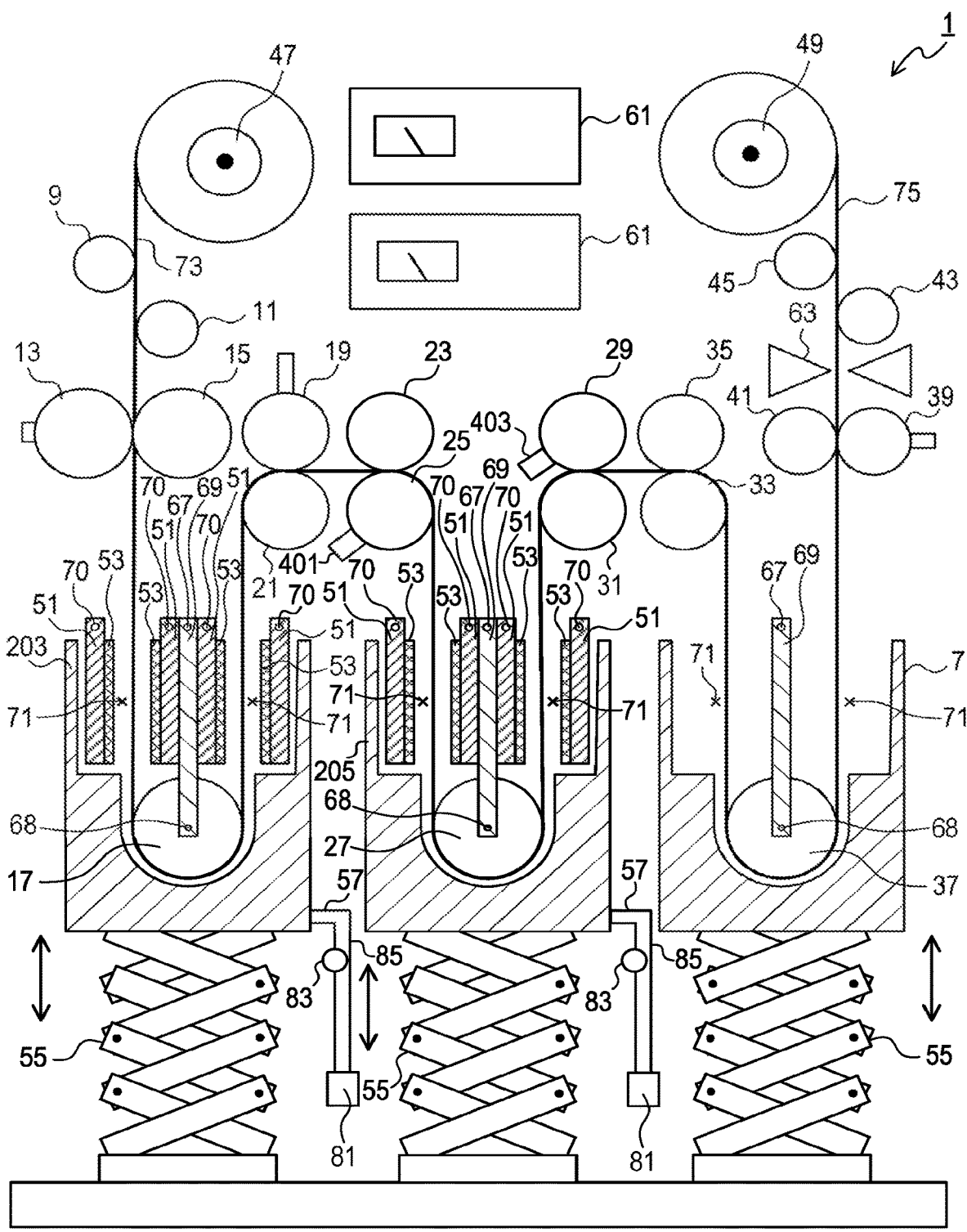
FIG. 25 is an explanatory diagram showing a configuration of a doping system.

As shown in FIG. 25, a doping system 1 of the ninth embodiment further includes cleaning units 401 and 403. The cleaning unit 401 cleans a surface of a conductive conveying roller 25 and removes foreign matters. The cleaning unit 403 cleans a surface of a conductive conveying roller 29 and removes foreign matters. The cleaning units 401 and 403 are provided to suppress the damage of the electrode precursor 73 and the electrode 75 due to the foreign matters attached to the surface of the conveying rollers 25 and 29. As a result, the electrode precursor 73 and the electrode 75 can be stably conveyed.

Figure 26:
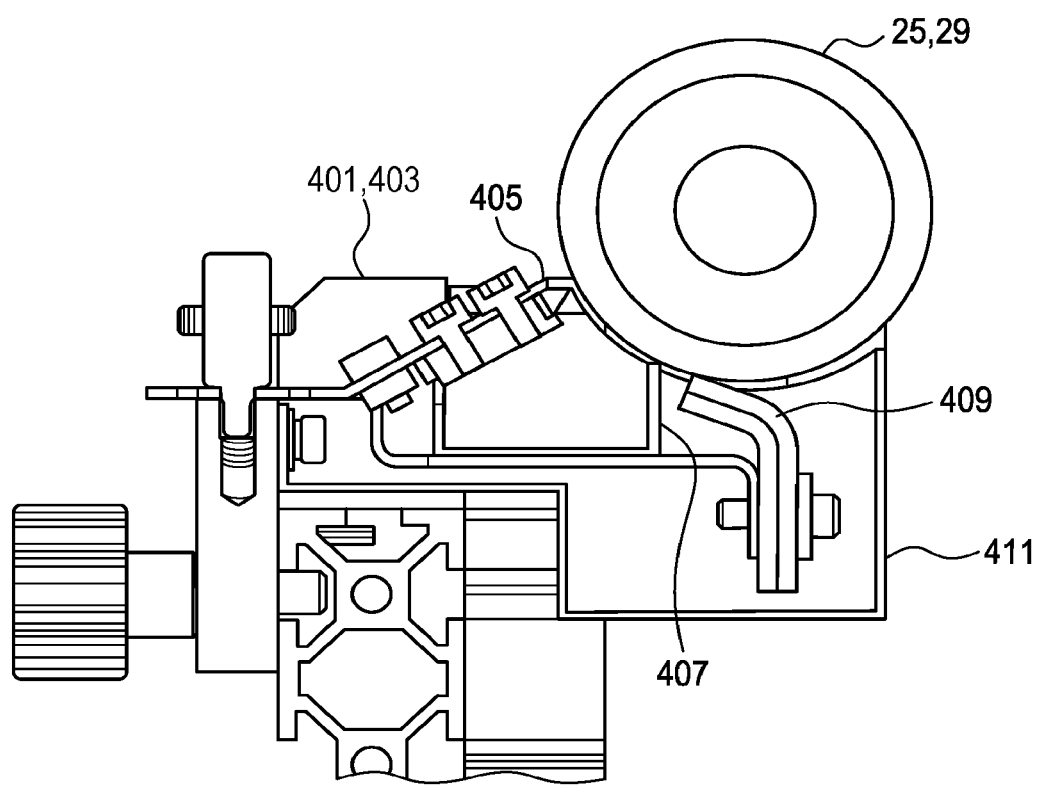
FIG. 26 is a side cross-sectional view showing a configuration of the cleaning unit.

The cleaning units 401 and 403 have the same configuration. The configuration of the cleaning units 401 and 403 will be described with reference to FIG. 26. The cleaning units 401 and 403 include a scraper 405, a recovery unit 407, a wiping unit 409, and a cleaning liquid supply unit 411.

The scraper 405 is fixed so that a leading end thereof comes into contact with the surfaces of the conveying rollers 25 and 29. If the conveying rollers 25 and 29 are rotated at the time of conveying the electrode precursor 73 and the electrode 75, the scraper 405 removes foreign matters from the surfaces of the rotating conveying rollers 25 and 29. A material of the scraper 405 is, for example, a resin. It is preferable that the scraper 405 is pressed against the sides of the conveying rollers 25 and 29 with an appropriate pressure by a pressing unit or the like (not shown) and come into contact with the conveying rollers 25 and 29.

The recovery unit 407 is a box provided adjacent to the scraper 405. The recovery unit 407 has an opening provided on the side of the conveying rollers 25 and 29. The recovery unit 407 accommodates foreign matter removed by the scraper 405.

The wiping unit 409 is made of, for example, cloth, sponge, or the like. The wiping unit 409 is provided so as to come into contact with the conveying rollers 25 and 29 at an appropriate pressure. If the conveying rollers 25 and 29 are rotated at the time of conveying the electrode precursor 73 and the electrode 75, the wiping unit 409 removes foreign matters from the surfaces of the rotating conveying rollers 25 and 29. The removed foreign matters are accommodated in the recovery unit 407.

The cleaning liquid supply unit 411 includes a container and a cleaning liquid accommodated in the container. At least a part of the wiping unit 409 is immersed in the cleaning liquid. The cleaning liquid permeates into the entire wiping unit 409. Therefore, the wiping unit 409 can remove foreign matters more effectively.

Tenth Embodiment

Since a basic configuration of a tenth embodiment is the same as that of the fourth embodiment, the description of the common configuration will be omitted, and the difference will be mainly described. It is to be noted that the same reference numerals as those in the fourth embodiment indicate the same configurations, and reference is made to the preceding description.

1. Difference from Fourth Embodiment

Figure 27:
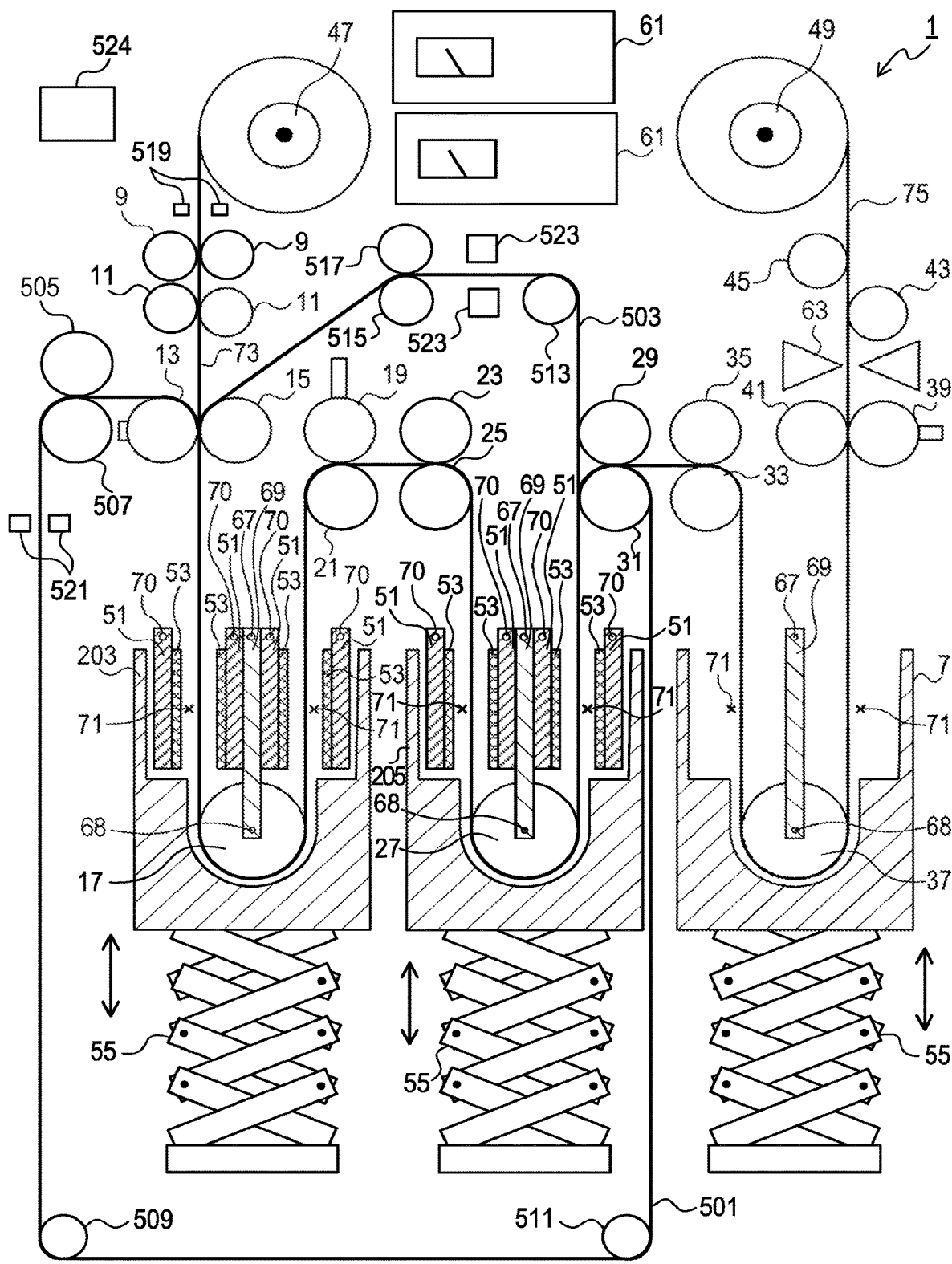
FIG. 27 is an explanatory diagram showing a configuration of a doping system.

As shown in FIG. 27, a doping system 1 of the tenth embodiment further includes a first mask member 501, a second mask member 503, conveying rollers 505, 507, 509, 511, 513, 515, and 517, a pair of sensors 519, a pair of sensors 521, a pair of sensors 523, and a control unit 524.

Further, the doping system 1 of the tenth embodiment includes a pair of conveying rollers 9. The pair of conveying rollers 9 sandwich the electrode precursor 73 from both sides thereof. Further, the doping system 1 of the tenth embodiment includes a pair of conveying rollers 11. The pair of conveying rollers 11 sandwich the electrode precursor 73 from both sides thereof.

Figure 28:
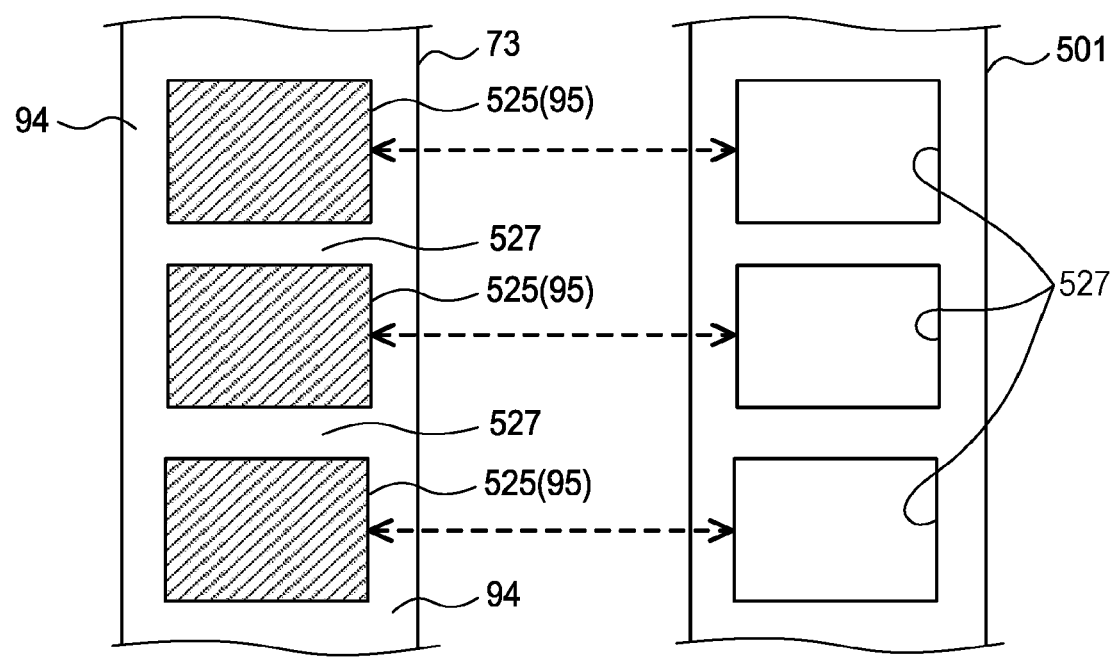
FIG. 28 is a plan view showing a configuration of an electrode precursor 73 and a first mask member 501.

As shown in FIG. 28, the first mask member 501 has a stripe shape as a basic shape. As shown in FIG. 27, the first mask member 501 has an annular shape. The first mask member 501 includes a plurality of openings 527. A shape of each opening 527 is rectangular. The plurality of openings 527 are arranged at regular intervals along a longitudinal direction of the first mask member 501.

A material of the first mask member 501 is not particularly limited, and for example, resins such as polyethylene, polypropylene, nylon, polyetheretherketone, and polytetrafluoroethylene can be used. It is preferable that the width of the first mask member 501 is equal to the width of the electrode precursor 73. In addition, the width of the first mask member 501 may be smaller than the width of the electrode precursor 73. The second mask member 503 also has the same shape as that of the first mask member 501.

As shown in FIG. 27, the first mask member 501 is conveyed along a predetermined closed path by the conveying rollers 13, 15, 17, 19, 21, 23, 25, 27, 29, 31, 511, 509, 505, and 507. The path includes a portion passing through the inside of the electrolytic solution tank 203 and a portion passing through the inside of the electrolytic solution tank 205. A portion passing through the inside of the electrolytic solution tank 203 is a path which first moves downward in the space between a porous insulating member 53*a* of the electrolytic solution tank 203 and the electrode precursor 73, moves its own moving direction to an upward direction by the conveying roller 17, and finally moves upward in the space between a porous insulating member 53*d* of the electrolytic solution tank 203 and the electrode precursor 73.

A portion passing through the inside of the electrolytic solution tank 205 is a path which first moves downward in the space between the porous insulating member 53*a* of the electrolytic solution tank 205 and the electrode precursor 73, moves its own moving direction to an upward direction by the conveying roller 27, and finally moves upward in the space between the porous insulating member 53*d* of the electrolytic solution tank 203 and the electrode precursor 73.

The first mask member 501 is in contact with one surface of the electrode precursor 73 at the portion passing through the inside of the electrolytic solution tank 203 and the portion passing through the inside of the electrolytic solution tank 205 and is conveyed in the same direction at the same speed as the electrode precursor 73. As shown in FIG. 28, in the electrode precursor 73 of the present embodiment, the active material layer 95 is an assembly of a plurality of active material forming regions 525. A shape of each active material forming region 525 is rectangular. The plurality of active material forming regions 525 are arranged at a constant period along the longitudinal direction of the electrode precursor 73. An intermittent portion 527 exists between the active material forming regions 525. The active material layer 95 is not formed in the intermittent portion 527, and thus the current collector 93 is exposed.

The width of the active material forming region 525 is larger than that of the opening 527 in the first mask member 501 by about 2 mm. A length of the active material forming region 525 in a longitudinal direction of the electrode precursor 73 is the same as that of the opening 527. An arrangement cycle of the active material forming region 525 in the longitudinal direction of the electrode precursor 73 is the same as that of the opening 527.

As shown in FIG. 27, the second mask member 503 is conveyed along a predetermined closed path by the conveying rollers 13, 15, 17, 19, 21, 23, 25, 27, 513, and 515. The path includes a portion passing through the inside of the electrolytic solution tank 203 and a portion passing through the inside of the electrolytic solution tank 205. A portion passing through the inside of the electrolytic solution tank 203 is a path which first moves downward in the space between a porous insulating member 53b of the electrolytic solution tank 203 and the electrode precursor 73, moves its own moving direction to an upward direction by the conveying roller 17, and finally moves upward in the space between a porous insulating member 53c of the electrolytic solution tank 203 and the electrode precursor 73.

A portion passing through the inside of the electrolytic solution tank 205 is a path which first moves downward in the space between a porous insulating member 53b of the electrolytic solution tank 205 and the electrode precursor 73, moves its own moving direction to an upward direction by the conveying roller 27, and finally moves upward in the space between a porous insulating member 53c of the electrolytic solution tank 203 and the electrode precursor 73.

The second mask member 503 is in contact with a surface opposite to the surface, which the first mask member 501 is in contact with, of both surfaces of the electrode precursor 73 at the portion passing through the inside of the electrolytic solution tank 203 and the portion passing through the inside of the electrolytic solution tank 205 and is conveyed in the same direction at the same speed as the electrode precursor 73.

The pair of sensors 519 is a reflection type photoelectric sensor. The pair of sensors 519 detects the position of the active material forming region 525 in the conveying direction.

The pair of sensors 521 is a transmission type photoelectric sensor. The pair of sensors 521 detects the position in the conveying direction of the opening 527 in the first mask member 501.

The pair of sensors 523 is a transmission type photoelectric sensor. The pair of sensors 523 detects the position in the conveying direction of the opening 527 in the second mask member 503.

The control unit 524 is configured to include a computer. Based on the detection results of the pair of sensors 519, the pair of sensors 521, and the pair of sensors 523, the control unit 524 controls the conveying speed of the first mask member 501 and the conveying speed of the second mask member 503. Specifically, when viewed from the thickness direction of the electrode precursor 73, the conveying speed of the first mask member 501 and the conveying speed of the second mask member 503 are controlled so that the opening 527 in the first mask member 501 coincides with the active material forming region 525 in the electrode precursor 73 and the opening 527 in the second mask member 503 coincides with the active material forming region 525 in the electrode precursor 73.

The first mask member 501 and the second mask member 503 cover the non-formed portion 94 and the intermittent portion 527 in the electrode precursor 73. Therefore, it is possible to suppress the precipitation of alkali metal to the non-formed portion 94 and the intermittent portion 527.

By making the size of the opening 527 the same or smaller than the size of the active material forming region 525, the precipitation of alkali metal to the non-formed portion 94 and the intermittent portion 527 can be further suppressed.

Other Embodiments

Although the aspects for performing the present disclosure have been described above, the present disclosure is not limited to the above-described embodiments, and various modifications can be made.

(1) In the second and third embodiments, the form of the pressing unit 113 may be another form. For example, instead of the plurality of rod-shaped members 115, a single thin plate made of an elastomer may be provided. The thin plate is elastically deformed according to the shape of the electrode precursor 73, and not only the central portion 96 but also the non-formed portion 94 are pressed against the conveying rollers 15 and 21. As a result, the current collector 93 exposed in the non-formed portion 94 and the conveying roller 15 reliably contact with each other. By bringing the non-formed portion 94 having a smaller electric resistance than that of the central portion 96 where the active material layer 95 is formed into contact with the conveying rollers 15 and 21 in the largest possible area, the electrical connection between the electrode precursor 73 and the counter electrode unit 51 is stabilized.

(2) In each embodiment, the surface of the conveying roller may be made of elastomer, and parts other than the surface thereof may be made of other materials. Examples of other materials may include metals, ceramics, hard resins and the like.

Figure 7:
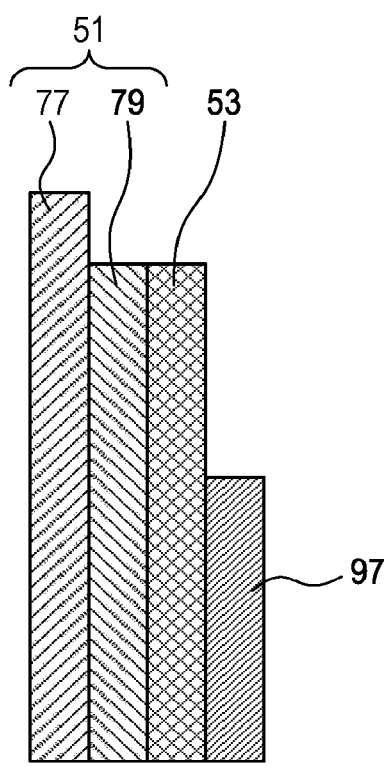
FIG. 7 is a side cross-sectional view showing a configuration of a counter electrode unit, a porous insulating member, and a resin plate.

(3) In each embodiment, as shown in FIG. 7, a part of the surface of the alkali metal-containing plate 79 may be covered with a resin plate 97. The resin plate 97 is screwed to the conductive substrate 77, and the alkali metal-containing plate 79 and the porous insulating member 53 are sandwiched therebetween.

The alkali metal ions are hardly eluted into the dope solution from the portion of the alkali metal-containing plate 79 covered with the resin plate 97. Therefore, it is possible to suppress the amount of alkali metal ions to be eluted by providing the resin plate 97. Further, it is possible to control the amount of alkali metal ions to be eluted by adjusting the size of the resin plate 97.

(4) In each embodiment, the electrode 75 dried by using the blower 63 may not be wound around the winding roll 49. In this case, for example, the electrode 75 may be cut to be a desired size. Alternatively, the electrode 75 may be wound by being superimposed on the stripe-shaped cathode separately manufactured via the stripe-shaped separator separately manufactured and thus may be a cell of a battery or a capacitor.

(5) In each embodiment, the doping system 1 may short-circuit, for example, the electrode precursor 73 and the counter electrode unit 51 in the dope solution. In this case, for example, the conductive substrate 77 and the conveying rollers 15, 21, 25, 29, 315, and 321 are electrically connected to each other by a conductor such as a metal wire to cause a short circuit. In this case, the DC power supply 61 need not be used.

(6) In each embodiment, the counter electrode unit 51 may be composed of an electrode (for example, carbon, platinum or the like) generally used in an electrolysis. In this case, the counter electrode unit 51 may not include the alkali metal-containing plate 79, and the electrode precursor 73 is doped with the alkali metal by alkali metal ions contained in the dope solution.

(7) In the first to fourth and seventh embodiments, only one of the conveying rollers 15 and 21 may be a conductive conveying roller. In addition, in the fifth embodiment, only one of the conveying rollers 25 and 29 may also be a conductive conveying roller. In addition, in the sixth embodiment, only one of the conveying rollers 25 and 29 may also be a conductive conveying roller. In addition, in the sixth embodiment, only one of the conveying rollers 317 and 321 may also be a conductive conveying roller.

(8) When the doping system 1 of the fourth embodiment is used, it is possible not to connect the counter electrode unit 51 provided in the electrolytic solution tank 203 to the positive terminal of the DC power supply 61. In this case, similarly to the fifth embodiment, the doping is not performed in the electrolytic solution tank 203. When the electrode precursor 73 is in the electrolytic solution tank 203, the dope solution permeates into an active material layer 95. In this case, the same effect as that of the fifth embodiment is exhibited.

(9) In the fourth to eighth embodiments, the number or arrangement of the electrolytic solution tanks can be set appropriately. For example, three or more electrolytic solution tanks may be arranged. The electrode precursor 73 can be conveyed so that the conveying roller group sequentially passes through three or more electrolytic solution tanks. The composition of the dope solution accommodated in three or more electrolytic solution tanks may be the same or different for each electrolytic solution tank. Also, even the current density applied between the electrode precursor 73 and the counter electrode unit 51 may be the same or different for each electrolytic solution tank.

(10) In the sixth embodiment, three or more sets of the electrolytic solution tanks including the electrolytic solution tank and the cleaning tank adjacent thereto may be provided.

(11) In each of the above embodiments, different DC power supplies may be used for each of the counter electrode units opposite to each of the active material layers present on both sides of the electrode. It is possible to uniformly dope the respective active material layers 95 with the alkali metal by controlling the applied current to each of the counter electrode units using different DC power supplies.

(12) The functions of one component in each of the above embodiments may be shared among a plurality of components, or the functions of a plurality of constituent elements may be exerted by one component. In addition, a part of the configuration of each of the above embodiments may be omitted. In addition, at least a part of the configuration of each of the above embodiments may be added, replaced, or the like to the configurations of other embodiments described above. It is to be noted that all aspects included in the technical concept specified from the language described in the claims are embodiments of the present disclosure.

The invention claimed is:

1. A method for manufacturing an electrode, the method comprising:

obtaining a doped electrode by doping the active material layer with alkali metal using a doping system, comprising doping tanks configured to accommodate a solution comprising alkali metal ions;

a conveying unit configured to convey a strip-shaped electrode precursor comprising an active material layer along a path passing through the doping tanks;

a counter electrode unit configured to be accommodated in the doping tanks;

a connection unit configured to electrically connect the electrode precursor and the counter electrode unit; and a porous insulating member disposed between the electrode precursor and the counter electrode unit and configured to be non-contact with the electrode precursor, wherein the conveying unit comprises conductive conveying rollers that convey the electrode precursor, the conductive conveying rollers being disposed outside the doping tanks, and wherein at least one of the conductive conveying rollers is disposed between the doping tanks.

2. The method of claim 1, further comprising:

cleaning the doped electrode by a cleaning liquid including an aprotic solvent.

3. The method of claim 1, wherein a support supports the doping tanks from below the doping tanks, and a height of the support can be changed to thereby vertically displace the counter electrode unit and/or the porous insulating member from the doping tanks.

4. The method of claim 1, wherein the doping system is configured such that the doping tanks can be moved relatively downward and upward with respect to the counter electrode unit by changing a height of a support arranged under the doping tanks.

5. The method of claim 1, further comprising:

passing the strip-shaped electrode precursor through an inside of each of the doping tanks in a path which first moves downward in a space positioned between a first porous insulating member attached along an inner side surface of each of the doping tanks and a second porous insulating member on a partition plate side opposite thereto, then changes its own moving direction to an upward direction by the conveying rollers, and finally moves upward in a space positioned between a third porous insulating member attached along the inner side surface of each of the doping tanks and a fourth porous insulating member on the partition plate side opposite thereto, wherein each of the first, second, third, and fourth porous insulating members contacts the alkali metal ions.

6. The method of claim 5, wherein a shortest distance from a surface of each of the first to the fourth porous insulating members to the electrode precursor is in a range of 1 to 10 mm.

7. The method of claim 1, wherein the doping system comprises three or more electrolytic solution tanks, and wherein at least one conductive conveying roller is provided between adjacent electrolytic solution tanks of the three or more electrolytic solution tanks.

8. A method for manufacturing a capacitor, the method comprising:
manufacturing an anode by the method of claim 1.

9. A method for manufacturing a battery, the method comprising:
manufacturing an anode by the method of claim 1.

10. A doping system, comprising:
doping tanks configured to accommodate an electrolytic solution comprising alkali metal ions;
a conveying unit configured to convey a strip-shaped electrode precursor comprising an active material layer along a path passing through the doping tanks;
a counter electrode unit configured to be accommodated in the doping tanks;
a connection unit configured to electrically connect the electrode precursor and the counter electrode unit; and
a porous insulating member disposed between the electrode precursor and the counter electrode unit and configured to be non-contact with the electrode precursor,
wherein the conveying unit comprises conductive conveying rollers that convey the electrode precursor, the conductive conveying rollers being disposed outside the doping tanks, and
wherein at least one of the conductive conveying rollers is disposed between the doping tanks.

11. The system of claim 10, wherein the conveying rollers are a part of the connection unit.

12. The system of claim 11, further comprising:
an elastically deformable pressing unit configured to press the electrode precursor in a direction of the conveying rollers.

13. The system of claim 10, further comprising:
a cleaning unit configured to clean a surface of each of the conveying rollers.

14. The system of claim 10, further comprising:
a mask member which comprises an opening, is disposed between the electrode precursor and the counter electrode unit, and is configured to be conveyed in a direction identical to a direction of conveying the electrode precursor.

15. The system of claim 10, wherein the porous insulating member has a plate shape.

16. The system of claim 10, wherein a distance from a surface of the porous insulating member to the electrode precursor is in a range of 0.5 to 100 mm.

17. The system of claim 10, wherein the counter electrode unit comprises a conductive substrate and an alkali metal-containing plate disposed on the conductive substrate.

18. The system claim 10, further comprising:
a tank moving unit configured to move the doping tanks vertically relative to the counter electrode unit.

19. The system of claim 10, further comprising:
a circulating filtration unit configured to circulate and filter the solution.

20. The system of claim 10, wherein the electrode precursor has a non-formed portion in which the active material layer is not formed.

21. The system of claim 10, further comprising a support configured to support the doping tanks from below the doping tanks,
wherein a height of the support can be changed to thereby vertically displace the counter electrode unit and/or the porous insulating member from the doping tanks.

22. The system of claim 10, wherein configured such that the doping tanks can be moved relatively downward and upward with respect to the counter electrode unit by changing a height of a support arranged under the doping tanks.

* * * * *